United States Patent
Kessler et al.

(10) Patent No.: US 10,397,021 B2
(45) Date of Patent: Aug. 27, 2019

(54) SYNCHRONOUS SLAVE-TO-SLAVE COMMUNICATIONS

(71) Applicant: Analog Devices, Inc., Norwood, MA (US)

(72) Inventors: Martin Kessler, Salem, MA (US); William Hooper, Newton, MA (US); Lewis F. Lahr, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 197 days.

(21) Appl. No.: 15/411,706

(22) Filed: Jan. 20, 2017

(65) Prior Publication Data

US 2017/0222829 A1  Aug. 3, 2017

Related U.S. Application Data

(60) Provisional application No. 62/289,051, filed on Jan. 29, 2016.

(51) Int. Cl.
*G06F 13/40* (2006.01)
*G06F 13/42* (2006.01)
*H04L 12/40* (2006.01)
*H04L 12/43* (2006.01)

(52) U.S. Cl.
CPC ............. *H04L 12/43* (2013.01); *G06F 13/40* (2013.01); *G06F 13/4247* (2013.01); *H04L 12/40039* (2013.01); *H04L 12/40058* (2013.01); *H04L 12/40156* (2013.01)

(58) Field of Classification Search
None
See application file for complete search history.

(56) References Cited

U.S. PATENT DOCUMENTS

| | | | |
|---|---|---|---|
| 5,819,051 A | | 10/1998 | Murray et al. |
| 6,141,719 A | * | 10/2000 | Rafferty ............. G06F 13/4022 710/100 |
| 7,158,596 B2 | | 1/2007 | Knapp et al. |
| 7,272,202 B2 | | 9/2007 | Knapp et al. |
| 7,315,551 B2 | | 1/2008 | Olson et al. |
| 7,395,362 B2 | | 7/2008 | Drexler et al. |
| 7,539,804 B2 | | 5/2009 | Miura |
| 7,685,449 B2 | | 3/2010 | Terasawa |
| 7,707,437 B2 | | 4/2010 | Berenbaum et al. |
| 7,802,036 B2 | | 9/2010 | Takeuchi |
| 7,966,379 B2 | | 6/2011 | Berenbaum et al. |
| 8,147,338 B2 | | 4/2012 | Hutchison-Kay |
| 8,156,274 B2 | | 4/2012 | Kapelner |
| 8,185,759 B1 | | 5/2012 | Li et al. |
| 8,600,583 B2 | | 12/2013 | Fervel et al. |
| 8,615,091 B2 | | 12/2013 | Terwal |
| 8,667,194 B2 | | 3/2014 | Dybsetter et al. |

(Continued)

OTHER PUBLICATIONS

Unpublished U.S. Appl. No. 15/411,801, filed Jan. 20, 2017.
Unpublished U.S. Appl. No. 15/411,846, filed Jan. 20, 2017.
Unpublished U.S. Appl. No. 15/139,238, filed Apr. 26, 2016.

*Primary Examiner* — Jutai Kao
(74) *Attorney, Agent, or Firm* — Patent Capital Group

(57) ABSTRACT

Disclosed herein are systems and techniques for slave-to-slave communication in a multi-node, daisy-chained network. Slave nodes may provide or receive upstream or downstream data directly to/from other slave nodes, without the need for data slots first to route through the master node.

20 Claims, 58 Drawing Sheets

(56) References Cited

U.S. PATENT DOCUMENTS

| | | |
|---|---|---|
| 8,745,305 B2 | 6/2014 | Toba et al. |
| 8,806,083 B2 | 8/2014 | Doorenbos |
| 8,873,659 B2 | 10/2014 | Wang et al. |
| 8,987,933 B2 | 3/2015 | Yu |
| 2004/0172493 A1* | 9/2004 | Askar .................. G06F 13/128 710/305 |
| 2012/0093342 A1 | 4/2012 | Rupprecht et al. |
| 2013/0124763 A1 | 5/2013 | Kessler |
| 2014/0025999 A1 | 1/2014 | Kessler |
| 2014/0095750 A1 | 4/2014 | Tailliet |
| 2014/0101351 A1* | 4/2014 | Hooper .................. G06F 13/42 710/110 |
| 2014/0101477 A1 | 4/2014 | Patterson |
| 2014/0223054 A1 | 8/2014 | Hasan et al. |
| 2014/0281077 A1 | 9/2014 | Biskup |
| 2014/0281078 A1 | 9/2014 | Biskup |
| 2014/0281079 A1 | 9/2014 | Biskup |
| 2014/0362865 A1 | 12/2014 | Chini et al. |
| 2015/0008960 A1 | 1/2015 | Lahr |
| 2015/0009050 A1 | 1/2015 | Lahr et al. |
| 2015/0032599 A1 | 1/2015 | Agapitov |
| 2015/0301968 A1 | 10/2015 | Kessler |
| 2015/0365754 A1 | 12/2015 | Perl |
| 2016/0034416 A1 | 2/2016 | Chavez et al. |
| 2016/0034417 A1 | 2/2016 | Chavez et al. |
| 2016/0041941 A1 | 2/2016 | Kessler et al. |
| 2016/0196817 A1 | 7/2016 | Mortensen et al. |
| 2016/0205066 A1* | 7/2016 | Attarwala ............... H04L 12/40 709/208 |

* cited by examiner

FIG. 6

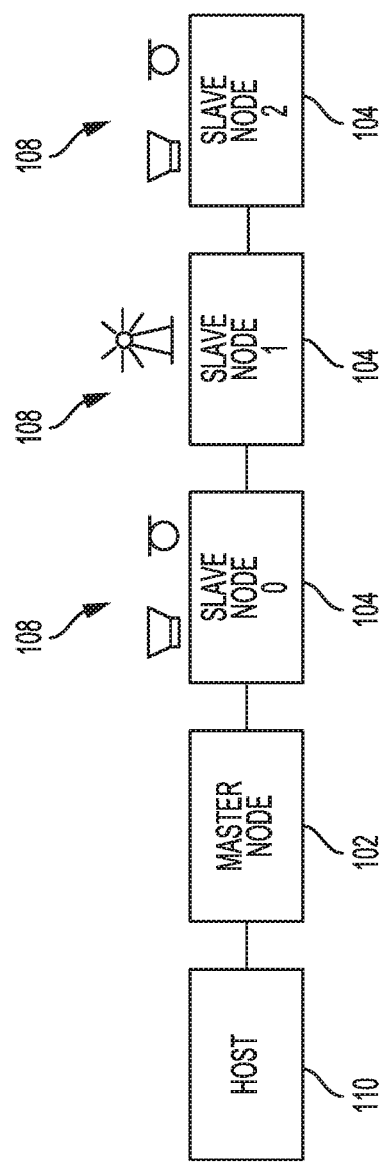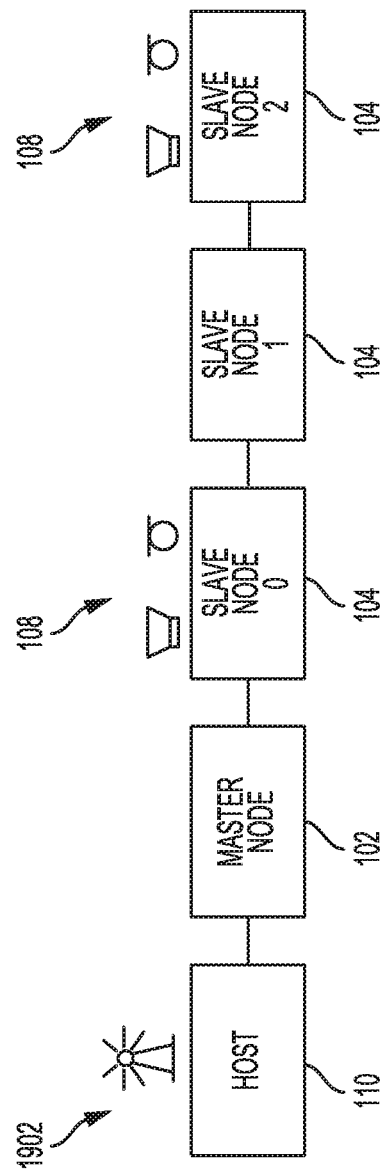

SYNCHRONOUS SLAVE-TO-SLAVE COMMUNICATIONS

CROSS-REFERENCE TO RELATED APPLICATION

The present application claims priority to U.S. Provisional Patent Application No. 62/289,051, filed Jan. 29, 2016 and titled "SYNCHRONOUS SLAVE-TO-SLAVE COMMUNICATIONS." This priority application is incorporated by reference herein in its entirety.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 6 illustrates example formats for a synchronization response frame at different modes of operation of the system of FIG. 1, in accordance with various embodiments.

FIG. 18 depicts an embodiment of the system of FIG. 1 in which a slave node has a wireless transceiver as a peripheral device.

FIG. 19 depicts an embodiment of the system of FIG. 1 in which a host is coupled to a wireless transceiver.

DETAILED DESCRIPTION

Figure 1:
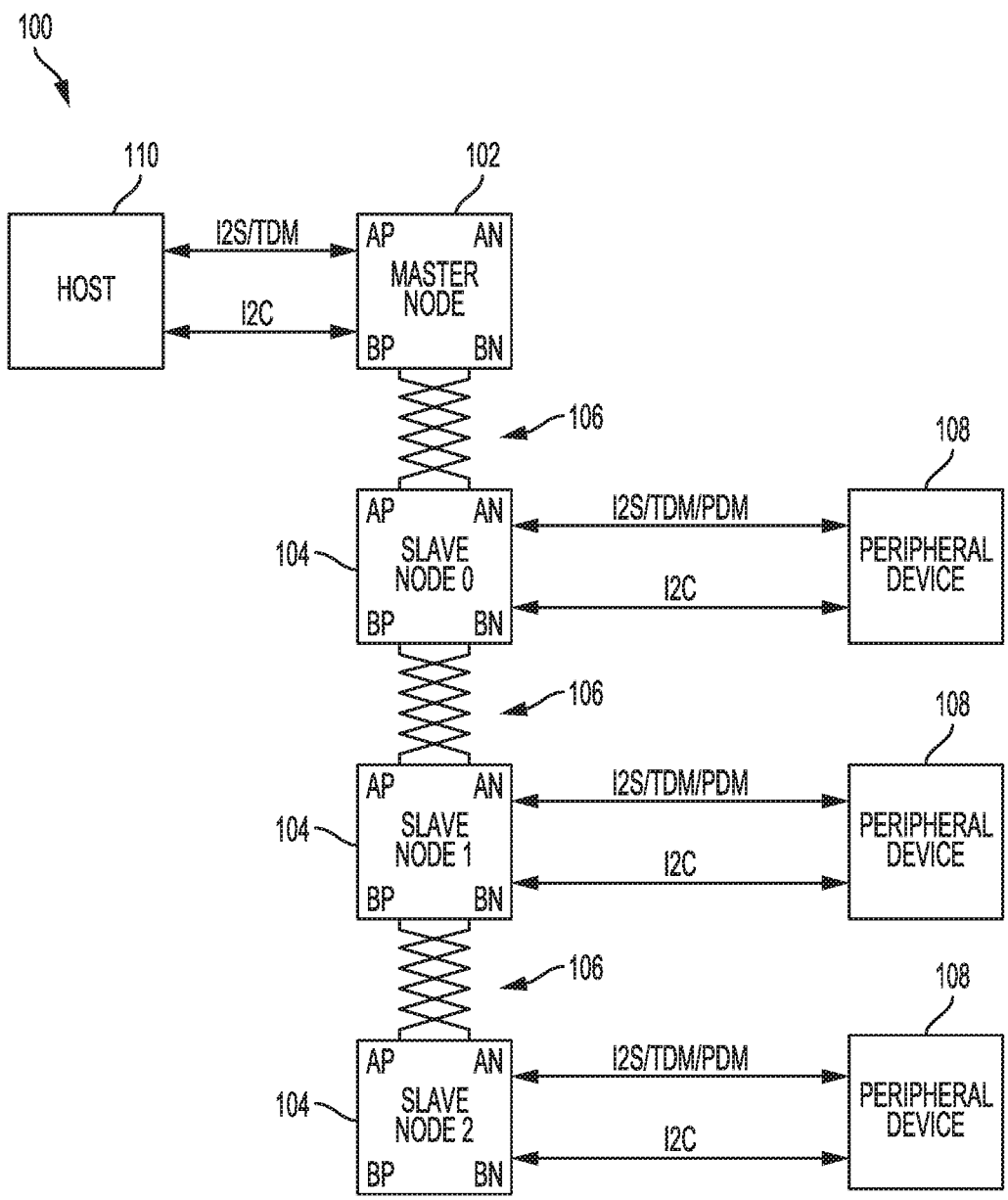
FIG. 1 is a block diagram of an illustrative two-wire communication system, in accordance with various embodiments.

As electronic components decrease in size, and as performance expectations increase, more components are included in previously un-instrumented or less-instrumented devices. This drive toward increased instrumentation has conventionally been limited by the communication infrastructure used to exchange signals between components. For example, the proliferation of sensors, such as microphones, cameras, etc., in automobiles (and other closed and/or mobile systems, such as robotic systems) has led to excessive amounts of wiring between components. This excessive wiring is attended by an increase in system complexity and weight, and a decrease in performance and reliability.

Described herein are communications systems that provide low latency, time division multiplexed (TDM) communications over a two-wire bus (e.g., a twisted wire pair). In these systems, bi-directional synchronous data (e.g., digital audio), clock, and synchronization signals may be provided by the two-wire bus, supporting direct point-to-point connections between nodes on the bus and allowing multiple, daisy chained nodes at different locations to contribute or consume TDM channel content. These communication systems enable downstream traffic (e.g., from a master node to a last slave node), upstream traffic (e.g., to a master node from a slave node), and power transmission over the same two-wire bus.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality. A master node may also be referred to as a master "device" herein; similarly, a slave node may be referred to as a slave "device" herein.

Any of the embodiments described herein may be performed in accordance with any suitable related embodiments disclosed in any of the prior patent filings to which the present application claims priority. In particular, any of the embodiments of the Automotive Audio Bus (A2B) system disclosed in any of the priority filings may be implemented in any combination with the embodiments described herein. For example, power switching and diagnostics may be included in the two-wire communication systems described herein, as discussed in U.S. Provisional Application No. 61/845,542, filed Jul. 12, 2013. In another example, decoders may be included in the two-wire communication systems described herein, as discussed in U.S. Provisional Application No. 61/843,902, filed Jul. 8, 2013. In another example, digital phase detectors may be included in the two-wire communication systems described herein, as discussed in U.S. Provisional Application No. 61/843,896, filed Jul. 8, 2013. In another example, the two-wire communication systems described herein may include the state machine functionality discussed in U.S. Provisional Application No. 61/843,891, filed Jul. 8, 2013.

FIG. 1 is a block diagram of an illustrative half-duplex two-wire communication system 100, in accordance with various embodiments. The system 100 includes a host 110, a master node 102 and at least one slave node 104. In FIG. 1, three slave nodes (0, 1, and 2) are illustrated. The depiction of three slave nodes 104 in FIG. 1 is simply illustrative, and the system 100 may include one, two, or more slave nodes 104, as desired.

The master node 102 may communicate with the slave nodes 104 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102 to the slave node 0, a link coupling the slave node 0 to the slave node 1, and a link coupling the slave node 1 to the slave node 2. The links of the bus 106 may each be formed of a single twisted wire pair (e.g., an unshielded twisted pair).

The host 110 may include a processor that programs the master node 102, and acts as the originator and recipient of various payloads transmitted along the bus 106. In particular, the host 110 may be the master of Inter-Integrated Circuit Sound (I2S) communications that happen along the bus 106. The host 110 may communicate with the master node 102 via an I2S/Time Division Multiplex (TDM) bus and/or an Inter-Integrated Circuit (I2C) bus. In some embodiments, the master node 102 may be a transceiver (e.g., the node transceiver 120 discussed below with reference to FIG. 2) located within a housing of the host 110. The master node 102 may be programmable by the host 110 over the I2C bus for configuration and read-back, and may be configured to generate clock, synchronization, and framing for all of the slave nodes 104. In some embodiments, an extension of the I2C control bus between the host 110 in the master node 102 may be embedded in the data streams transmitted over the bus 106, allowing the host 110 direct access to registers and status information for the one or more slave nodes 104, as well as enabling I2C-to-I2C communication over distance to allow the host 110 to control the peripherals 108.

The master node 102 may generate "downstream" signals (e.g., data signals, power signals, etc., transmitted away from the master node 102 along the bus 106) and receive "upstream" signals (e.g., transmitted toward the master node 102 along the bus 106). The master node 102 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102 may be derived from an I2S input provided to the master node 102 by the host 110. A slave node 104 may be an addressable network connection point that represents a possible destination for data frames transmitted downstream on the bus 106 or upstream on the bus 106. A slave node 104 may also represent a possible source of downstream or upstream data frames. The system 100 may allow for control information and other data to be transmitted in both directions over the bus 106 from one node to the next. One or more of the slave nodes 104 may also be powered by signals transmitted over the bus 106.

In particular, each of the master node 102 and the slave nodes 104 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102 may include positive and negative upstream terminals, but these terminals may not be used; in other embodiments, the master node 102 may not include positive and negative upstream terminals. The last slave node 104 along the bus 106 (the slave node 2 in FIG. 1) may include positive and negative downstream terminals, but these terminals may not be used; in other embodiments, the last slave node 104 along the bus may not include positive and negative downstream terminals.

As discussed in detail below, the master node 102 may periodically send a synchronization control frame downstream, optionally along with data intended for one or more of the slave nodes 104. For example, the master node 102 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 104 to identify the beginning of each superframe and also, in combination with physical layer encoding/signaling, may allow each slave node 104 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 104), conveyance of I2C information, remote control of certain general-purpose input/output (GPIO) pins at the slave nodes 104, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between slave node 104 (optionally along with other data, which may come from the master node 102 but additionally or alternatively may come from one or more upstream slave nodes 104 or from a slave node 104 itself) until it reaches the last slave node 104 (i.e., the slave node 2 in FIG. 1), which has been configured by the master node 102 as the last slave node 104 or has self-identified itself as the last slave node 104. Upon receiving the synchronization control frame, the last slave node 104 may transmit a synchronization response frame followed by any data that it is permitted to transmit (e.g., a 24-bit audio sample in a designated time slot). The synchronization response frame may be passed upstream between slave nodes 104 (optionally along with data from downstream slave nodes 104), and based on the synchronization response frame, each slave node 104 may be able to identify a time slot, if any, in which the slave node 104 is permitted to transmit.

In some embodiments, one or more of the slave nodes 104 in the system 100 may be coupled to and communicate with a peripheral device 108. For example, a slave node 104 may be configured to read data from and/or write data to the associated peripheral device 108 using I2S, pulse density modulation (PDM), TDM, and/or I2C protocols, as discussed below. Although the "peripheral device 108" may be referred to in the singular herein, this is simply for ease of discussion, and a single slave node 104 may be coupled with zero, one, or more peripheral devices. Examples of peripheral devices that may be included in the peripheral device 108 may include a digital signal processor (DSP), a field programmable gate array (FPGA), an application-specific integrated circuit (ASIC), an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for Inter-Integrated Circuit Sound (I2S) communication; the peripheral device 108 may communicate with the associated slave node 104 via the I2S protocol. In some embodiments, the peripheral device 108 may include any device configured for Inter-Integrated Circuit (I2C) communication; the peripheral device 108 may communicate with the associated slave node 104 via the I2C protocol. In some embodiments, a slave node 104 may not be coupled to any peripheral device 108.

A slave node 104 and its associated peripheral device 108 may be contained in separate housings and coupled through a wired or wireless communication connection or may be contained in a common housing. For example, a speaker connected as a peripheral device 108 may be packaged with the hardware for an associated slave node 104 (e.g., the node transceiver 120 discussed below with reference to FIG. 2), such that the hardware for the associated slave node 104 is contained within a housing that includes other speaker components. The same may be true for any type of peripheral device 108.

As discussed above, the host 110 may communicate with and control the master node 102 using multi-channel I2S and I2C communication protocols. In particular, the host 110 may transmit data via I2S to a frame buffer (not illustrated) in the master node 102, and the master node 102 may read data from the frame buffer and transmit the data along the bus 106. Analogously, the master node 102 may store data received via the bus 106 in the frame buffer, and then may transmit the data to the host 110 via I2S.

Each slave node 104 may have internal control registers that may be configured by communications from the master node 102. A number of such registers are discussed in detail below. Each slave node 104 may receive downstream data and may retransmit the data further downstream. Each slave node 104 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102 may be programmed (by the host 110) with a number of downstream portions to transmit to one or more of the slave nodes 104 and a number of upstream portions to receive from one or more of the slave nodes 104. Each slave node 104 may be programmed (by the master node 102) with a number of downstream portions to retransmit down the bus 106, a number of downstream portions to consume, a number of upstream portions to retransmit up the bus 106, and a number of upstream portions in which the slave node 104 may transmit data received from the slave node 104 from the associated peripheral device 108. Communication along the bus 106 is discussed in further detail below with reference to FIGS. 2-12.

Figure 2:
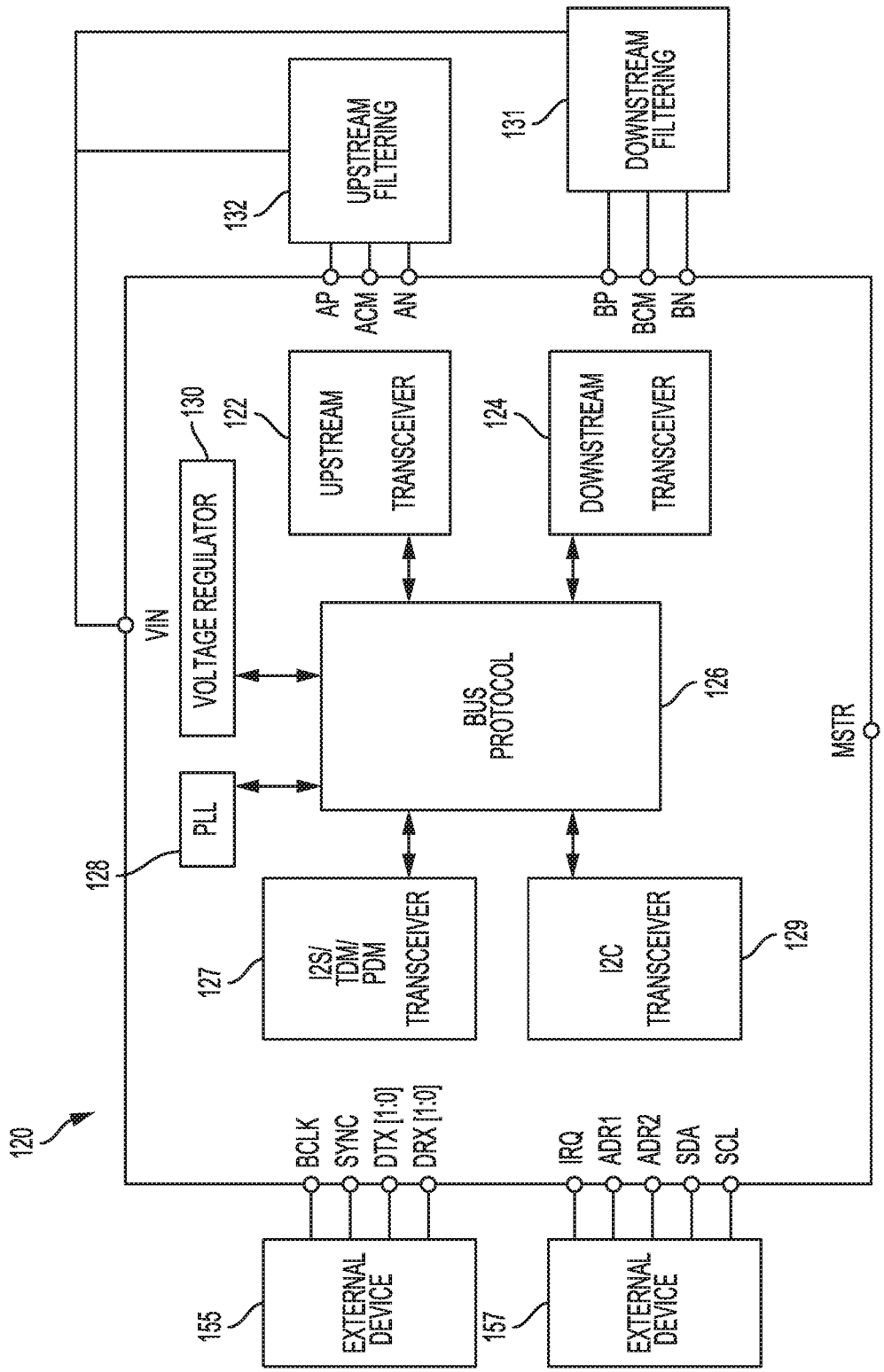
FIG. 2 is a block diagram of a node transceiver that may be included in a node of the system of FIG. 1, in accordance with various embodiments.

Each of the master node 102 and the slave nodes 104 may include a transceiver to manage communication between components of the system 100. FIG. 2 is a block diagram of a node transceiver 120 that may be included in a node (e.g., the master node 102 or a slave node 104) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream transceiver 122 and a downstream transceiver 124. The upstream transceiver 122 may be coupled to the positive and negative upstream terminals discussed above with reference to FIG. 1, and the downstream transceiver 124 may be coupled to the positive and negative downstream terminals discussed above with reference to FIG. 1. In some embodiments, the upstream transceiver 122 and the downstream transceiver 124 may each be differential signaling (DS) transceivers. In some embodiments, the upstream transceiver 122 may be a low voltage DS (LVDS) transceiver, and the downstream transceiver 124 may be an LVDS transceiver. Each node in the system 100 may be AC-coupled to the bus 106, and data signals may be conveyed along the bus 106 (e.g., via the upstream transceiver 122 and/or the downstream transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream transceiver 122 and the downstream transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 104 in the system 100 may receive power transmitted over the bus 106 concurrently with data. For power distribution (which is optional, as some of the slave nodes 104 may be configured to have exclusively local power provided to them), the master node 102 may place a DC bias on the bus link between the master node 102 and the slave node 0 (e.g., by connecting one of the downstream terminals to a voltage source provided by a voltage regulator and the other downstream terminal to ground). The DC bias may be a predetermined voltage, such as 5 V, 8 V, the voltage of a car battery, or a higher voltage. Each successive slave node 104 can selectively tap its upstream bus link to recover power (e.g., using the voltage regulator circuitry 130). This power may be used to power the slave node 104 itself (and optionally one or more peripheral device 108 coupled to the slave node 104). A slave node 104 may also selectively bias the bus link downstream for the next-in-line slave node 104 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102 may instruct the slave node 0 to provide power to its downstream bus link 106 in order to provide power to the slave node 1; after the slave node 1 is discovered and configured, the master node 102 may instruct the slave node 1 to provide power to its downstream bus link 106 in order to provide power to the slave node 2 (and so on for additional slave nodes 104 coupled to the bus 106. In some embodiments, one or more of the slave nodes 104 may be locally powered, instead of or in addition to being powered from its upstream bus link. In some such embodiments, the local power source for a given slave node 104 may be used to provide power to one or more downstream slave nodes.

In some embodiments, upstream filtering circuitry 132 may be disposed between the upstream transceiver 122 and the voltage regulator circuitry 130, and downstream filtering circuitry 131 may be disposed between the downstream transceiver 124 and the voltage regulator circuitry 130. Since each link of the bus 106 may carry AC (signal) and DC (power) components, the upstream filtering circuitry 132 and the downstream filtering circuitry 131 may separate the AC and DC components, providing the AC components to the upstream transceiver 122 and the downstream transceiver 124, and providing the DC components to the voltage regulator 130. AC couplings on the line side of the upstream transceiver 122 and downstream transceiver 124 substantially isolate the transceivers 122 and 124 from the DC component on the line to allow for high-speed bi-directional communications. As discussed above, the DC component may be tapped for power, and the upstream filtering circuitry 132 and the downstream filtering circuitry 131 may include a ferrite, a common mode choke, or an inductor, for example, to reduce the AC component provided to the voltage regulator circuitry 130. In some embodiments, the upstream filtering circuitry 132 may be included in the upstream transceiver 122, and/or the downstream filtering circuitry 131 may be included in the downstream transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the master node 102, the external device 155 may include the host 110, and the I2S/TDM/PDM transceiver 127 may provide an I2S slave (in regards to BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 104, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDM MODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the amount of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102), and SDA and SCL are used for the I2C serial data and serial clock signals, respectively. When the node transceiver 120 is included in the master node 102, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 104, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include an interrupt request (IRQ) pin in communication with the bus protocol circuitry 126. When the node transceiver 120 is included in the master node 102 via the I2C transceiver 129, the bus protocol circuitry 126 may provide event-driven interrupt requests toward the host 110 via the IRQ pin. When the node transceiver 120 is included in a slave node 104 (e.g., when the MSTR pin is low), the IRQ pin may serve as a GPIO pin with interrupt request capability.

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the PLLs of each node (e.g., the PLL 128) synchronized. In standby operational mode, reads and writes across the bus 106 are not supported. In a discovery operational mode, the master node 102 may send predetermined signals out along the bus 106 and wait for suitable responses to map out the topology of slave nodes 104 distributed along the bus 106. In a normal operational mode, full register access may be available to and from the slave nodes 104 as well as access to and from peripheral devices 108 over the bus 106. Normal mode may be globally configured by the host 110 with or without synchronous upstream data and with or without synchronous downstream data.

Figure 3:
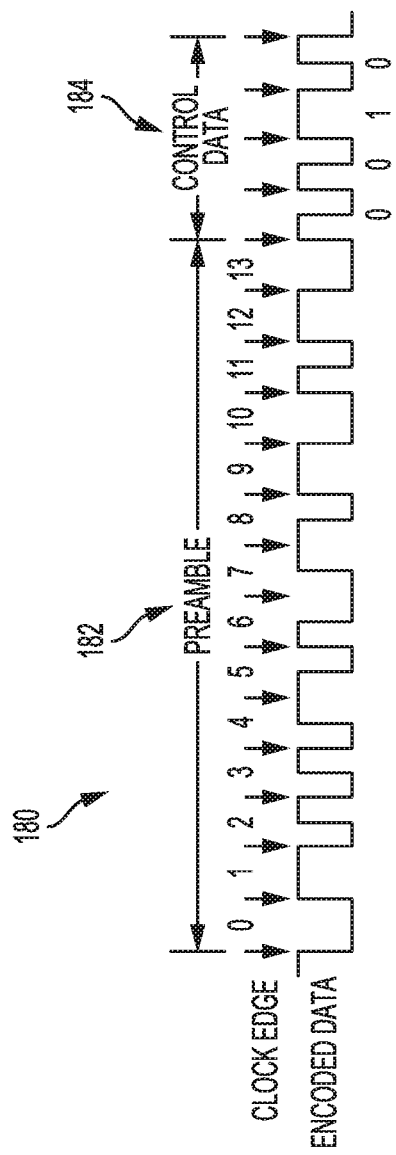
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102, while in an upstream portion, a synchronization response frame, and upstream data may be transmitted to the master node 102 from each of the slave nodes 104. The synchronization control frame 180 may include a preamble 182 and control data 184. Each slave node 104 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
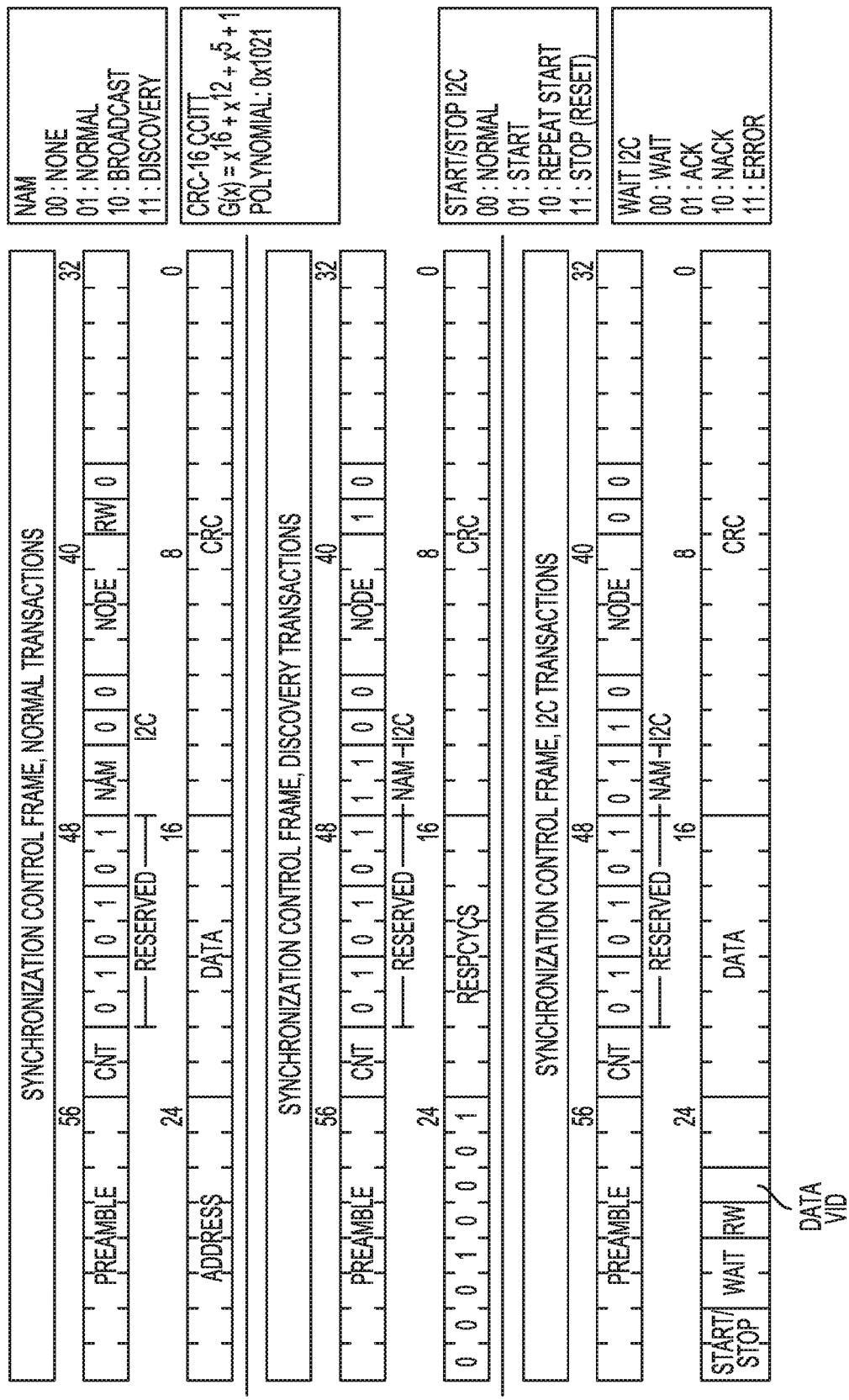
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 104 can receive a PLL synchronization signal from the bus 106 without requiring a crystal clock source at the slave nodes 104.

Figure 4:
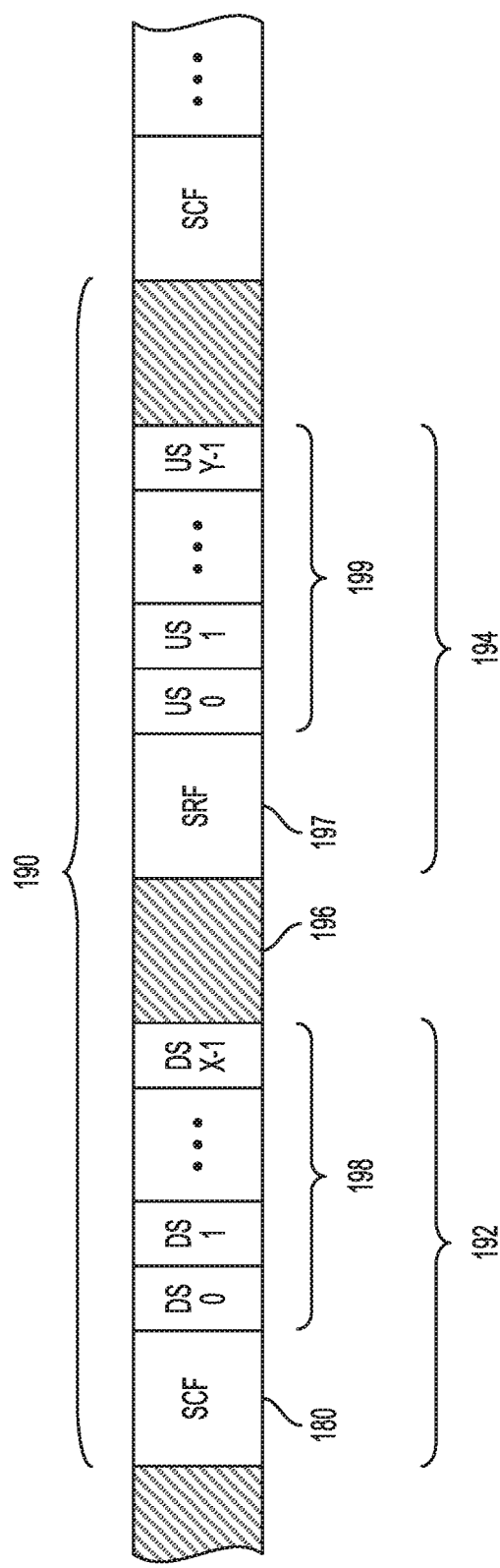
FIG. 4 is a diagram of a superframe used for communication in the system of FIG. 1, in accordance with various embodiments.
Figure 6:
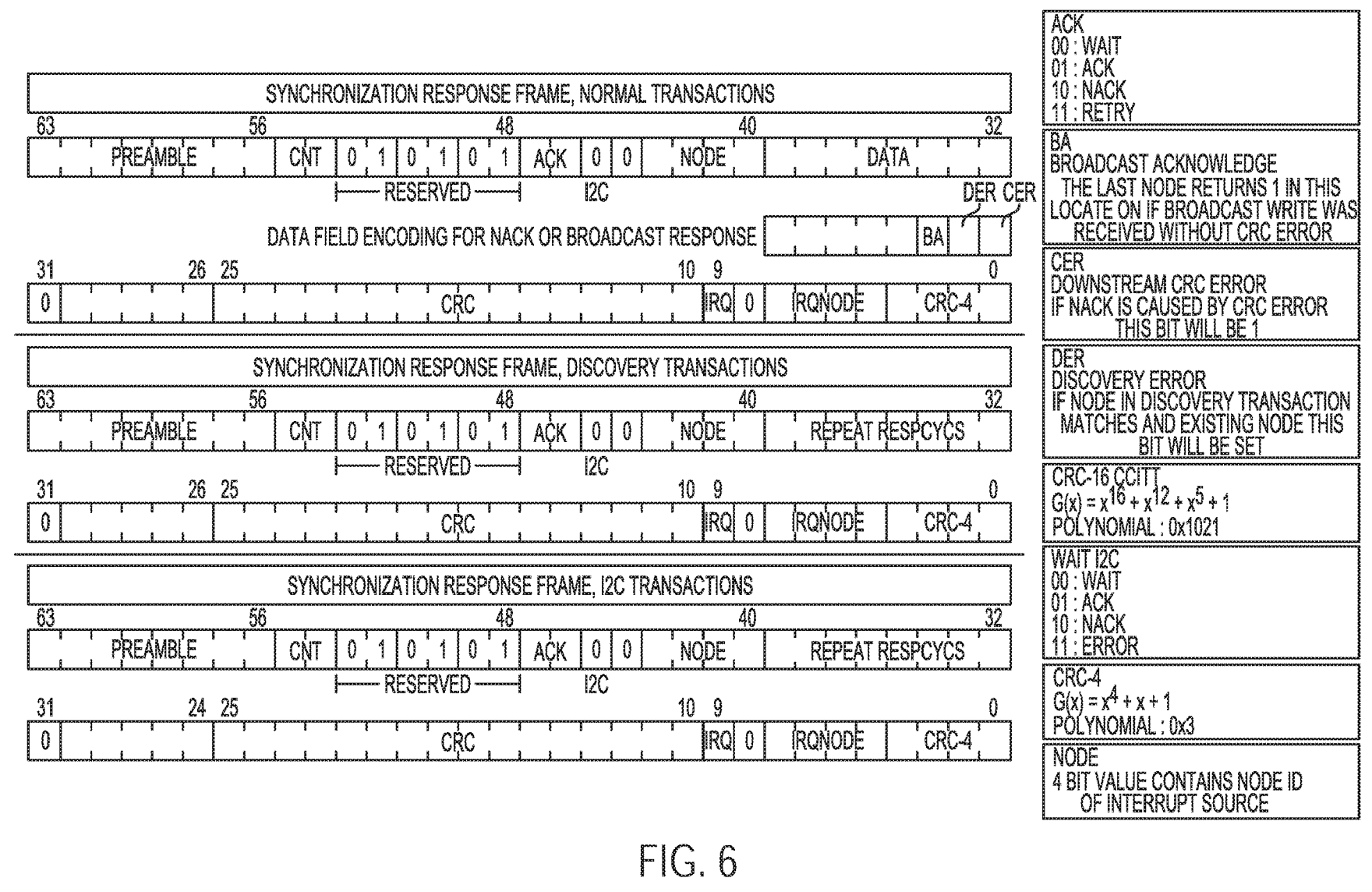

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102 to the last slave node 104 (e.g., the slave node 104C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 104 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 104 in the upstream data slots 199 directly after the synchronization response frame 197. The upstream data slots 199 may have equal width. A slave node 104 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 104 to a downstream slave node 104, the preamble 182 may be generated by the transmitting slave node 104, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 104 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 104 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 104 over the bus 106. In normal mode, registers of a slave node 104 may be read from and/or written to based on the ID of the slave node 104 and the address of the register. Broadcast transactions are writes which should be taken by every slave node 104. In some embodiments, the NAM field may provide for four node addressing modes, including "none" (e.g., data not addressed to any particular slave node 104), "normal" (e.g., data unicast to a specific slave node 104 specified in the address field discussed below), "broadcast" (e.g., addressed to all slave nodes 104), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 104.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 104 in a node ID register of the slave node 104. Each slave node 104 in the system 100 may be assigned a unique ID when the slave node 104 is discovered by the master node 102, as discussed below. In some embodiments, the master node 102 does not have a node ID, while in other embodiments, the master node 102 may have a node ID. In some embodiments, the slave node 104 attached to the master node 102 on the bus 106 (e.g., the slave node 0 in FIG. 1) will be slave node 0, and each successive slave node 104 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW=1) or writes (e.g., RW=0).

In some embodiments, the synchronization control frame 180 may include an address field. The address field may have any suitable length (e.g., 8 bits) and may be used to address specific registers of a slave node 104 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 104 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the slave node 104 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102 may send read and write requests to the slave nodes 104, including both requests specific to communication on the bus 106 and I2C requests. For example, the master node 102 may send read and write requests (indicated using the RW field) to one or more designated slave nodes 104 (using the NAM and node fields) and can indicate whether the request is a request for the slave node 104 specific to the bus 106, an I2C request for the slave node 104, or an I2C request to be passed along to an I2C-compatible peripheral device 108 coupled to the slave node 104 at one or more I2C ports of the slave node 104.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 104 on the bus 106 may wait until the RESPCYCS counter has expired and then begin transmitting a synchronization response frame 197 upstream. If an upstream slave node 104 has been targeted by a normal read or write transaction, a slave node 104 may generate its own synchronization response frame 197 and replace the one received from downstream. If any slave node 104 does not see a synchronization response frame 197 from a downstream slave node 104 at the expected time, the slave node 104 will generate its own synchronization response frame 197 and begin transmitting it upstream.

The data portion of the synchronization response frame 197 may include fields that contain data used to communicate response information back to the master node 102.

Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 104 to acknowledge a command received in the previous synchronization control frame 180 when that slave node 104 generates the synchronization response frame 197. Example indicators that may be communicated in the ACK field include wait, acknowledge, not acknowledge (NACK), and retry. In some embodiments, the ACK field may be sized to transmit an acknowledgment by a slave node 104 that it has received and processed a broadcast message (e.g., by transmitting a broadcast acknowledgment to the master node 102). In some such embodiments, a slave node 104 also may indicate whether the slave node 104 has data to transmit (which could be used, for example, for demand-based upstream transmissions, such as non-TDM inputs from a keypad or touchscreen, or for prioritized upstream transmission, such as when the slave node 104 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 104 that generates the synchronization response frame 197.

In some embodiments, the synchronization response frame 197 may include a data field. The data field may have any suitable length (e.g., 8 bits), and its value may depend on the type of transaction and the ACK response of the slave node 104 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 104 may indicate if the broadcast write was received without error), a discovery error (DER) indicator (indicating whether a newly discovered slave node 104 in a discovery transaction matches an existing slave node 104), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 104.

In some embodiments, the synchronization response frame 197 may include an IRQ node (IRQNODE) field. The IRQNODE field may have any suitable length (e.g., 4 bits) and may be used to transmit the ID of the slave node 104 that has signaled the interrupt presented by the IRQ field. In some embodiments, the slave node 104 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 104 that needs to signal an interrupt to the master node 102 will insert its interrupt information into these fields. In some embodiments, a slave node 104 with an interrupt pending may have higher priority than any slave node 104 further downstream that also has an interrupt pending. The last slave node 104 along the bus 106 (e.g., the slave node 2 in FIG. 1) may always populate these interrupt fields. If the last slave node 104 has no interrupt pending, the last slave node 104 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 180 will match it. Additionally or alternatively, the remainder of the synchronization response frame may be structured so that the synchronization sequence cannot occur, such as by placing fixed "0" or "1" values at appropriate bits.

Figure 7:
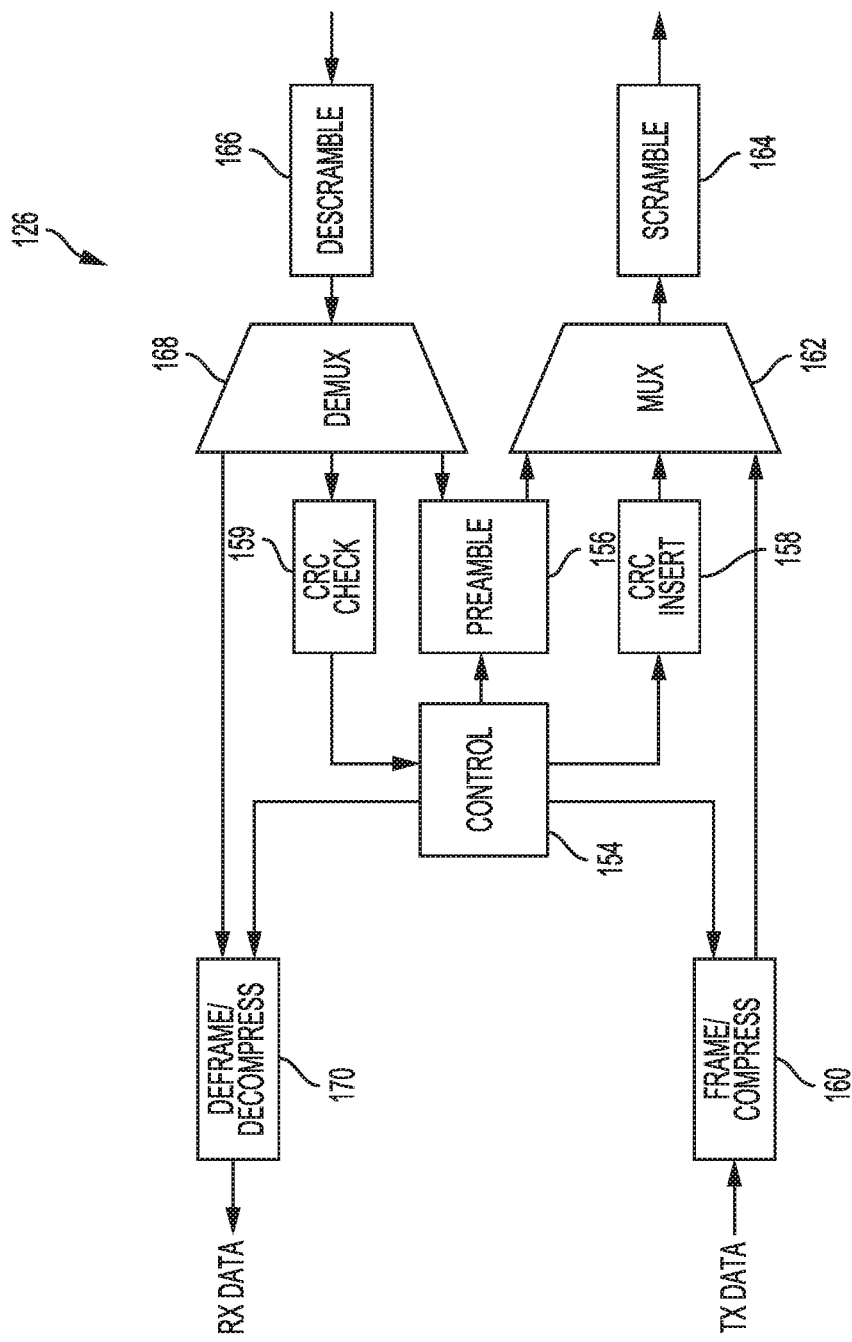
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 104 or from an I2C device when the bus protocol circuitry 126 is included in a master node 102), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102 every 1024 bits. As discussed above, one or more slave nodes 104 may synchronize to the downstream synchronization control frame preamble and generate local, phase-aligned master clocks from the preamble.

Cyclic redundancy check (CRC) insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127) and/or the I2C transceiver 129, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N−4 bits of data, where N is the size of the data to be transmitted over the bus 106. The use of data compression may be configured by the master node 102 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction-double error detection (SECDED)), optionally decompress the data, and may write the receive data to the I2S/TDM/PDM transceiver 127 (e.g., a frame buffer associated with the transceiver 127) and/or the I2C transceiver 129.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102, the values in these registers may be programmed into the control circuitry 154 by the host 110. When the control circuitry 154 is included in a slave node 104, the values in these registers may be programmed into the control circuitry 154 by the master node 102.

In some embodiments, the control circuitry 154 may include a downstream slots (DNSLOTS) register. When the node transceiver 120 is included in the master node 102, this register may hold the value of the total number of downstream data slots. This register may also define the number of data slots that will be used for combined I2S/TDM/PDM receive by the I2S/TDM/PDM transceiver 127 in the master node 102. In a slave node 104, this register may define the number of data slots that are passed downstream to the next slave node 104 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102. In a slave node 104, this register may define the number of data slots that the slave node 104 will use and not retransmit. Alternatively, this register may define the number of slots that the slave node 104 may contribute to the downstream data link 106.

In some embodiments, the control circuitry 154 may include an upstream slots (UPSLOTS) register. In the master node 102, this register may hold the value of the total number of upstream data slots. This register may also define the number of slots that will be used for I2S/TDM transmit by the I2S/TDM/PDM transceiver 127 in the master node 102. In a slave node 104, this register may define the number of data slots that are passed upstream before the slave node 104 begins to add its own data.

In some embodiments, the control circuitry 154 may include a local upstream slots (LUPSLOTS) register. This register may be unused in the master node 102. In a slave node 104, this register may define the number of data slots that the slave node 104 will add to the data received from downstream before it is sent upstream. This register may also define the number of data slots that will be used for combined I2S/TDM/PDM receive by the I2S/TDM/PDM transceiver 127 in the slave node 104.

In some embodiments, the control circuitry 154 may include a broadcast downstream slots (BCDNSLOTS) register. This register may be unused in the master node 102. In a slave node 104, this register may define the number of broadcast data slots. In some embodiments, broadcast data slots may always come at the beginning of the data field. The data in the broadcast data slots may be used by multiple slave nodes 104 and may be passed downstream by all slave nodes 104 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 104 is coupled to one or more speakers and/or one or more microphones as the peripheral device 108. This is simply illustrative, as any desired arrangement of peripheral device 108 may be coupled to any particular slave node 104 in accordance with the techniques described herein.

Figure 8:
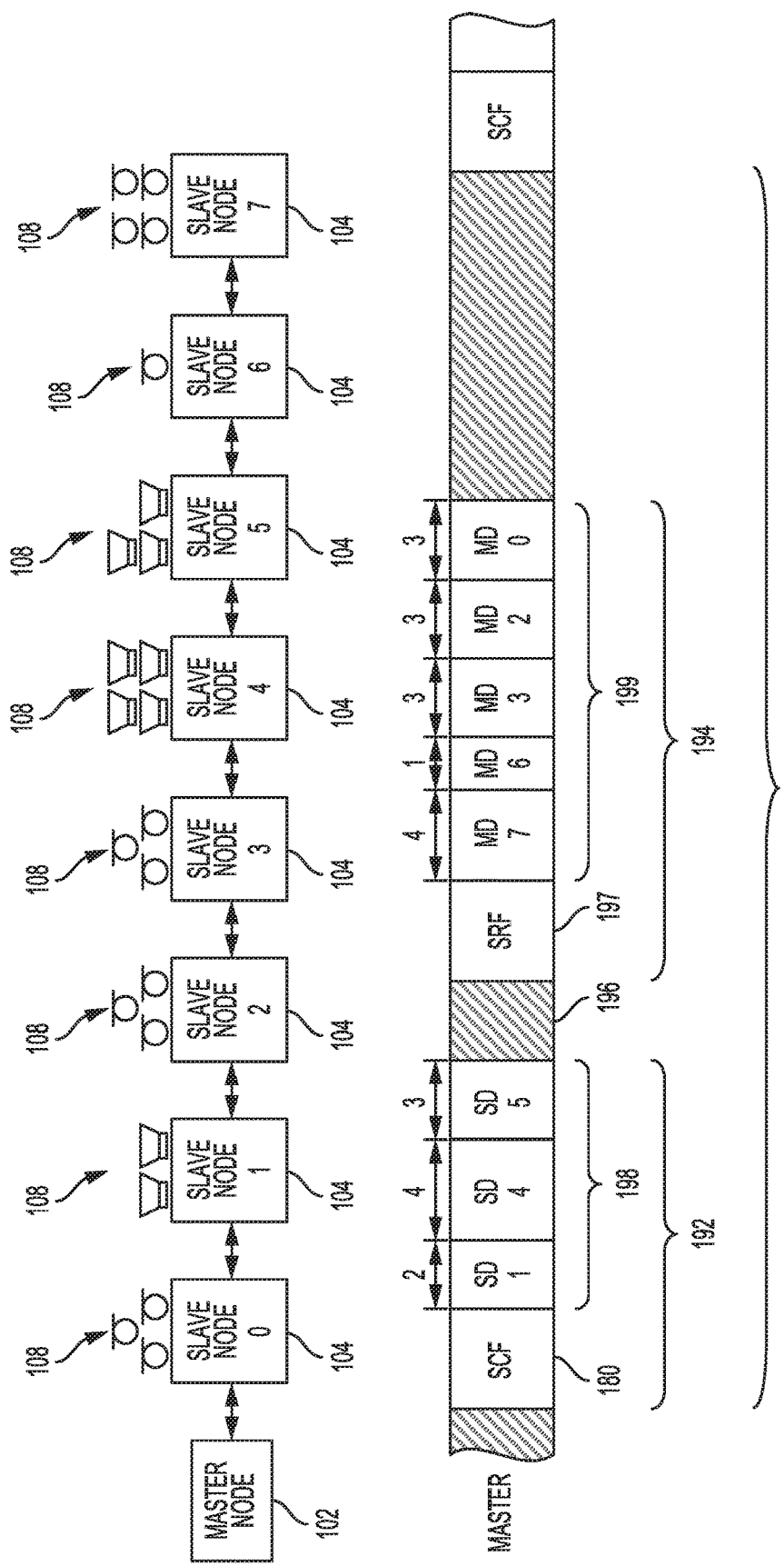
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 104 depicted in FIG. 8 have various numbers of sensor/actuator elements, and so different amounts of data may be sent to, or received from, the various slave nodes 104. Specifically, slave node 1 has two elements, slave node 4 has four elements, and slave node 5 has three elements, so the data transmitted by the master node 102 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 104 includes the corresponding number of time slots. It should be noted that there need not have to be a one-to-one correlation between elements and time slots. For example, a microphone array, included in the peripheral device 108, having three microphones may include a digital signal processor that combines signals from the three microphones (and possibly also information received from the master node 102 or from other slave nodes 104) to produce a single data sample, which, depending on the type of processing, could correspond to a single time slot or multiple time slots.

In FIG. 8, the master node 102 transmits a synchronization control frame (SCF) followed by data for speakers coupled to specific slave nodes 104 (SD). Each successive slave node 104 forwards the synchronization control frame and also forwards at least any data destined for downstream slave nodes 104. A particular slave node 104 may forward all data or may remove data destined for that slave node 104. When the last slave node 104 receives the synchronization control frame, that slave node 104 transmits the synchronization response frame (SRF) optionally followed by any data that the slave node 104 is permitted to transmit. Each successive slave node 104 forwards the synchronization response frame along with any data from downstream slave nodes 104 and optionally inserts data from one or more microphones coupled to the particular slave nodes 104 (MD). In the example of FIG. 8, the master node 102 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
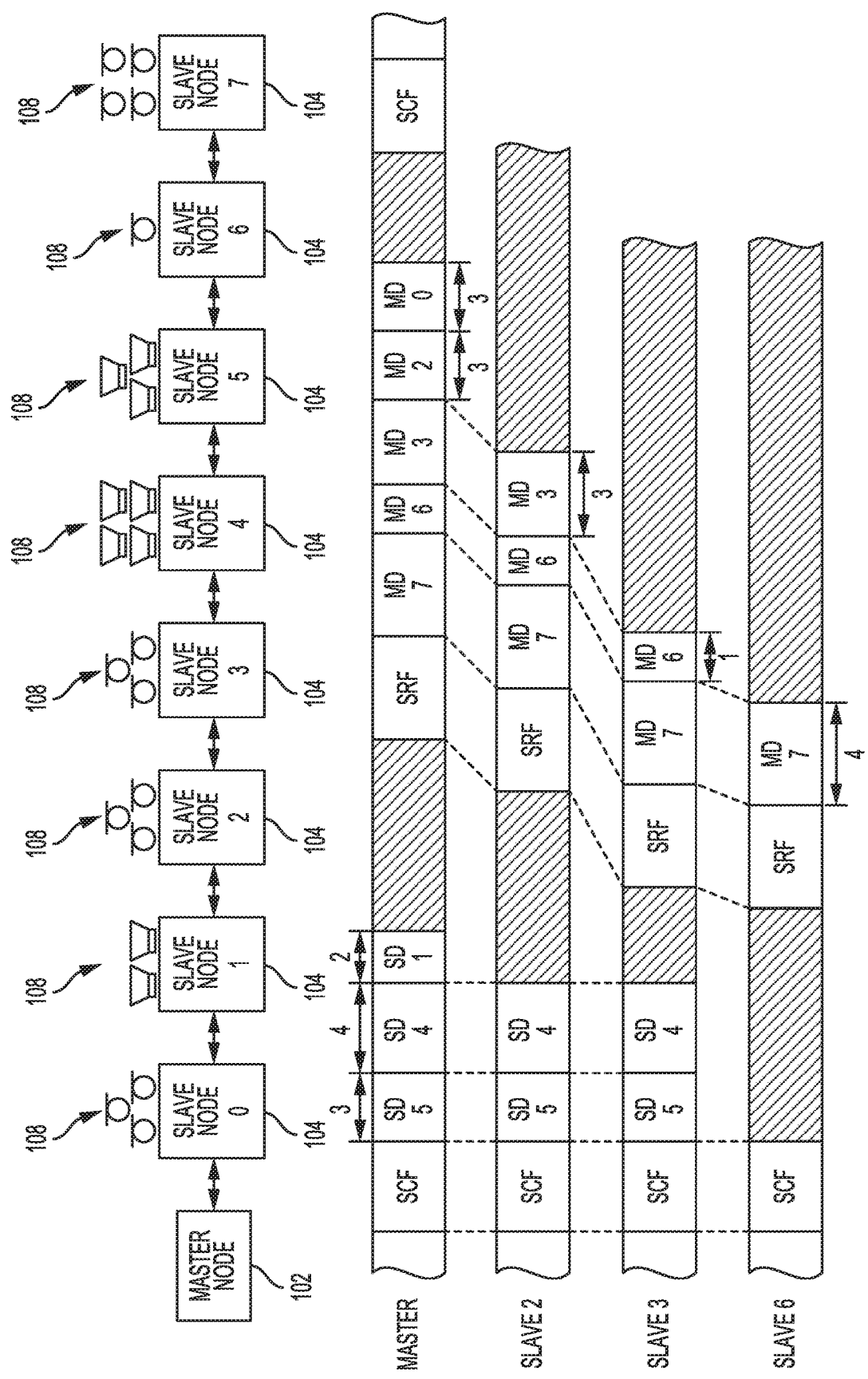

FIG. 9 schematically illustrates the dynamic removal of data from a downstream transmission and insertion of data into an upstream transmission, from the perspective of the downstream transceiver 124, in accordance with various embodiments. In FIG. 9, as in FIG. 8, the master node 102 transmits a synchronization control frame (SCF) followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the synchronization control frame followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the synchronization control frame followed by the data for slave node 5, and, similarly, slave node 5 removes its own data and forwards to slave node 6 only the synchronization control frame. Slave node 6 forwards the synchronization control frame to slave node 7 (see the row labeled SLAVE 6).

At this point, slave node 7 transmits to slave node 6 the synchronization response frame (SRF) followed by its data (see the row labeled SLAVE 6). Slave node 6 forwards to slave node 5 the synchronization response frame along with the data from slave node 7 and its own data, and slave node 5 in turn forwards to slave node 4 the synchronization response frame along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102 receives the synchronization response frame followed by the data from slave nodes 7, 6, 3, 2, and 0 (see the row labeled MASTER).

Figure 10:
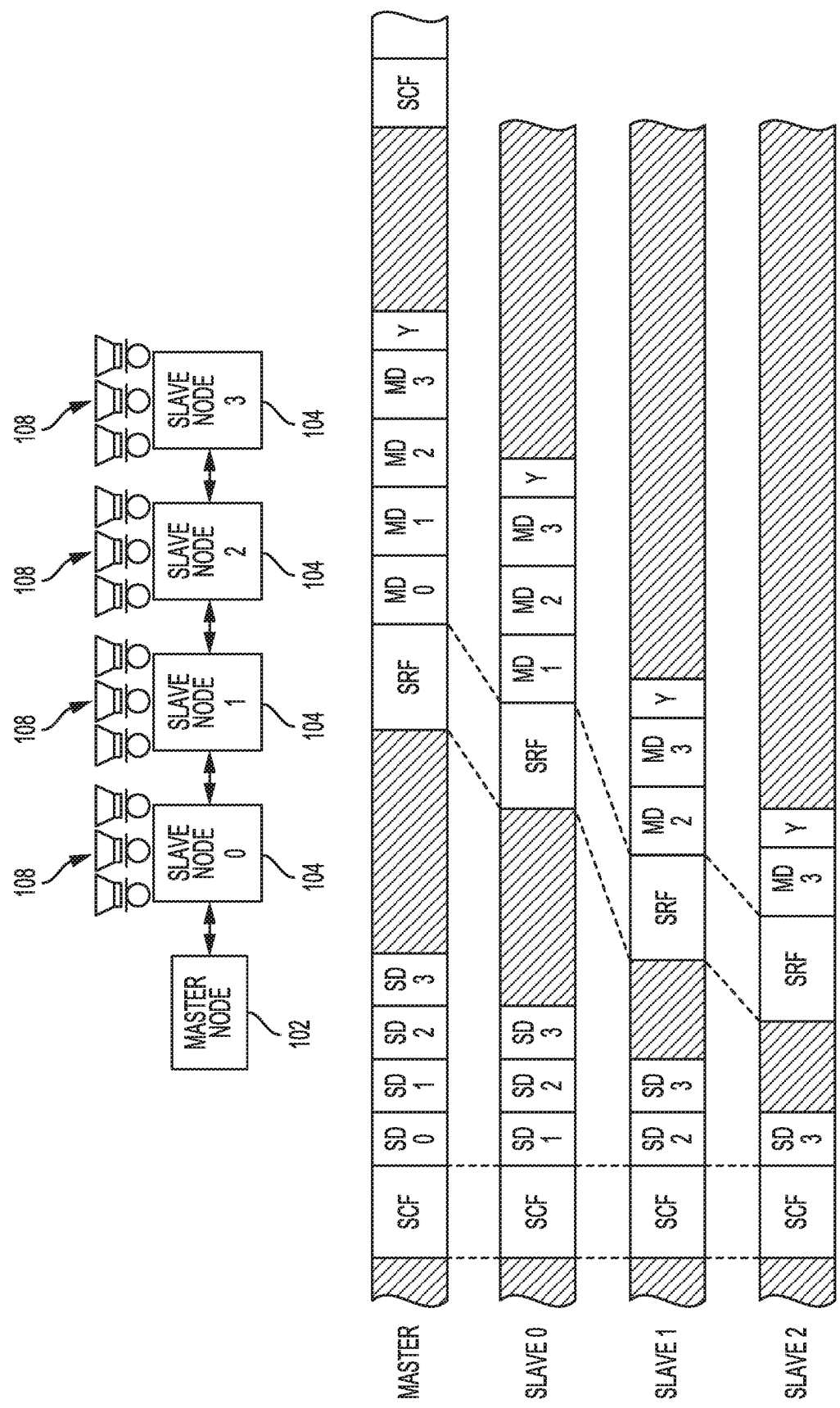

FIG. 10 illustrates another example of the dynamic removal of data from a downstream transmission and insertion of data into an upstream transmission, from the perspective of the downstream transceiver 124, as in FIG. 9, although in FIG. 10, the slave nodes 104 are coupled with both sensors and actuators as the peripheral device 108 such that the master node 102 sends data downstream to all of the slave nodes 104 and receives data back from all of the slave nodes 104. Also, in FIG. 10, the data is ordered based on the node address to which it is destined or from which it originates. The data slot labeled "Y" may be used for a data integrity check or data correction.

Figure 11:
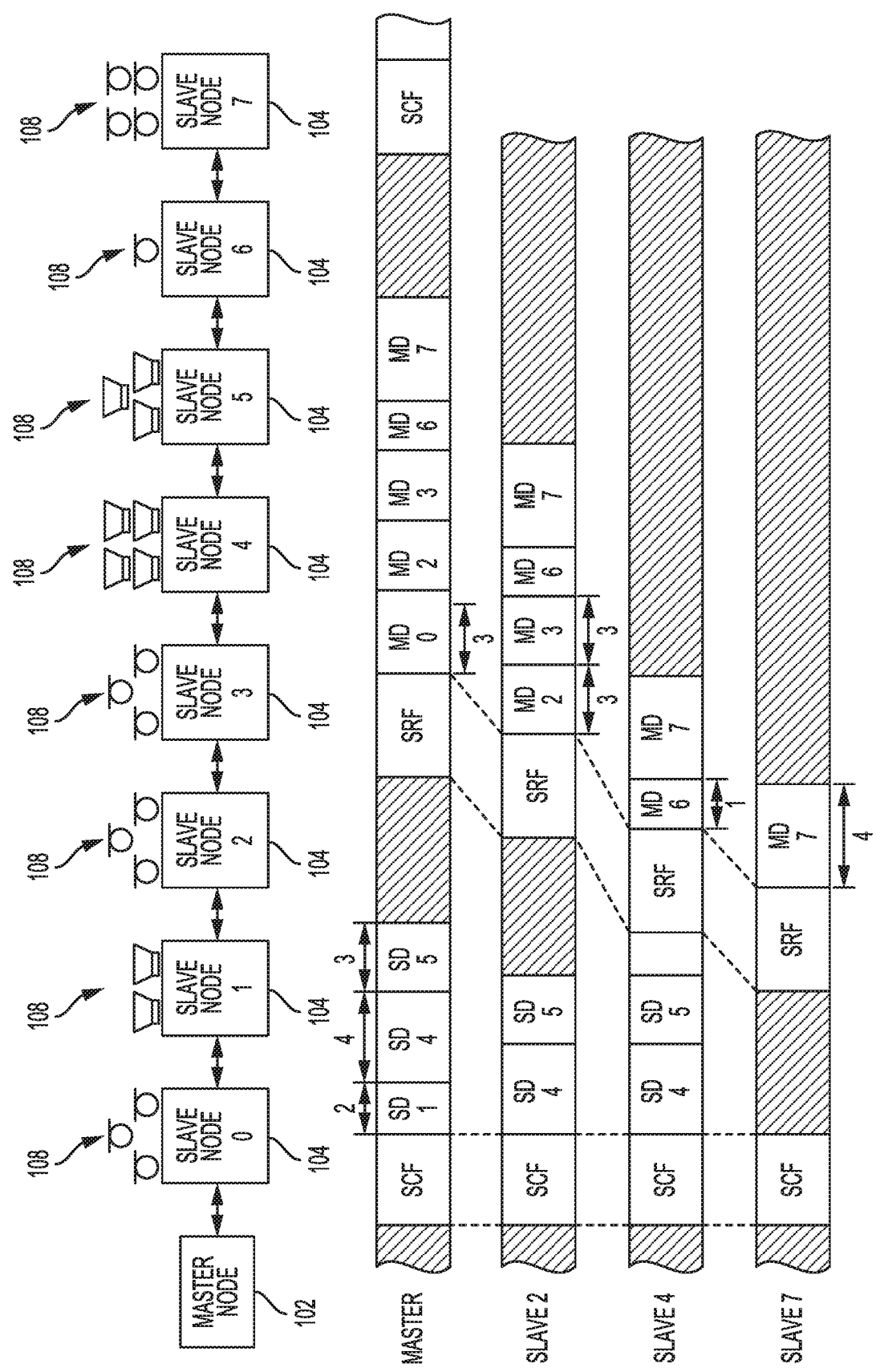

FIG. 11 illustrates another example of the dynamic removal of data from a downstream transmission and insertion of data into an upstream transmission, from the perspective of the downstream transceiver 124, as in FIG. 9, although in FIG. 11, the data is conveyed downstream and upstream in sequential order rather than reverse order. Buffering at each slave node 104 allows for selectively adding, removing, and/or forwarding data.

As discussed above, each slave node 104 may remove data from downstream or upstream transmissions and/or may add data to downstream or upstream transmissions. Thus, for example, the master node 102 may transmit a separate sample of data to each of a number of slave nodes 104, and each such slave node 104 may remove its data sample and forward only data intended for downstream slaves. On the other hand, a slave node 104 may receive data from a downstream slave node 104 and forward the data along with additional data. One advantage of transmitting as little information as needed is to reduce the amount of power consumed collectively by the system 100.

The system 100 may also support broadcast transmissions (and multicast transmissions) from the master node 102 to the slave nodes 104, specifically through configuration of the downstream slot usage of the slave nodes 104. Each slave node 104 may process the broadcast transmission and pass it along to the next slave node 104, although a particular slave node 104 may "consume" the broadcast message, (i.e., not pass the broadcast transmission along to the next slave node 104).

The system 100 may also support upstream transmissions (e.g., from a particular slave node 104 to one or more other slave nodes 104). Such upstream transmissions can include unicast, multicast, and/or broadcast upstream transmissions. With upstream addressing, as discussed above with reference to downstream transmissions, a slave node 104 may determine whether or not to remove data from an upstream transmission and/or whether or not to pass an upstream transmission along to the next upstream slave node 104 based on configuration of the upstream slot usage of the slave nodes 104. Thus, for example, data may be passed by a particular slave node 104 to one or more other slave nodes 104 in addition to, or in lieu of, passing the data to the master node 102. Such slave-slave relationships may be configured, for example, via the master node 102.

Thus, in various embodiments, the slave nodes 104 may operate as active/intelligent repeater nodes, with the ability to selectively forward, drop, and add information. The slave nodes 104 may generally perform such functions without necessarily decoding/examining all of the data, since each slave node 104 knows the relevant time slot(s) within which it will receive/transmit data, and hence can remove data from or add data into a time slot. Notwithstanding that the slave nodes 104 may not need to decode/examine all data, the slave nodes 104 may typically re-clock the data that it transmits/forwards. This may improve the robustness of the system 100.

Figure 12:
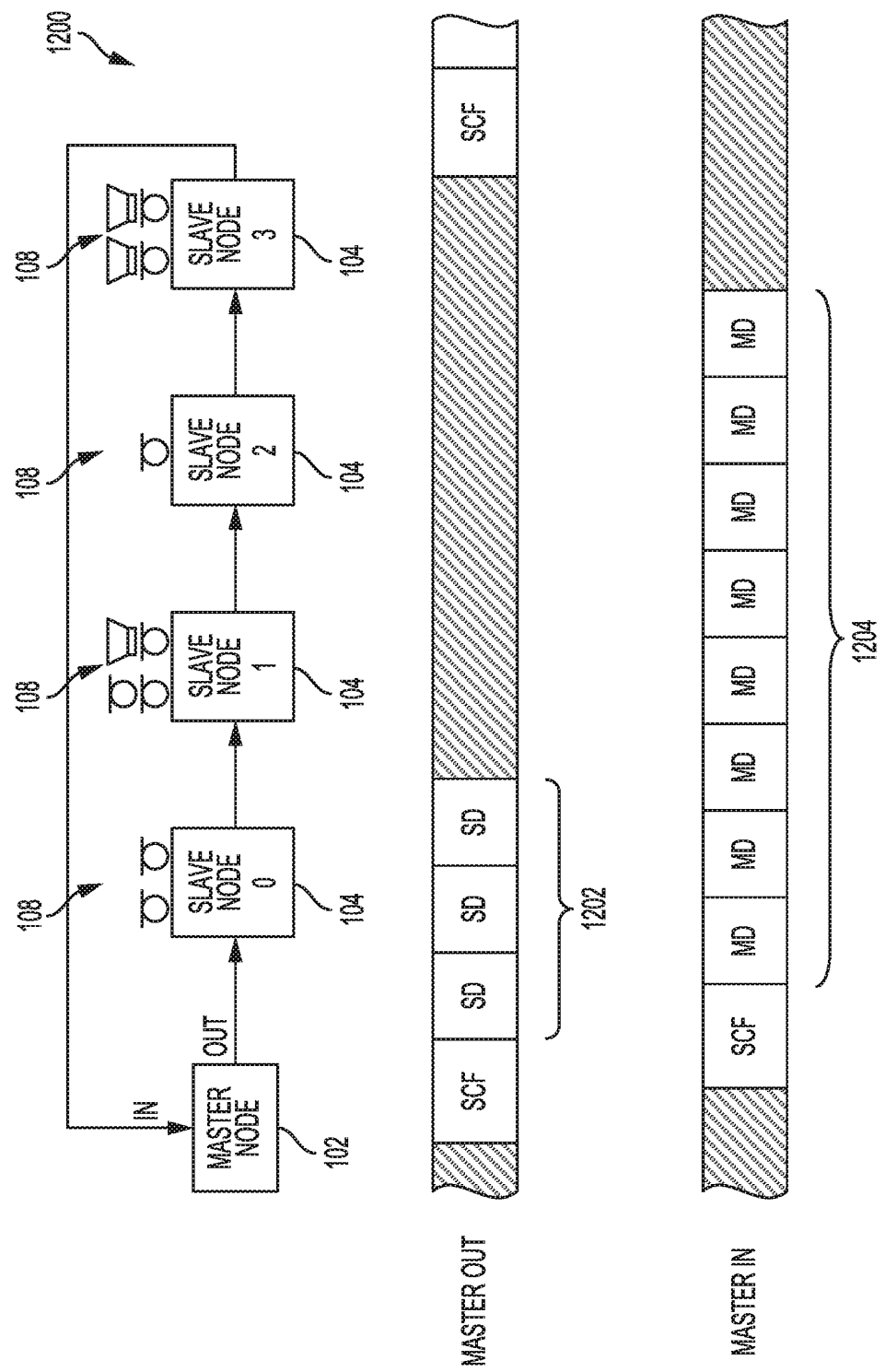
FIG. 12 illustrates a ring topology for the two-wire bus and a uni-directional communication scheme thereon, in accordance with various embodiments.

In some embodiments, the bus 106 may be configured for uni-directional communications in a ring topology. For example, FIG. 12 illustrates an arrangement 1200 of the master node 102 and four slave nodes 104 in a ring topology, and illustrates signaling and timing considerations for uni-directional communication in the arrangement 1200, in accordance with various embodiments. In such embodiments, the transceivers 120 in the nodes may include a receive-only transceiver (MASTER IN) and a transmit-only transceiver (MASTER OUT), rather than two bi-directional transceivers for upstream and downstream communication. In the link-layer synchronization scheme illustrated in FIG. 12, the master node 102 transmits a synchronization control frame (SCF) 180, optionally followed by "downstream" data 1202 for the three speakers coupled to various slave nodes 104 (the data for the different speakers may be arranged in any suitable order, as discussed above with reference to FIGS. 8-11), and each successive slave node 104 forwards the synchronization control frame 180 along with any "upstream" data from prior slave nodes 104 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 104 or downstream (e.g., using the data slots 198) by a slave node 104 or a master node 102. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 104); accesses to registers of the slave nodes 104 (e.g., for discovery and configuration of slots and interfaces) that may include write access from the host 110/master node 102 to a slave node 104 and read access from a slave node 104 to the host 110/master node 102; and event signaling via interrupts from a peripheral device 108 to the host 110. In some embodiments, GPIO pins may be used to convey information from a slave node 104 to the master node 102 (e.g., by having the master node 102 poll the GPIO pins over I2C, or by having a node transceiver 120 of a slave node 104 generate an interrupt at an interrupt request pin). For example, in some such embodiments, a host 110 may send information to the master node 102 via I2C, and then the master node 102 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
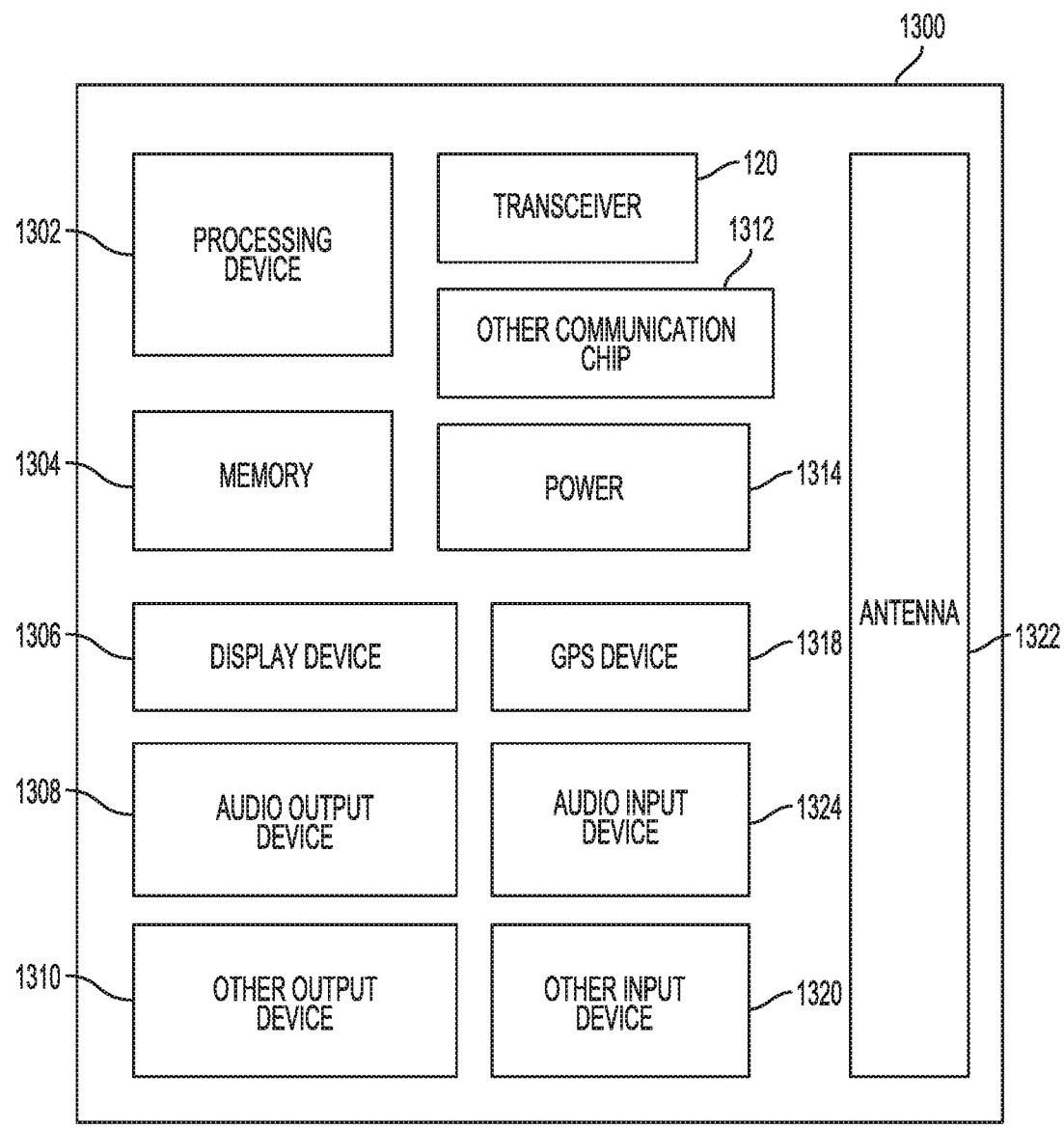
FIG. 13 schematically illustrates a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102, or a slave node 104) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more digital signal processors (DSPs), application-specific integrated circuits (ASICs), central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as GPS, EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream filtering circuitry 132 and the downstream filtering circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a global positioning system (GPS) device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102 or a slave node 104).

Decimation to Support Lower Sample Rates and Using Multiple Slots to Support Higher Sample Rates In some embodiments, the nodes of the bus 106 may support a single high-bandwidth audio sample rate (e.g., 44.1 kHz-48 kHz). However, many digital audio signals may not always require the full audio spectrum supported by the bus 106. For instance, some audio noise cancellation applications may not require full bandwidth for some of the audio signals being transmitted over the bus 106. By decimating signals that do not require full bandwidth, multiple channels may be "packed" within a single audio stream and distributed independently to different slave nodes 104 along the bus 106. For example, a decimated audio stream may include multichannel noise-canceling streams, multichannel active sound audio, or other lower bandwidth streams. Sampling rates lower than 40 kHz may be adequate for transmission of human speech, lower-quality audio, and FM radio, for example.

Within an isochronous digital audio network (e.g., the bus 106), conventional approaches to providing multiple streams of audio usually require that all streams be provided at a sample rate selected by the needs of the highest audio bandwidth channel. All other channels may be forced to maintain that same high sample audio rate, and therefore digital throughput may be wasted if that high sample audio rate is not necessary. Given that the overall digital bus throughput is limited, this conventional redundancy can lower the number of possible channels to transmit.

If audio is instead decimated, the bus 106 may allow multiple channels of audio to be transmitted within a single audio slot by multiplexing the stream at the master node 102 and selectively listening to or receiving one or more of the channels at the slave nodes 104.

If a digital audio signal requires a higher sample rate than the superframe rate of the bus 106, it is also possible to use the bus 106 to support the higher sample rate by transmitting the audio signal over multiple channels (e.g., in multiple data slots within a single superframe 190). For instance, a slave node 104 may use multiple data slots to transmit at a higher sample rate than the superframe rate (e.g., two data slots to double the superframe rate, four data slots to quadruple the superframe rate, etc.). Sampling rates greater than 48 kHz may be desirable for higher-quality audio (e.g., professional audio) and DVD audio, for example.

In order to support two times and four times sampling rates in a slave node 104, the master node 102 may use two and four times the amount of TDM data channels at its sampling frequency interface to the host 110. To increase the sample rate, multiple whole channels and/or fractions of a channel may be used.

Figure 14:
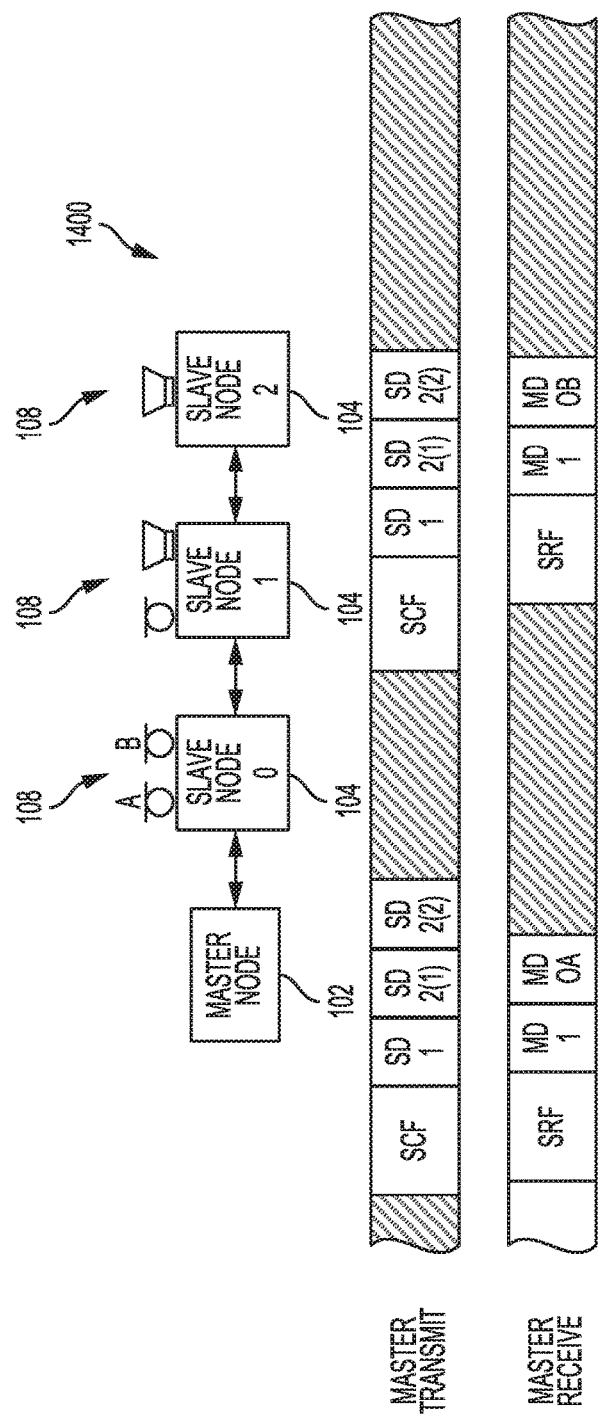
FIG. 14 illustrates example of information exchange along a two-wire bus, in accordance with various embodiments of the bus protocols described herein.

In some embodiments, data for a single peripheral device 108 (associated with a slave node 104) may occupy multiple ones of the downstream data slots 198. This data may be, for example, audio data. In some embodiments, data from a single peripheral device 108 (associated with the slave node 104) may occupy multiple ones of the upstream data slots 199. For example, FIG. 14 illustrates an example of information exchange along the two-wire bus 106, in accordance with various embodiments of the bus protocols described herein. As shown in the "MASTER TRANSMIT" row of FIG. 14, one downstream data slot may be occupied by speaker data destined for the speaker associated with the slave node 1, and two downstream data slots (SD2(1) and SD2(2)) may be occupied by speaker data destined for the speaker associated with slave node 2. Thus, the speaker associated with slave node 2 may receive data at twice the rate of the speaker associated with slave node 1. Analogous use of multiple data slots may occur in the upstream data slots 199.

In some embodiments, a particular data slot in the upstream data slots 199 of a first superframe 190 may include data from a first peripheral device, while that particular data slot in the upstream data slots 199 of a second superframe 190 may include data from a second, different peripheral device. For example, as shown after the first synchronization response frame in the "MASTER RECEIVE" row of FIG. 14, the first upstream data slot may be occupied by microphone data from the microphone associated with slave node 1, and the second upstream data slot may be occupied by microphone data from microphone A associated with slave node 0 (MDOA). As shown after the second synchronization response frame in the "MASTER RECEIVE" row of FIG. 14, the first upstream data slot may again be occupied by microphone data from the microphone associated with slave node 1, but the second upstream data slot may be occupied by microphone data from microphone B associated with slave node 0 (MDOB). Thus, the microphone associated with slave node 1 may provide data on the bus 106 at twice the rate of the microphones associated with slave node 104. Analogous use of multiple data slots may occur in the downstream data slots 198. Although FIG. 14 illustrates an example in which multiple peripheral devices associated with a same slave node share a particular upstream data slot, multiple peripheral devices associated with different slave nodes may share a particular upstream data slot in some embodiments.

As noted above, a slave node 104, coupled with a peripheral device 108 via an I2S/TDM bus (e.g., using the I2S/TDM/PDM transceiver 127 of the node transceiver 120), may communicate with the peripheral device 108 at a rate less than the superframe rate. A setting in the slave node 104 may determine by what factor the slave-peripheral communication is reduced relative to the superframe rate (e.g., a factor of two, a factor of four, etc.), and multiple peripheral devices 108 (or multiple channels to a single peripheral device 108) coupled to the slave node 104 may share a communication slot between the slave node 104 and the master node 102 by time division multiplexing (e.g., two peripheral devices 108 may alternate putting data in a given communication slot between the master node 102 and the slave node 104). In some embodiments, when a "reduced data rate" peripheral device 108 takes a long time to transmit data back to the slave node 104 when the data rate is reduced, the slave node 104 may transmit a SYNC signal to the peripheral device 108 at an integer number of superframes in advance of the time at which the data should be transmitted to the master node 102 (with the integer stored at the slave node 104).

In some embodiments, the I2S/TDM/PDM transceiver 127 of the node transceiver 120 may run at a reduced rate relative to the superframe rate. For example, allowable reduced rates at a 48 kHz superframe rate may include 24 kHz, 12 kHz, 6 kHz, 4 kHz, 3 kHz, 2.4 kHz, 2 kHz, 1.71 kHz, and 1.5 kHz. The node transceiver 127 may send data received by the I2S/TDM/PDM transceiver 127 upstream or downstream. The I2S/TDM/PDM transceivers 127 of different ones of the slave nodes 104 may run at different rates. In some embodiments, the I2S/TDM/PDM transceiver 127 of the master node 102 may run at the highest data rate in the system 100.

In some embodiments, the data slots on the bus 106 may be configured to be run at a full, continuous audio rate (e.g., 48 kHz) or to be run at a reduced rate by skipping data slots for superframes 190 that don't contain data (e.g., when there are only "reduced sampling rate" microphone nodes as peripheral devices 108 in the system 100). This approach may save power by reducing the activity level on the bus 106 without increasing channel bandwidth on the bus 106.

In some embodiments, the data slots on the bus 106 may be configured to be run at a full, continuous audio rate or to be run at a reduced rate by time-dividing bus data slots for a particular slave node 104 into multiple I2S/TDM channels without skipping data slots for superframes 190. This approach may be advantageous when different types of peripheral devices 108 are coupled to slave nodes 104 along the bus 106 (e.g., a multi-axis accelerometer coupled to one slave node 104, a microphone or amplifier node coupled to another slave node 104, etc.). This approach may increase channel bandwidth on the bus 106 and save some power.

A node on the bus 106 may include one or more registers (e.g., in the memory 1304) for storing configuration information related to reduced rate operation. For example, an I2SRRATE register may define a field, RRDIV, which may be used to divide the superframe rate down to the reduced I2S rate. For example, as discussed above, with a 48 kHz superframe rate, RRDIV may be set for a reduced rate of 24 kHz, 12 kHz, 6 kHz, 4 kHz, 3 kHz, 2.4 kHz, 2 kHz, 1.71 kHz, or 1.5 kHz in some embodiments. The I2SRRATE register may also include a control bit, RBUS, which may be used to enable reduced rate data slots on the bus 106. In some embodiments, the I2SRRATE register may be defined as Master Only, Auto-Broadcast to ensure that the value is the same within all nodes of a bus, while in other embodiments, this need not be the case.

An I2SRATE register may include a field (e.g., a 3-bit field) used to select the slave node I2S/TDM rate as an integer multiple of the superframe rate or is a fraction of the superframe rate. The I2SRATE register may also include a REDUCE bit used to control the handling of RX data in an increased rate slave node 104 by nailing reduction or duplication of I2S/TDM data to meet the superframe rate. A SHARE field may allow the enabling of the sharing of data slots on the bus 106.

An I2SRRCTL register may provide bits used to allow a processing device 1302 of a node to track a full-rate frame that contains new reduced-rate samples. Setting an ENV-LSB bit in the I2SRRCTL register may result in the least significant bit (LSB) of each data channel being set when a new sample is being transmitted and cleared otherwise. Setting an ENXBIT bit in the I2SRRCTL register may result in an extra bit being utilized after the data word's LSB of each data channel. This extra bit may be set when a new sample is being transmitted and cleared otherwise. In some embodiments, data word length may be smaller than the channel widths (e.g., a 24-bit data word in a 32-bit I2S channel), and this extra bit may indicate new samples (while the remaining bits in the channel may still indicate erroneous data). Setting an ENSTRB bit in the I2SRRCTL register may configure the ADR1 pin as a strobe that indicates the frame where reduced rate data is updated. Setting an ENCHAN bit in the I2SRRCTL register may, for a "full-rate" node, configure the node to produce an extra I2S/TDM data channel to indicate the frame where reduced rate data is updated.

An I2SRRSOFFS register may provide fields used to move the SYNC edge in a reduced-rate slave node 104 by superframe increments. The RRSOFFSET field of the I2SRRSOFFS register may store a value used to move the SYNC edge of a reduced-rate slave node 104 earlier in time by a number of superframes. This register may be used to minimize the latency of reduced-rate data being transferred across the bus 106 when I2S/TDM RECEIVE data requires more than one superframe 190 of access time. In some embodiments, in a reduced-rate slave node 104, the active SYNC edge may occur two superframes 190 before the data should be transmitted to the host 110 or other processor. Setting RRSOFFSET to N may cause the SYNC edge to occur N superframes earlier. The receive data may still be transmitted on the bus 106 in the same superframe 190 regardless of the RRSOFFSET value.

Transmitting Auxiliary Power and Battery Power

As discussed above, the slave nodes 104 may be locally powered by their own power source and/or may extract power from the bus 106. In some embodiments, a slave node 104 may extract auxiliary output power for powering an amplifier associated with the slave node 104 as a peripheral device 108 to create enough audio by the amplifier (and possibly in combination with other amplifiers connected to the same or different slave nodes 104) to power speakers. The amplifier may be "intelligent" (e.g., with its own digital signal processing capability) or not (e.g., without digital signal processing).

Transmitting auxiliary power via the bus 106 may be particularly advantageous in emergency situations in which the primary local power source for a slave node 104 fails; in a vehicle, for example, warning messages and other alerts may still be transmitted over the audio system. Extracting auxiliary power from the bus 106 may also eliminate the cost associated with connection and wiring of a local power source to the slave node 104 (associated with, e.g., an active speaker).

Additionally, in embodiments in which the bus 106 delivers power to the slave nodes 104, the bus 106 may provide current that supports local power storage (e.g., to charge one or more batteries, capacitors, super capacitors) and thereby reduces or removes the need for additional local or Phantom power to power a peripheral device 108 associated with a slave node 104 (e.g., an audio amplifier). In some embodiments, the limited power coming from the bus 106 may be used to feed a slave node 106 having a local energy storage device, with the energy storage device providing the necessary energy during times of peak power demand while being charged at times of low power demand. This may be particularly advantageous when applied to audio signals having a high Crest factor. In some embodiments, a local battery may also be useful in locally powered slave nodes 104 (e.g., to reduce the wire diameter for the local power supply).

Figure 15:
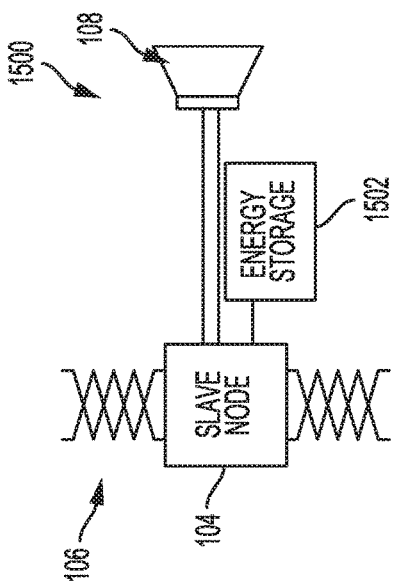
FIG. 15 is a block diagram of an arrangement in which a slave node is coupled to an energy storage device and a peripheral device, in accordance with various embodiments.

FIG. 15 is a block diagram of an arrangement 1500 in which a slave node 104 is coupled to an energy storage device 1502 and a peripheral device 108 (e.g., a speaker). In some embodiments, the slave node 104 may extract power from the bus 106 (e.g., as discussed above with reference to FIGS. 1 and 2), and may use that power to, at least in part, store energy in the energy storage device 1502. The energy storage device 1502 may include any suitable energy storage device, such as a capacitor or a battery. In particular, the node transceiver 120 (not shown) of the slave node 104 may include power circuitry 1314 to receive a voltage bias over the bus 106 and provide energy from the voltage bias to the energy storage device 1502. The slave node 104 may selectively use the energy storage device 1502 to drive the speaker 108. In some embodiments, the slave node 104 may selectively use the energy storage device 1502 to drive power onto the bus 106 to provide power to another slave node 104. The energy storage device 1502 may connect to an amplifier, a transceiver, and/or other components or peripheral devices 108 (e.g., a digital signal processor, ADC, DAC, battery management circuitry, etc.).

Nodes Having Both a Speaker and a Microphone as Peripheral Devices

In some embodiments, a slave node 104 may be associated with a speaker as a peripheral device 108 (using mostly downstream communication), a microphone as a peripheral device 108 (using mostly upstream communication), or a combination of a speaker and a microphone (using both upstream and downstream communication as supported by the bus 106). The number of speakers and microphones for a slave node 104 may vary depending on the application, and may be any suitable combination. A number of examples of slave nodes 104 associated with both speakers and microphones as peripheral devices are discussed herein. In some of these embodiments, peripheral device communication circuitry (such as the I2S/TDM/PDM transceiver 127, the I2C transceiver 129, or one or more GPIO pins with interrupt request capability) of a node transceiver 120 of a slave node 104 may communicate with at least one speaker and at least one microphone. The host 110 may push data onto the bus 106 (via the master node 102) to communicate with these devices and/or receive data from the bus 106 (via the master node 102) from these devices.

Sensing in Collisions

In some embodiments in which the system 100 is included in a vehicle, the bus 106 may provide a digital network as an aid to understand vehicle integrity and level of an accident during collisions. Microphones and/or other sensors (included in the peripheral device 108) may be used to sense the state of the environment near the associated slave node 104, and the sensed information may be transmitted upstream or downstream to an application that wishes to gather information relating to the safety and integrity of the vehicle. Examples of other senses may include ultrasonic sensors, visual sensors, or electromechanical sensors (e.g., accelerometers and gyroscopes), among others.

Conferencing Systems

In some embodiments, the system 100 may distribute audio sampled by a microphone associated with one slave node 104 (or multiple slave nodes 106) to a speaker associated with another slave node 104 (or multiple other slave nodes 104). For instance, the bus 106 may distribute acquired local microphone information around a vehicle (e.g., cars, limousines, coaches, mini-vans, airplanes, etc.) so that audio communication can be provided between passenger and driver, driver to rear seat, or between any pair of locations. Some embodiments of the system 100 may broadcast audio, sampled by a microphone associated with any one of the slave nodes 104, to many other slave nodes 104 in an audio network provided by the bus 106. The bus 106 may also transmit any other data between any suitable two points (e.g., messages, data files, content streams, etc.).

In some embodiments, a slave node 104 may include peripheral device communication circuitry (such as the I2S/TDM/PDM transceiver 127, the I2C transceiver 129 of the node transceiver 120, or one or more GPIO pins with interrupt request capability) to communicate with a microphone and a conferencing user interface element (e.g., as peripheral devices 108). A user may actuate the conferencing user interface element when the user wishes to provide audio from the microphone to another device coupled to the bus 106. The conferencing user interface element may be, for example, a button, a gesture recognition device, a microphone (e.g., coupled to a processing device that can perform speech recognition tasks to recognize commands to begin and end conferencing), or a designated portion of a touchscreen display. Upon actuation of the conferencing user interface element by a user, the slave node 104 may provide data from the microphone upstream and/or downstream on the bus 104 for receipt and/or playback by one or more other devices (e.g., nodes or the host 110). In some embodiments, the host 110 may receive the microphone data and may route it to another slave node 104 on the bus 106 for playback. The slave node 104 may also provide routing data in response to actuation of the conferencing user interface element to indicate the source of the microphone data and/or the desired destination(a) for the microphone data.

Figure 16:
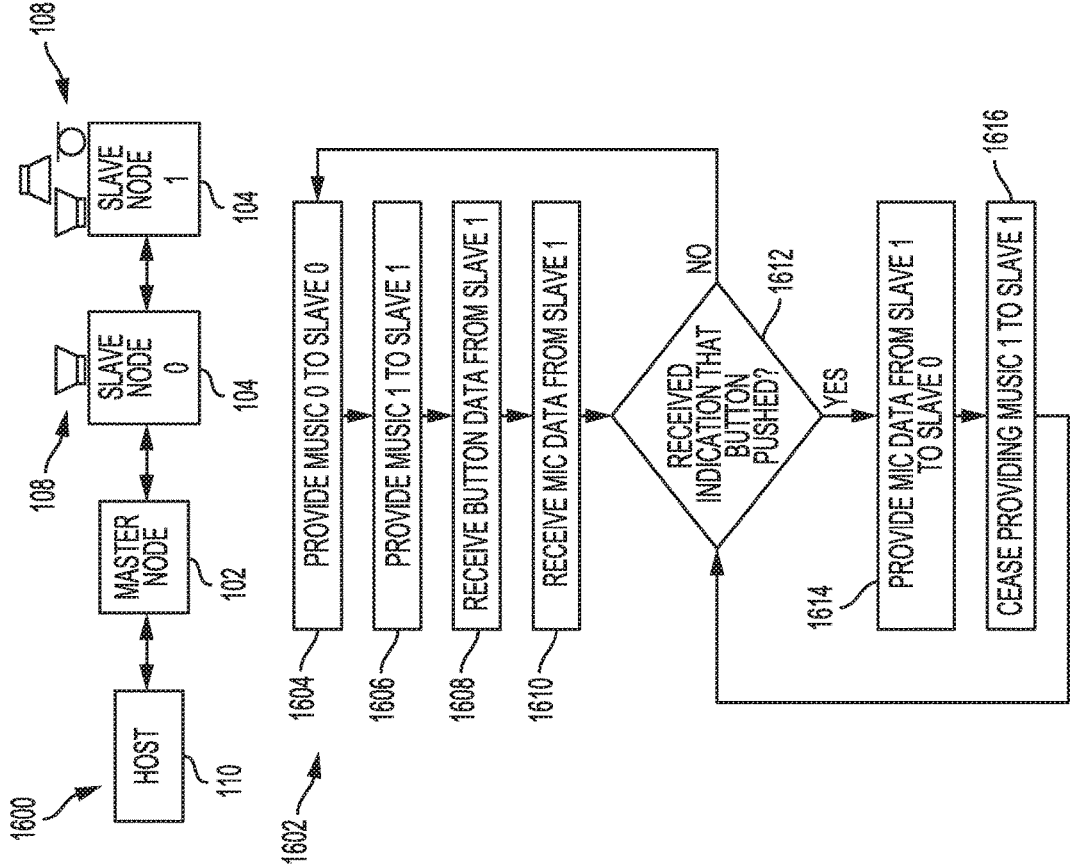
FIG. 16 depicts an embodiment of the system of FIG. 1 along with a flow diagram of a method that may be performed by a host to selectively route audio around the system.

For example, FIG. 16 depicts an arrangement 1600 of a host 110, a master node 102, and two slave nodes 104 and their associated peripheral devices 108, along with a flow diagram of a method 1602 that may be performed by the host 110 of the arrangement 1600 to selectively route audio around the arrangement 1600. In the arrangement 1600, a slave node 0 may be associated with a single speaker, while the slave node 1 may be associated with a speaker, a microphone, and a button that acts as the conferencing user interface element discussed above. The method 1602 may represent a "host-centric" approach to the routing of data within the arrangement 1600.

At 1604, the host 110 may provide music 0 to slave node 0. Music 0 is representative of any desired data stream that is routed to slave node 0 during "nominal" operation. In some embodiments, music 0 may be video data, speech data, or any other suitable data. The host 110 may provide music 0 to slave node 0 at 1604 over the bus 106 via the master node 102 using any of the bus protocols disclosed herein.

At 1606, the host 110 may provide music 1 to slave node 1. Music 1 is representative of any desired data stream that is routed to slave node 1 during "nominal" operation. In some embodiments, music 1 may be video data, speech data, or any other suitable data. The host 110 may provide music 1 to slave node 1 at 1606 over the bus 106 via the master node 102 using any of the bus protocols disclosed herein.

At 1608, the host 110 may receive button data from slave node 1. The button data may indicate a state of the button (e.g., whether the button has been depressed by a user). The host 110 may receive button data from slave node 1 at 1608 over the bus 106 via the master node 102 using any of the bus protocols disclosed herein.

At 1610, the host 110 may receive microphone data from slave node 1. The microphone data may be audio data captured by the microphone associated with slave node 1 as a peripheral device 108. The host 110 may receive microphone data from slave node 1 at 1610 over the bus 106 via the master node 102 using any of the bus protocols disclosed herein.

At 1612, the host 110 may determine whether the button data received at 1608 indicates that the button has been pushed by a user. If the host 110 determines at 1612 that the button has not been pushed, the host 110 may return to 1604 and continue to provide music 0 to slave node 0.

If the host 110 determines at 1612 that the button has been pushed, the host 110 may proceed to 1614 and provide the microphone data from slave node 1 to slave node 0. The host 110 may provide the microphone data to the slave node 1 instead of the music 1, interrupting the music 1 for the microphone data. The slave node 1 may provide the microphone data to its associated speaker, thus providing the audio collected by the microphone associated with slave node 1 to the speaker associated with slave node 0. The host 110 may provide the microphone data to slave node 1 at 1614 over the bus 106 via the master node 102 using any of the bus protocols disclosed herein.

At 1616, the host 110 may cease providing music 1 to slave node 1 (to quiet the speaker associated with slave node 1 while the microphone associated with slave node 1 is transmitting its data to other devices on the bus), and then may return to 1612 to determine whether the button is still being pushed. In some embodiments, the host 110 may reduce the volume of music 1 at 1616, instead of ceasing its provision. In some embodiments, the host 110 may mute the volume of music 1 at 1616, instead of ceasing its provision.

Figure 17:
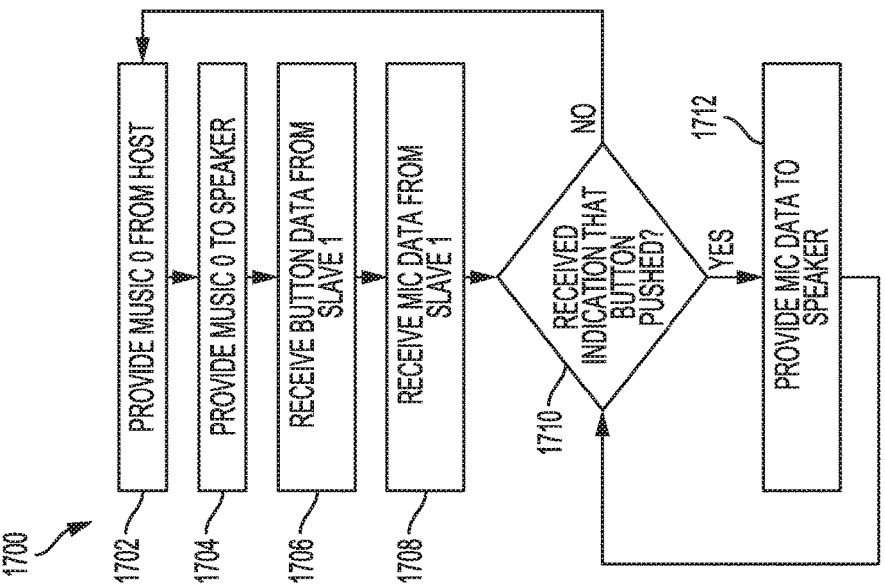
FIG. 17 is a flow diagram of a method that may be performed by a slave node during the selective routing of audio around the system depicted in FIG. 16, in accordance with various embodiments.

FIG. 17 is a flow diagram of a method 1700 that may be performed by the slave node 0 of the arrangement 1600 of FIG. 16 during the selective routing of audio around the arrangement 1500, in accordance with various embodiments. The method 1700 may represent a "slave-centric" approach to the routing of data within the arrangement 1600.

At 1702, the slave node 0 may receive music 0 from the host 110. As discussed above with reference to 1604, music 0 is representative of any desired data stream that is routed to slave node 0 during "nominal" operation. In some embodiments, music 0 may be video data, speech data, or any other suitable data. The host 110 may provide music 0 to slave node 0 at 1702 over the bus 106 via the master node 102 using any of the bus protocols disclosed herein.

At 1704, the slave node 0 may provide music 0 to the speaker associated with slave node 0 as a peripheral device 108. In response, the speaker may output music 0 as an audible signal.

At 1706, the slave node 0 may receive button data from slave node 1. The button data may indicate a state of the button associated with the slave node 1 (e.g., whether the button has been depressed by a user). In some embodiments, the slave node 0 may receive the button data directly from slave node 1 over the bus 106 (e.g., without the data having to go to the master node 102 first). In some embodiments, the slave node 0 may receive the button data from slave node 1 via the master node 102 and/or via the host 110. Generally, the slave node 0 may receive button data from slave node 1 at 1706 using any of the bus protocols disclosed herein.

At 1708, the slave node 0 may receive microphone data from slave node 1. The microphone data may be audio data captured by the microphone associated with slave node 1 as a peripheral device 108. In some embodiments, the slave node 0 may receive the microphone data directly from slave node 1 over the bus 106 (e.g., without the data having to go to the master node 102 first). In some embodiments, the slave node 0 may receive the microphone data from slave node 1 via the master node 102 and/or via the host 110. Generally, the slave node 0 may receive the microphone data from slave node 1 at 1708 using any of the bus protocols disclosed herein.

At 1710, the slave node 0 may determine whether the button data received at 1706 indicates that the button has been pushed by a user. If the slave node 0 determines at 1710 that the button has not been pushed, the slave node 0 may return to 1702 and continue to receive music 0 from the host 110.

If the slave node 0 determines at 1710 that the button has been pushed, the slave node 0 may proceed to 1712 and provide the microphone data to the speaker associated with the slave node 0. The slave node 0 may provide the microphone data to the speaker instead of the music 0, interrupting the music 0 for the microphone data. The slave node 0 may then return to 1710 to determine whether the button is still being pushed.

Routing of Voice Calls

In some embodiments, the system 100 may provide a digital audio network for routing incoming and outgoing voice calls from a single receiver (e.g., routing calls around different positions within a vehicle). Leveraging the low-latency downstream and upstream channels, high-quality voice calls may be routed in many interesting ways throughout a vehicle.

In some embodiments, a slave node 104 may include peripheral device communication circuitry (such as the I2S/TDM/PDM transceiver 127, the I2C transceiver 129 of the node transceiver 120, or one or more GPIO pins with interrupt request capability) coupled with a wireless transceiver as a peripheral device 108. The wireless transceiver may receive voice calls, and the slave node 104 may put data representative of the voice calls on the bus 106 (e.g., upstream or downstream).

For example, FIG. 18 depicts an embodiment of the system 100 in which a wireless transceiver is included in the peripheral device 108 associated with the slave node 1. The slave node 1 may receive voice call data from the wireless transceiver and may provide it to other devices in the system 100 (upstream and/or downstream), in accordance with any of the bus protocols disclosed herein. The slave node 1 may also receive data from any of the other devices in the system 100 and provide it to the wireless transceiver for inclusion in an outgoing voice transmission, in accordance with any of the bus protocols disclosed herein.

In another example, FIG. 19 depicts an embodiment of the system 100 in which a wireless transceiver 1902 is coupled to the host 110 (e.g., using any suitable communications protocol). The host 110 may receive data from the wireless transceiver 1902 and provide it to other devices in the system 100, in accordance with any of the bus protocols disclosed herein. The host 110 may also receive data from any of the other devices in the system 100 and provide it to the wireless transceiver 1902 for inclusion in an outgoing voice transmission, in accordance with any of the bus protocols disclosed herein.

Communication Receivers and Transmitters

As discussed above with reference to wireless transceivers from voice calls, instead of or in addition to providing speakers and microphones as peripheral devices 108 for slave nodes 104 connected to the bus 106, a slave node 104 may also be associated with, as a peripheral device 108, one or more communication transceivers. Examples of such transceivers may include Bluetooth modules, near field transceivers, wireless Internet transceivers, Ethernet transceiver, Ethernet Audio Video Bridging (EAVB) transceivers, transceivers used for transmitting data in Internet of Things (IoT) applications, etc. The system 100 may effectively provide a physical layer communication link that extends the bus 106 to not only provide downstream and upstream audio communications but also streaming communications. Audio, video, and any suitable information can be transmitted using the bus synchronously (where data is transmitted simultaneously with audio I2S/TDM, I2C, IRQ, etc., as discussed above with reference to the I2S/TDM/PDM transceiver 127 and the I2C transceiver 129). This functionality may be particularly advantageous for delivering and receiving time-coded media, or in applications in which timing between different data streams is important. The embodiments discussed above with reference to FIGS. 18 and 19 may also apply to any suitable communication receivers and transmitters.

For example, in some embodiments, a Bluetooth module associated with the slave node 104 may communicate with a mobile device to transmit signals via Bluetooth to the bus 106 (e.g., to a slave node 104 or the master node 102) so that the signal can be delivered to other devices in the system 100 (e.g., an audio signal may be played back by speakers associated with the slave nodes 104 connected to the bus 106). More generally, the bus protocols disclosed herein may be used as a bridge to other communication systems and/or to bridge multiple communication systems.

Content Routing

In some embodiments, the system 100 may provide a digital audio network that allows audio content to be transmitted locally to any one or more of the slave nodes 104. For example, the system 100 may be configured to selectively route audio to different parts of the digital audio network (e.g., rear channels, front channels, a speaker at a particular seat of the vehicle, etc.). Examples of this functionality were discussed above with reference to FIGS. 16 and 17. In addition to audio, such selective routing may be applied to any other suitable type of streaming content.

Automatic Mixing

In some embodiments, the inter-node communication enabled by the system 100 may be used to collect audio signals from many microphones included in the peripheral devices 108 to avoid double talk and/or echo within the digital distributed audio network implemented by the system 100. In particular, different slave nodes 104 on the bus 106 may be aware of the audio signals being transmitted on the bus 106, and may compensate by adjusting their audio output in response. As indicated above with reference to FIGS. 16 and 17, control decisions about how to properly compensate for multiple audio sources may be made in a distributed fashion (e.g., by processing devices 1302 included in one or more of the slave nodes 104) or in a centralized fashion (e.g., by processing devices 1302 included in the master node 102 or the host 110).

Beam Forming

In some embodiments, the ability of the system 100 to deliver and collect synchronous audio content to multiple slave nodes 104 on the bus 106 may support beam-forming applications. Such applications may include detecting where a speaker is located and/or forming a beam to ensure that output audio is focused in a particular area (but at reduced or no audibility outside of the area). Any suitable focused transmission or receipt of audio applications may also leverage the system 100.

Connectivity for Microphones

In some embodiments, the system 100 may be used to provide a microphone digital interconnection that is compatible with existing analog microphones, connectors, and pre-amplifiers and operates using standard shielded three-conductor microphone cabling.

Previous attempts have been made to introduce digital microphones for professional audio and sound reinforcement. In these attempts, the audio signal has been converted from analog to digital directly at the capsule, and then transmitted digitally. This approach requires custom microphones, special digital cabling, and digital receivers, and thus has not been compatible with the remainder of the professional audio ecosystem.

The system 100 may be used to provide a digital interconnection system by connecting an ADC contained in a standard microphone male XLR connector (or other enclosure connected to a microphone) to the bus 106 using the node transceiver 120. The ADC can be coupled directly to the output of any existing analog dynamic, electret, or condenser-type microphone, and may be powered via standard microphone bias 48 V "phantom power." The ADC may convert the analog microphone signal to a digital signal, and that digital signal may be transmitted over the bus 106 (via the node transceiver 120) using standard microphone cabling. In most embodiments, the high-frequency signals characteristic of communication over the bus 106 can be combined with the lower-frequency analog microphone signal on a common set of conductors without interfering with each other, such that both may be transmitted on the same cable and readily separated as desired. Since the bus 106 is formed of two-wire links, a link may be provided by standard microphone cabling, and because communications over the bus 106 are typically conducted at a much higher frequency than standard audio, communications over the bus 106 can be combined on the microphone cabling with the existing analog microphone signal for backward/forward compatibility.

At the receiving end of a microphone, a number of different interconnect arrangements may be used. In some embodiments, an interconnect may include the node transceiver 120 and a digital output, which may be converted to standard S/PDIF, AES/EBU, AES42, or another digital format for connection to an audio receiving device (e.g., a mixer or audio input device). In some embodiments, an interconnect may include the node transceiver and a DAC and may send an analog signal to standard microphone input. Advantages of such an approach may include the use of a lower noise digital interconnection rather than an analog interconnection. In some embodiments, an interconnect may connect to an analog microphone input, where the signal being transmitted via the node transceiver 120 is out of audio band and thus is backward compatible with analog equipment. In some embodiments, an interconnect may include a dual receiver connection for both the digital output and the analog signal, providing the option for a user to select between the digital signal and the analog signal for different applications (e.g., the analog signal for secondary preamp and conversion).

In some embodiments, the node transceiver 120 and a DAC could be built directly into the XLR connector or an interconnecting box powered using 48 V "phantom power." The entire arrangement could include a standard microphone cable with the node transceiver 120 and converters inside in the microphone connectors.

These embodiments may be applied to multiple microphone settings and used to create a "digital snake." In such embodiments, multiple microphone signals (either analog or digital) may be combined and transmitted via the bus 106 over one standard microphone cable, without any large multi-conductor or specialized digital cabling required. At the receiving end, a node transceiver 120 may separate each audio input channel for interconnection to standard audio hardware, as described above.

FIGS. 20-23 depict example arrangements of a microphone 2002, a microphone cable 2010, and an audio receiving device 2020 that may be included in the system 100, in accordance with various embodiments. In each of these arrangements, a microphone 2002 has a cable connector 2004. The microphone cable 2010 has a first connector 2006 to couple to the cable connector 2004 and a second connector 2012 to couple to the audio receiving device 2020. One or more conductors couple the first connector 2006 and the second connector 2012 to transmit data therebetween. The one or more conductors may be, for example, standard microphone cabling. The audio receiving device 2020 may have a cable connector 2018 to couple to the second connector 2012 of the microphone cable 2010. In some embodiments, the cable connector 2004, the first connector 2006, the second connector 2012, and the cable connector 2018 may be XLR connectors, or may have any other suitable geometry.

Figure 20:
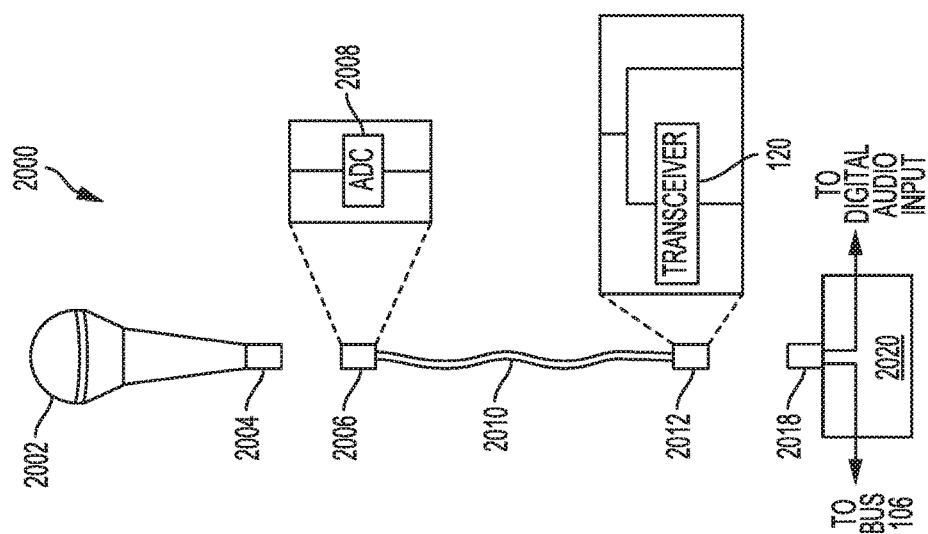

FIG. 20 depicts an arrangement 2000 in which an ADC 2008 is disposed in or proximate to the first connector 2006 and generates a digital output from the analog microphone signal that is provided to a node transceiver 120 disposed in or proximate to the second connector 2012. The output of the node transceiver 120 may include four wires that provide upstream signals for transmission on an upstream pair of the four wires and/or downstream signals for transmission on a downstream pair of the four wires. The digital output of the ADC 2008 may be provided in parallel to the output of the node transceiver 120 (e.g., on its own wire or wires). The cable connector 2018 of the audio receiving device 2020 may receive the four wires communicating the output of the node transceiver 120 and route the signals on those four wires to the bus 106, and may receive the wires communicating the digital output of the ADC 2008 and route that digital output to any suitable digital audio input.

Figure 21:
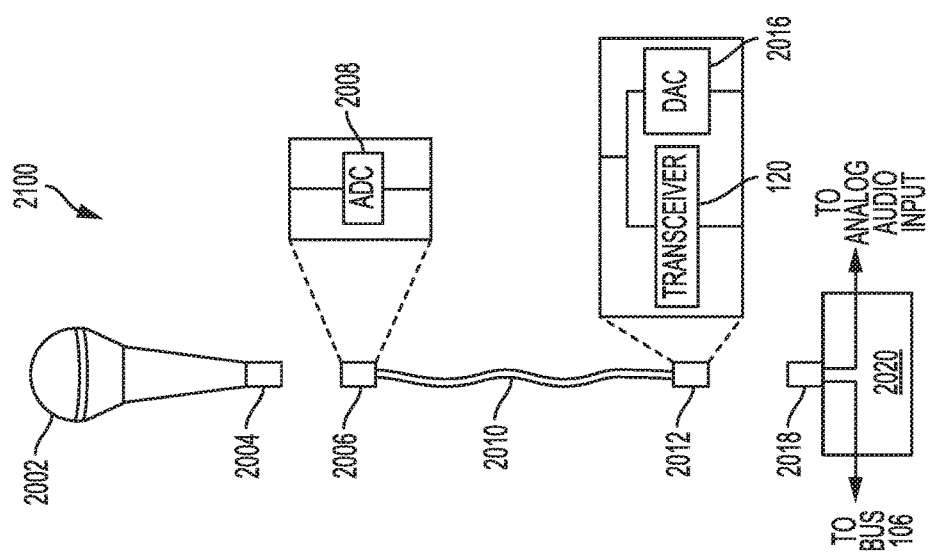

FIG. 21 depicts an arrangement 2100 in which an ADC 2008 is disposed in or proximate to the first connector 2006 and generates a digital output from the analog microphone signal. This digital output is provided to a node transceiver 120 disposed in or proximate to the second connector 2012. As discussed above with reference to FIG. 20, the output of the node transceiver 120 may include four wires that provide upstream signals for transmission on an upstream pair of the four wires and/or downstream signals for transmission on a downstream pair of the four wires. The digital output of the ADC 2008 may be provided in parallel to a DAC 2016 that is disposed in or proximate to the second connector 2012. The analog output of the DAC 2016 may be provided in parallel to the output of the node transceiver 120 (e.g., on its own wire or wires). The cable connector 2018 of the audio receiving device 2020 may receive the four wires communicating the output of the node transceiver 120 and route the signals on those four wires to the bus 106, and may receive the wires communicating the analog output of the DAC 2016 and route that analog output to any suitable analog audio input.

Figure 22:
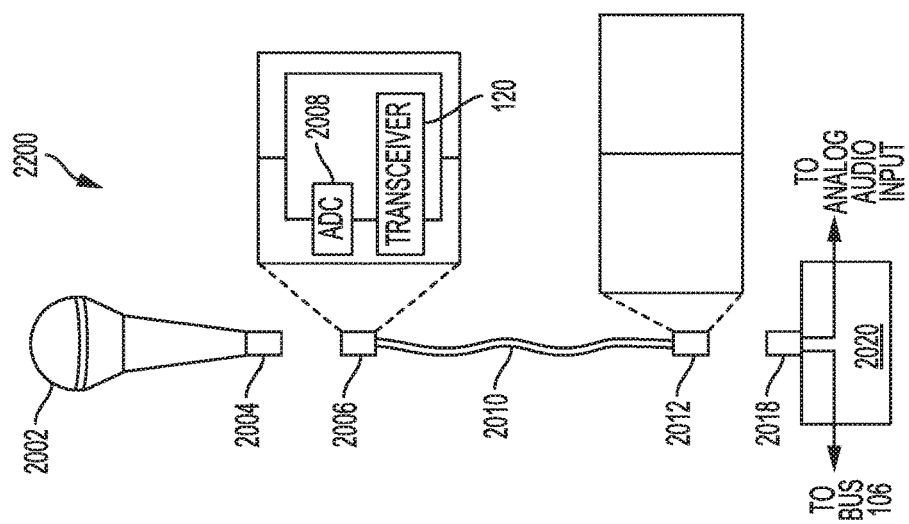
FIGS. 20-23 depict example arrangements of a microphone, microphone cable, and audio receiving device that may be included in the system of FIG. 1, in accordance with various embodiments.

FIG. 22 depicts an arrangement 2200 in which an ADC 2008 is disposed in or proximate to the first connector 2006 and generates a digital output from the analog microphone signal that is provided to a node transceiver 120 also disposed in or proximate to the first connector 2006. The output of the node transceiver 120 may include four wires that provide upstream signals for transmission on an upstream pair of the four wires and/or downstream signals for transmission on a downstream pair of the four wires. The analog output of the microphone 2002 may be combined with the output of the node transceiver 120 (e.g., on a common set of at least four wires). The cable connector 2018 of the audio receiving device 2020 may receive the four wires communicating the output of the node transceiver 120 combined with the analog output of the microphone 2002 and route those four wires to the bus 106 and to any suitable analog audio input. As discussed above, because the signals communicated over the bus 106 generally do not overlap in frequency with analog audio signals, the signals can be transmitted on the same set of conductors and the desired signals extracted (e.g., by filtering or by the inability of the eventual receiving device to recognize signals in the other frequency band).

Figure 23:
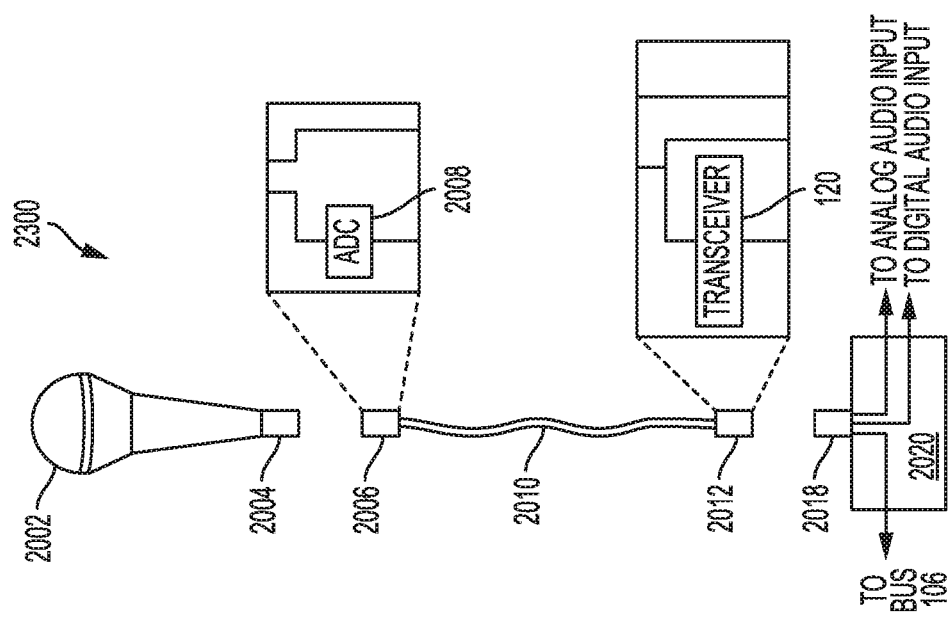

FIG. 23 depicts an arrangement 2300 in which an ADC 2008 is disposed in or proximate to the first connector 2006 and generates a digital output from the analog microphone signal. This digital output is provided to a node transceiver 120 disposed in or proximate to the second connector 2012. As discussed above with reference to FIG. 20, the output of the node transceiver 120 may include four wires that provide upstream signals for transmission on an upstream pair of the four wires and/or downstream signals for transmission on a downstream pair of the four wires. The digital output of the ADC 2008 may be provided in parallel to the output of the node transceiver 120 (e.g., on its own wire or wires) in the second connector 2012, and the analog microphone signal from the microphone 2002 may be provided in parallel to both (e.g., on its own wire or wires) in the second connector 2012. The cable connector 2018 of the audio receiving device 2020 may receive the four wires communicating the output of the node transceiver 120 and route the signals on those four wires to the bus 106, receive the wires communicating the analog microphone signal and route that analog signal to any suitable analog audio input, and receive the wires communicating the digital output of the ADC 2008 and route that digital signal to any suitable digital audio input.

Although FIGS. 20-23 illustrate various components in various locations within a microphone cable 2010, these arrangements are simply illustrative, and the components may be relocated as suitable. For example, in some embodiments, some or all of the components (e.g., the ADC 2008, the node transceiver 120, and/or the DAC 2016) may be located in the cable connector 2004 or the cable connector 2018. As discussed above, in some embodiments, the analog microphone signal may share conductors with the traffic on the bus 106 generated by the node transceiver 120 and/or the digital representation of the analog microphone signal generated by the ADC 2008.

Radio Receiver as a Node on the Bus

As discussed above with reference to wireless transceivers from voice calls, instead of or in addition to providing speakers and microphones as peripheral devices 108 for slave nodes 104 connected to the bus 106, a slave node 104 may also be associated with, as a peripheral device 108, one or more radio receivers such as FM (frequency modulation) receivers, AM (amplitude modulation) receivers, satellite radio receivers, television/media receivers, or other over-the-air signal receivers. In a conventional vehicle setting, a receiver has an antenna mounted to a roof, rear window, rear spoiler, or other part of the vehicle with a long wire connecting the antenna back to a head radio unit at the front of the vehicle. This conventional approach may suffer from electromagnetic interference due to the long wire, which may require that other in-vehicle electronics have to be carefully designed and controlled so as to not interfere with the frequency of the signal being carried over the long wire.

To mitigate these issues and improve design flexibility and performance, in some embodiments of the system 100, a node transceiver 120 (e.g., included in a slave node 104) may include peripheral device communication circuitry in communication with an antenna coupled to a roof or other part of a vehicle, and the peripheral device communication circuitry may communicate with the antenna via a wired connection. The node transceiver 120 may be located close to the antenna, and the data received by the antenna may be communicated to a head unit (e.g., a master node 102 or a host 110 included in a head unit) over the bus 106, rather than over a single long conductor coupling the antenna to the head unit. This may reduce or eliminate the electromagnetic interference issue by transmitting the received data digitally in frequency bands not as susceptible to interference from other in-vehicle electronics.

Figure 24:
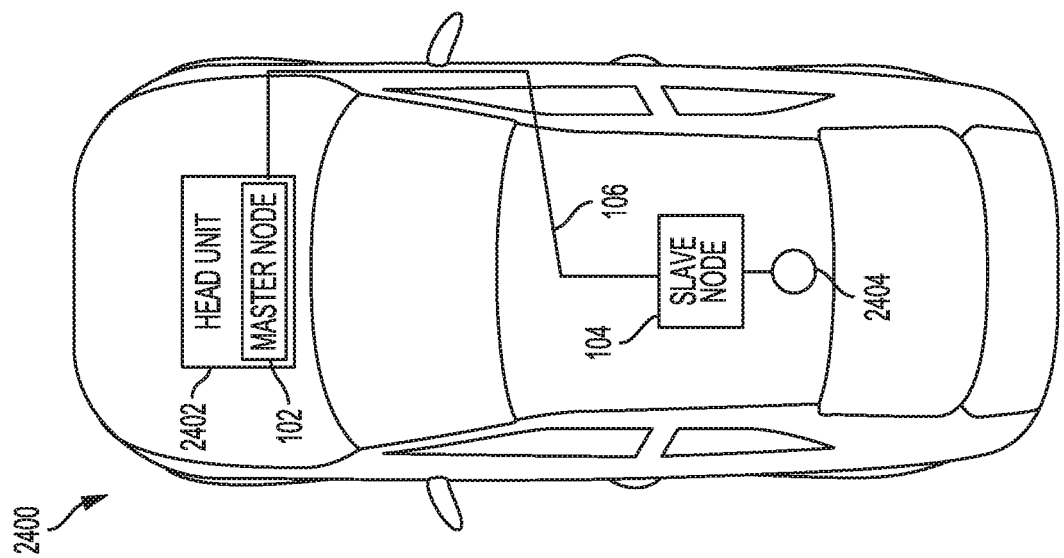
FIG. 24 illustrates an arrangement in which a slave node is proximate to an antenna coupled to a roof of a vehicle, in accordance with various embodiments.

FIG. 24 illustrates an arrangement 2400 in which a slave node 104 is proximate to an antenna 2404 coupled to a roof of a vehicle, in accordance with various embodiments. The antenna 2404 (and any associated radio receiver circuitry) may be a peripheral device 108 of the slave node 104, and may provide received radio data to the slave node 104 via any suitable peripheral device communication circuitry. The slave node 104 may provide the received radio data (e.g., in a raw or processed form) to a master node 102 in a head unit 2402 of the vehicle via the bus 106.

The peripheral device communication circuitry that communicates with the antenna (e.g., the I2S/TDM/PDM transceiver 127, the I2C transceiver 129, and/or one or more GPIO pins with interrupt request capability of the node transceiver 120) may interface with existing I2S and/or I2C interfaces for a radio receiver associated with the antenna, and thus the node transceiver 120 may readily interface with a radio receiver. In some embodiments, the node transceiver 120 may also provide a sample rate converter (e.g., built-in) to process the received radio signals (usually fixed at a suitable carrier frequency) before transmitting the received radio signals over the bus 106 (e.g., at the audio sampling frequency corresponding to the superframe rate). The data received from the radio receiver can then be transmitted upstream or downstream to a slave node 104 on the bus 106 (e.g., to a speaker or for other delivery to a user).

Transporting Compressed Video

As discussed above, in addition to or instead of transmitting audio over the bus 106, video may be transmitted over the bus 106. In some embodiments, compressed video (or low-quality video, such as a rear-view camera or rear seat video monitor) having an appropriate data rate may also be transmitted over the bus 106. For instance, compressed video from a camera may be transmitted, or compressed video for a video display may be transmitted.

User Interface Controls

Microphones and any suitable sensors can be included in the system 106 as peripheral devices 108 to provide user interfaces or to improve audio applications. Applications of microphones and/or sensors in a vehicle setting may include hands-free user interfaces, (e.g., voice control/commands), telematics, driver monitoring, emergency/roadside assistance, and gesture recognition applications. For instance, microphones may be embedded in a seat belt, or any suitable location within a vehicle. The bus 106 may provide an efficient communication channel for transmitting the audio data collected by the microphones and any suitable sensors. In some embodiments, any suitable I2C devices such as gesture recognition sensors, push buttons, memory devices, displays, etc., may also be included in the system 100 (e.g., as peripheral devices 108 may communicate with the I2C transceiver 129 included in the node transceiver 120).

Backplane Connectivity

In some embodiments, the system 100 may be used to interconnect different subsystems (e.g., included in different control boards or on the same board) with low latency. In particular, the system 100 may be used to daisy chain multiple boards to create a much larger system. The system 100 may also interconnect the boards with smaller devices over the same bus 106. Conference room, entertainment systems, intercom systems, smart homes, surveillance systems, and emergency systems, among others, may leverage the bus 106 to interconnect the subsystems.

Figure 25:
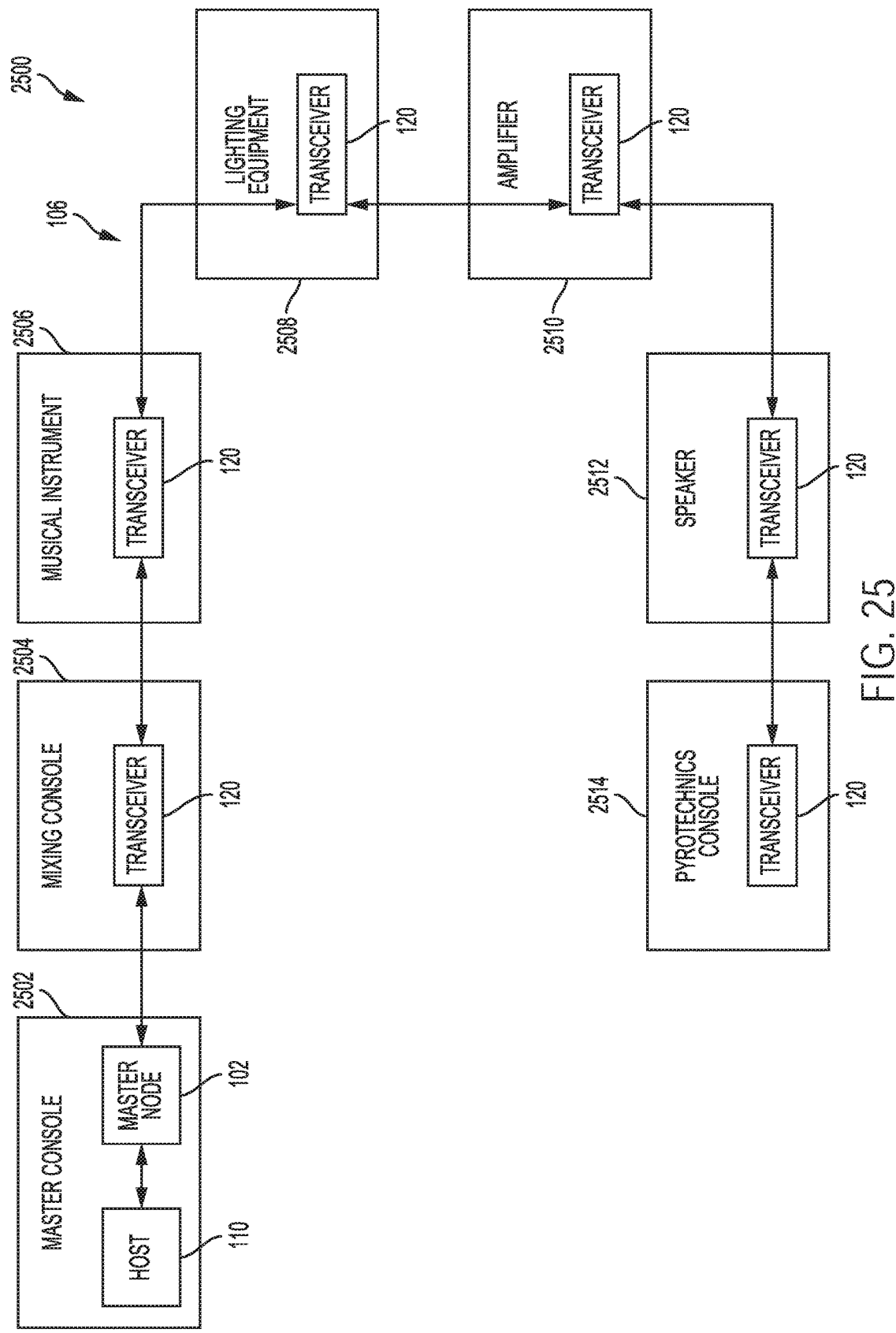
FIG. 25 illustrates an arrangement of multiple types of audiovisual equipment as slave nodes in the system of FIG. 1, in accordance with various embodiments.

In some embodiments, the system 100 may be used to interconnect audio visual equipment together for a performance stage, recording studio, or any other suitable entertainment setting. The wiring needed to interconnect audiovisual equipment may be advantageously reduced relative to conventional thick cable techniques by using the two-wire bus 106. The audiovisual equipment may include speakers, mixing consoles, music instruments, time coding equipment, lighting equipment, amplifiers, video displays, pyrotechnics, and any other suitable equipment. For example, FIG. 25 illustrates an arrangement 2500 in which multiple types of audiovisual equipment include a node transceiver 120 and thus act as a slave node 104 and can communicate along the bus 106. In particular, a master consult 2502 may include the host 110 and the master node 102, and node transceivers 120 may be included in or coupled to a mixing console 2504, a musical instrument 2506, lighting equipment 2508, an amplifier 2510, a speaker 2512, and a pyrotechnics console 2514. Each of these pieces of equipment may act as a peripheral device 108 and may communicate with its associated node transceiver 120 using any suitable peripheral device communication circuitry (e.g., the I2S/TDM/PDM transceiver 127, the I2C transceiver 129, and/or one or more GPIO pins with interrupt request capability). Data from these pieces of equipment may be provided to other equipment along the bus 106 by the node transceivers 120, in accordance with any of the bus protocols disclosed herein.

The system 100 may be used to interconnect equipment in any suitable setting. For example, the system 100 may be used to interconnect medical equipment having many sensors and subsystems (e.g., for patient monitoring applications) in the manner discussed above with reference to FIG. 25. The use of the two-wire bus 106 may reduce the wiring that connects these sensors and systems relative to conventional approaches.

Vibration Measurement

In some embodiments, the system 100 may be used to interconnect microphones and other sensors arranged to monitor many parts of a material, such as carbon fiber material, when the material is undergoing a stress test or during use. The materials can include sheets of material, objects, railroad tracks, bridges, vehicles, or buildings, for example. These microphones and other sensors, and/or devices generating stimuli for the structural testing of materials or objects, can also be effectively connected using the bus 106 within the system 100, in accordance with any of the bus protocols disclosed herein.

Control Systems

In some embodiments, as discussed above, the system 100 may provide a low-latency daisy-chained communication architecture. Because of the low latency and synchronicity in data transmission of the system 100, the system 100 may provide an effective communication channel for control systems, especially control systems that can benefit from reduced wiring and/or control systems that can operate on the power delivered by the bus 106. Control systems can advantageously use the system 100 to communicate commands between nodes on the bus 106 or data associated with the state of the nodes on the bus 106 to achieve control functions.

When the system 100 is implemented in systems with requirements for fault tolerance, the slave nodes 104 can be connected on the bus in a ring configuration in which any one of the slave nodes 104 may be provisioned as the last slave node 104. Examples of ring configurations are discussed above with reference to FIG. 12. If a bus link in the ring fails, the ring configuration may provide a fault-tolerant configuration for maintaining inter-node connectivity. The bus 106 may also leverage the node discovery mechanism discussed herein for discovering the proper last slave node 104 in the ring to recover from the fault.

Distributed Processing Over Low-Latency Communication Links

The system 100 may be used to distribute processing operations between different slave nodes 104. As discussed above, this may be advantageous for control systems in which it is desirable to perform local processing at the nodes while still having a low-latency communication link interconnecting the nodes. For instance, security/safety functions can be distributed between multiple slave nodes 104. A slave node 104 may implement a mechanism for preventing one or more peripheral devices 108 associated with that slave node 104 (e.g., devices monitoring and controlling a robotic limb) from overexertion of force or from prematurely reacting to locally detected issues. The system 100 may enable distributed local processing, which may mitigate or avoid the immediate need to transmit information from the slave nodes 104 to a centralized processor (which has the potential to compromise the system).

In some embodiments, the broadcast functionality of the system 100 may be employed by a slave node 104 to listen to other sensors/servos/actuators acting as peripheral devices 108 for other slave nodes 104 and to react accordingly without relying on a central processor (e.g., at the host 110).

Leveraging the distributed processing enabled by the system 100, artificial limbs and other robotics applications may be imparted with a processing equivalent to muscle memory, in which the slave nodes 104 can independently process and react to their environments and their own state without the interference of the master node 102 and/or the host 110.

Artificial Limbs

Various embodiments of the system 100 may be advantageously applied to the control systems often found in artificial/robotic limbs, and in robotics in general. The sensors and actuators, and such sensors and actuators using robotic systems, may serve as peripheral devices 108 to slave nodes 104 on the bus 106. In some embodiments, these sensors and actuators may also be powered by the bus 106, as discussed above. Advantageously, wiring may be reduced to a daisy-chained two-wire system instead of a large bundle of wires, thus providing advantages in the form factor of the robotics.

One example is a robotic leg, in which the knee joint needs information from one or more foot sensors and the foot joint needs information from one or more knee sensors. Conventionally, a centralized processor would be connected to the sensors and actuators, using lots of wires. Utilizing the system 100, the number of wires may be reduced from this conventional approach, thus enabling faster localized processing as information is globally distributed via the bus 106 in accordance with any of the bus protocol techniques disclosed herein.

Figure 26:
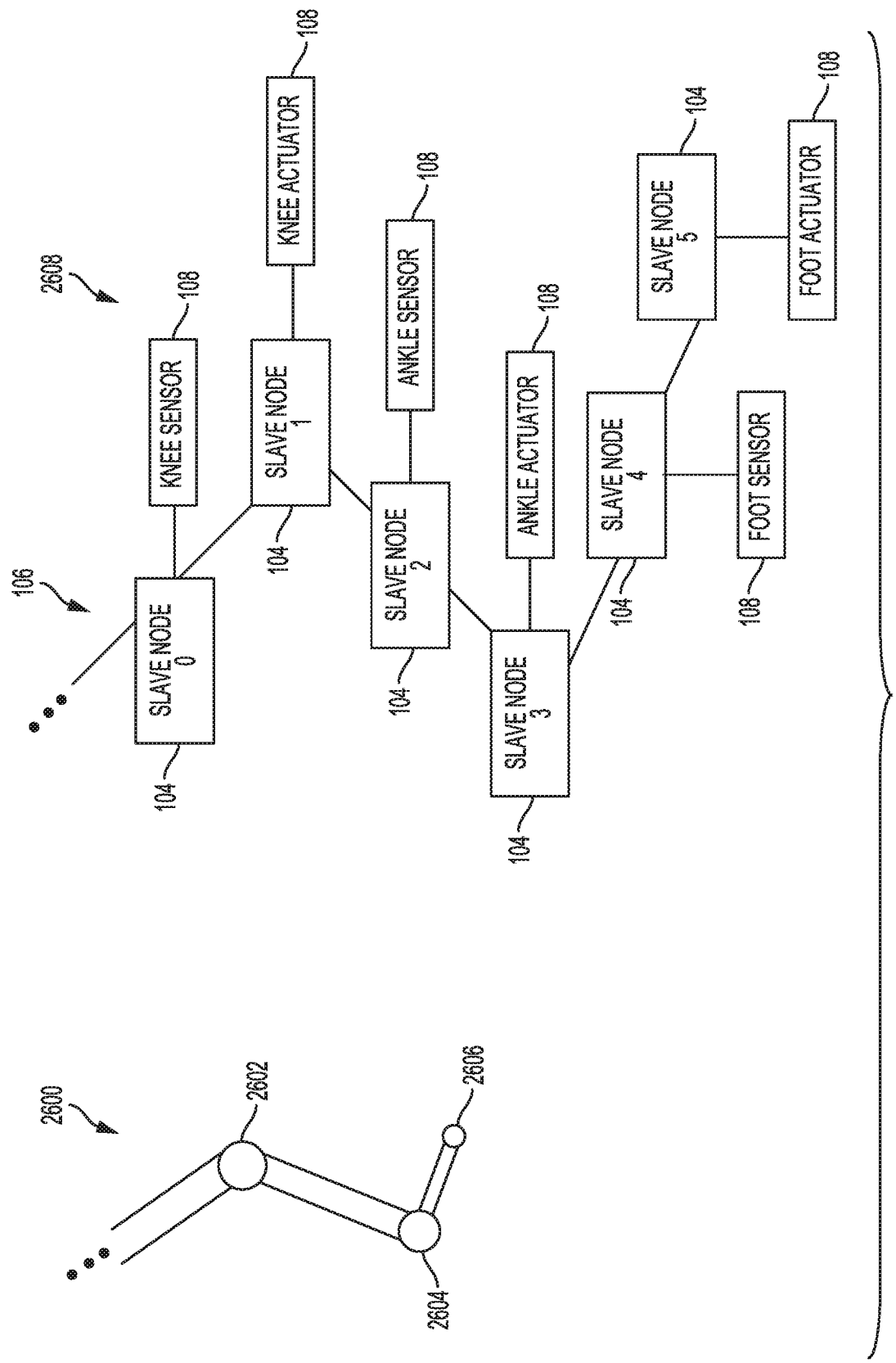
FIG. 26 illustrates a robotic limb and an arrangement of the system of FIG. 1 to enable communication among sensors and actuators of the robotic limb, in accordance with various embodiments.

For example, FIG. 26 illustrates a robotic limb 2600 having a knee joint 2602, an ankle joint 2604, and a foot joint 2606. FIG. 26 also illustrates an arrangement 2608 of the system 100 that may be used to enable sensors and actuators for the robotic limb 2600 to communicate data along the robotic limb 2600. In particular, the arrangement 2608 may include a slave node 0 having a peripheral device 108 that includes a knee sensor, a slave node 1 having a peripheral device 108 that includes the knee actuator, a slave node 2 having a peripheral device 108 that includes an ankle sensor, a slave node 3 having a peripheral device 108 that includes an ankle actuator, a slave node 4 having a peripheral device 108 that includes a foot sensor, and a slave node 5 having a peripheral device 108 that includes a foot actuator. Data generated by any of the sensors included in the peripheral devices 108 may be communicated to the associated slave nodes 104, and may then be communicated upstream and/or downstream so as to eventually reach one or more of the other slave nodes 104 (e.g., for use in driving any of the actuators included in the peripheral devices 108).

The same advantages discussed above with reference to robotic limbs may also be applicable to any robotic systems involving many smaller subsystems of electronics (each performing some local processing for the subsystem). The use of the system 100 in robotics to connect sensors and servos is not limited to connecting sensors and actuators, but the system 100 may be used to connect any suitable electronic devices, such as memory, processors, speakers, microphones, lights, radio receivers, etc. For example, the system 100 may be applied to a network of body sensors in a gaming application, research into body motion, or to control other machinery by body motion.

Sensor or Device Networks

The system 100 may be used to implement any suitable control systems to reduce wiring while providing a low-latency communication link. These control systems may include machinery (heavy, large-scale industrial machinery), assembly line equipment (having many controllers and sensors), drones (autonomous flying robots), autonomous control systems, powered control systems, etc. In many of these control systems, devices such as sensors (or sensor blocks), controllers, and/or actuators (e.g., small actuators) may be working in sync to provide their respective functions, and the system 100 may provide an effective low-latency communication link between these devices without excessive amounts of wiring (and weight) while delivering power to these devices. Sensor networks in general may also take advantage of the features of the system 100 to reduce wiring, and also use the bus 106 as a power delivery network for the sensors.

Distributed Intelligence Support

In some embodiments, the slave node 104 and the host 110 may each include, receive, and transmit mailboxes for communication therebetween. Some embodiments may use I2C for the mailbox communication; the I2C interface of a slave node 104 (e.g., managed by the I2C transceiver 129) may be configured as an I2C slave so that a processing device can program the slave node 104 over I2C and initiate reads and/or writes to the mailboxes.

In some embodiments, the node transceiver 120 for a slave node 104 may include, receive, and transmit registers that can be used as input and output "mailboxes" for communication between a processing device 1302 of the host 110 and a processing device 1302 of the slave node 104 (e.g., a processing device separate from the node transceiver 120). The host 110 and the slave node 104 may be notified of data in their respective mailboxes by an interrupt triggered upon completion of data writing to the mailbox. The node transceiver 120 may be configured to generate an interrupt to a processing device 1302 included in the slave node 104 upon completion of data writing to a relevant mailbox.

Figure 27:
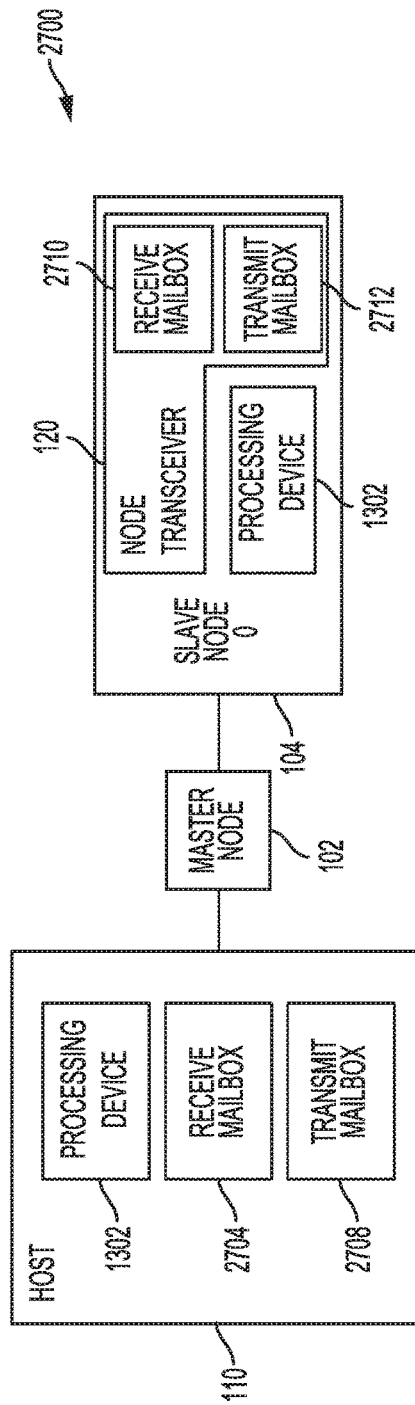
FIG. 27 is a block diagram of an arrangement of components of the system 100 including transmit and receive mailboxes, in accordance with various embodiments.

FIG. 27 is a block diagram of an arrangement 2700 in which a slave node 0 includes a node transceiver 120 having a receive mailbox 2710 and a transmit mailbox 2712 that may be used to communicate with a receive mailbox 2704 and a transmit mailbox 2708 of a host 110 (via a master node 102). In particular, data provided to the receive mailbox 2710 may be communicated to the processing device 1302 of the slave node 0 via an interrupt generated by the node transceiver 120, and the processing device 1302 of the slave node 0 may notify the node transceiver 120 that data is in the transmit mailbox 2712 for transmission to the host 110.

The node transceiver 120 may include a number of registers for control of these mailboxes. In some embodiments, MBOX0CTL and MBOX1CTL registers may provide fields to enable these mailboxes and to control direction, message length, and interrupt enables for the mailboxes.

Mailbox 0 may be configured as a receive mailbox (e.g., the receive mailbox 2710, written by the host 110 and read by a processing device 1302 of the slave node 104) by default. Mailbox 1 may be configured as a transmit mailbox (e.g., the transmit mailbox 2712, written by a processing device 1302 of the slave node 104 and read by the host 110) by default.

An MBxLEN field of the MBOXxCTL register may define the length of the associated mailbox. If this field is 0, MBOXxB0 may be the final byte of the mailbox. If this field is 1, MBOXxB1 may be the final byte of the mailbox. If this field is 2, MBOXxB2 may be the final byte of the mailbox. If this field is 3, MBOXxB3 may be the final byte of the mailbox.

For an enabled receive mailbox, if an MBxFIEN bit of the MBOXxCTL register is set, an interrupt to the processing device 1302 of the slave node 104 may occur after the final byte of the associated mailbox is written by the host 110 and the node transceiver 120 determines that a bus retry was not necessary. If an MBxEIEN field of the MBOXxCTL register is set, an interrupt to the host 110 may occur after the final byte of the associated mailbox is read by the processing device 1302 of the slave node 104.

For an enabled transmit mailbox, if the MBxFIEN field is set, an interrupt to the host 110 may occur after the final byte of the associated mailbox is written by the processing device 1302 of the slave node 104. If the MBxEIEN failed is set, an interrupt to the processing device 1302 of the slave node 104 may occur after the final byte of the associated mailbox is read by the host 110 and the node transceiver 120 determines that a bus retry was not necessary.

In some embodiments, MBOX0STAT and MBOX1STAT registers may provide status information for the mailboxes. When a mailbox is filled, an associated MBxFULL bit of the MBOXxSTAT register may go high and the MBxEMPTY bit may go low. When a mailbox is emptied, an associated MBxEMPTY bit of the MBOXxSTAT register may go high and the MBxFULL bit may go low. MBxEIRQ and MBxFIRQ bits included in the MBOXxSTAT register may go high when the associated mailbox signals an interrupt to the host 110 or local processor (e.g., the processing device 1302 of the slave node 104), and may go low when the interrupt is processed by the host 110 or local processor.

In some embodiments, MBOX0Bn and MBOX1Bn registers may contain mailbox data. Each mailbox may hold up to 32 bits of data in some examples. An MBxLEN field in the MBOXxBn register may define the number of active bytes in the mailbox. In some embodiments, each mailbox may support 8-, 16-, 24-, or 32-bit messages.

Sensor Support

In some vehicle applications, the system 100 may include an arrangement of slave nodes 104 on the bus 106 to interconnect two microphones, located at the left and right sides of the cabin, respectively, and an environmental sensor coupled to a slave node 104 on the bus 106 and positioned between the microphones and close to the windshield. The environmental sensor may measure temperature and humidity (e.g., for defogging and climate control functions) and/or environmental gases (e.g., ammonia, carbon monoxide, nitrogen dioxide) for air re-routing to improve passenger comfort. The microphones may be, for example, microelectromechanical systems (MEMS) microphone arrays.

Figure 28:
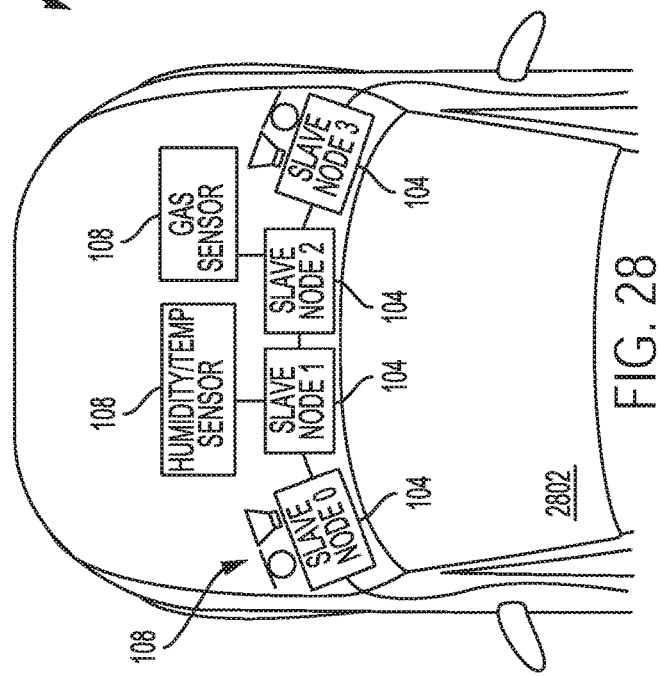
FIG. 28 illustrates an arrangement of slave nodes and associated peripheral devices in a vehicle, in accordance with various embodiments.

In some embodiments, the node transceiver 120 of a slave node 104 include peripheral device communication circuitry (e.g., the I2S/TDM/PDM transceiver 127, the I2C transceiver 129, and/or one or more GPIO pins with interrupt request capability) in communication with an environmental sensor (such as a humidity sensor, temperature sensor, and/or gas sensor) in a vehicle. In some embodiments, the host 110 may generate a control instruction for a climate control system in the vehicle based on data from an environmental sensor transmitted to the host 110 via a slave node 104, the bus 106, and the master node 102. For example, FIG. 28 illustrates an arrangement 2800 of the system 100 in which a slave node 0 (at the left side of the cabin) has a peripheral device 108 including a microphone and a speaker, a slave node 1 (proximate to a windshield 2802) has a peripheral device 108 including a humidity and/or temperature sensor, a slave node 2 has a peripheral device 108 including a gas sensor, and a slave node 3 (at the right side of the cabin) has a peripheral device 108 including a microphone and a speaker.

When microphones are included in vehicles on the left and right sides of the cabin (e.g., for noise reduction and/or beam forming), the cabling used to couple these microphones may be punctuated by intermediate slave nodes 104 coupled to the peripheral devices that perform climate control functions (heating ventilation and air conditioning (HVAC) and/or air monitoring functions) proximate to the windshield area. In some scenarios, a peripheral device for a slave node 104 may include a humidity and/or temperature sensor that can provide humidity and/or temperature information that permits the measurement of the dew point at the windshield surface and enables prediction of windshield fogging so that the HVAC system in the vehicle may operate "just in time" to prevent misting. Such a system may both save energy over "always on" or manually controlled HVAC systems, and may improve safety during vehicle operation by avoiding windshield fogging. An example of a humidity and/or temperature sensor that may be used in some embodiments is the HTU21D sensor manufactured by Measurement Specialties of Hampton, Va. Similarly, data generated by a gas sensor that detects the presence of unwanted chemicals in the air of the vehicle cabin may be used to trigger operation of the HVAC system in the vehicle to improve ventilation and reduce the chemical concentration. An example of a gas sensor that may be used in some embodiments is the MiCS-6814 sensor manufactured by SGX Sensortech of Switzerland.

Integrated Accelerometer

In some embodiments, a slave node 104 may be associated with a peripheral device 108 that includes an accelerometer (e.g., a multi-axis accelerometer) integrated into the same board as the node transceiver 120 (e.g., the upstream transceiver 122 and/or the downstream transceiver 124). Audio inputs and outputs, such as microphones and speakers, may also be coupled to the same board. One application of such an embodiment may be road noise cancellation, in which the vibration of the chassis is measured and canceled the audio components.

Test Equipment Support

In some embodiments, a node transceiver 120 may be configured in a "bus monitor mode" or "BMM" in which the upstream transceiver 122 of the node transceiver 120 monitors data coming downstream and provides it to a protocol analyzer (e.g., via an I2S bus using the I2S/TDM/PDM transceiver 127). A node transceiver 120 operating in the bus monitor mode may be referred to herein as a "bus monitor" or "BM." In this mode, the downstream transceiver 124 of the node transceiver 120 may be disabled. A bus monitor may not be daisy-chained with other slave nodes 104, but may tap into the pair of wires just upstream of a slave node 104 to be monitored, and may be discovered by the master node 102 even though it does not have all the functionality of a node transceiver 120 in a typical slave node 104. The bus monitor may be initially configured by a processor that communicates with the bus monitor (e.g., via an I2C protocol).

Thus, in some embodiments, a node transceiver 120 acting as a bus monitor may include peripheral device communication circuitry (e.g., the I2S/TDM/PDM transceiver 127, the I2C transceiver 129, and/or one or more GPIO pins with interrupt request capability) to provide a signal received over the bus 106 from an upstream device to a protocol analyzer. In some embodiments, a node transceiver 120 operating in bus monitor mode may have its downstream transceiver 124 disabled. The upstream transceiver 122 may be configured only to receive data, not to transmit.

Figure 29:
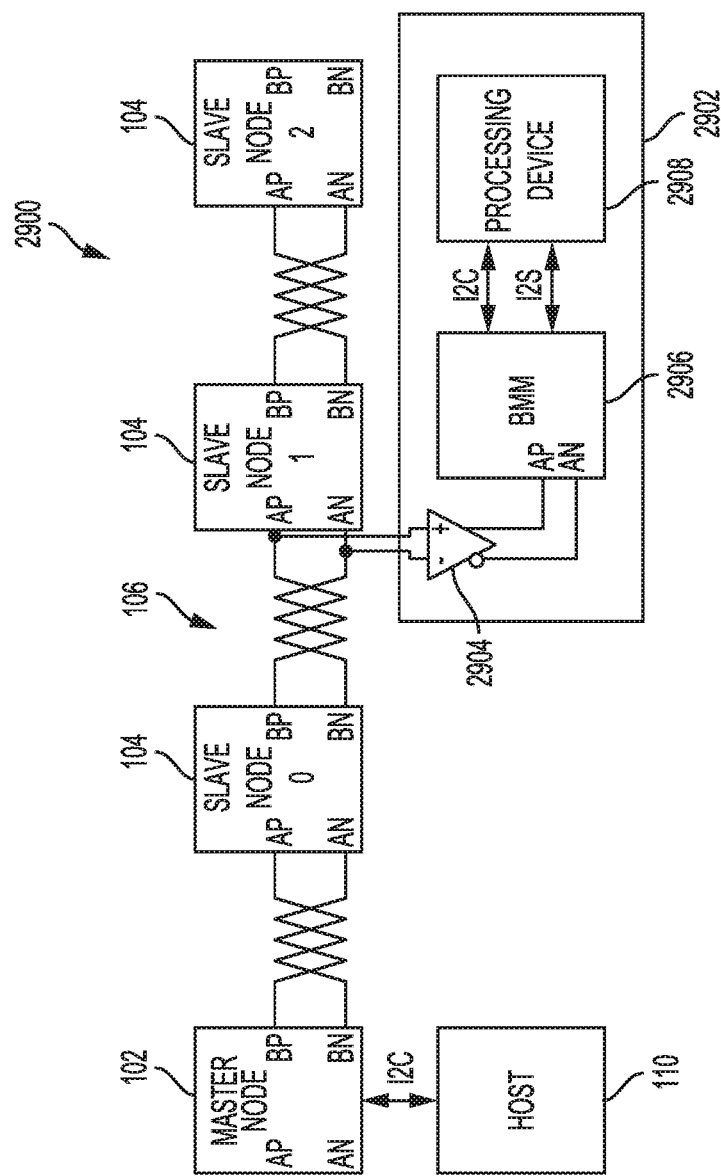
FIG. 29 is a block diagram of an arrangement of elements of the system of FIG. 1 and a bus monitor, in accordance with various embodiments.

FIG. 29 is a block diagram of an arrangement 2900 of elements of the system 100 and a bus monitor, in accordance with various embodiments. In the arrangement 2900, a bus monitor device 2902 may include a bus monitor 2906 and a processing device 2908 in communication with the bus monitor 2906 via I2C and/or I2S (e.g., using the I2S/TDM/PDM transceiver 127 and/or the I2C transceiver 129 of the bus monitor). The processing device 2908 may take the form of any of the processing devices 1302 discussed above with reference to FIG. 13. The BMM 2906 may tap into the two wires of the bus 106 just upstream of slave node 1, and isolation circuitry 2904 may be disposed between the BMM 2906 and the bus 106. The isolation circuitry 2904 may include analog circuitry to isolate the bus 106 from the load of the BMM 2906.

In some embodiments, the bus monitor mode may enable a node transceiver 120 to act as a passive BM, also referred to as a sniffer. A BM may use its I2S port to transmit traffic from the bus 106 to a protocol analyzer. A BM may be passive in the system 100, in the sense that it snoops bus synchronization control frame 180 control writes to configure its bus characteristics to match those of the slave node 104 that the BM is monitoring, but does not respond to synchronization control frames 180.

The upstream transceiver 122 may see both upstream and downstream data since the BM is not daisy chained. In some embodiments, upon receiving downstream data via the upstream transceiver 122, a BM may load a received synchronization control frame 180 and its corresponding downstream data slots 198 into a downstream frame buffer. In some embodiments, upon receiving upstream data via the upstream transceiver 122, a BM may load a received synchronization response frame and its corresponding upstream data slots into an upstream frame buffer. The BM may provide both downstream and upstream data to the I2S/TDM/PDM transceiver 127 for provision to a protocol analyzer (e.g., the processing device 2908).

The node transceiver 120 may include one or more registers to support BMM. In some embodiments, the node transceiver 120 may include a BMMCFG register. The BMMCFG register may include a BMMEN bit (to indicate whether the node transceiver 120 is to operate in BMM or not), a BMMRXEN bit (to enable or disable the upstream transceiver 122 when the node transceiver is in BMM), and a BMMNDSC node (to indicate whether the startup and discovery processes of the system 100 are to occur before or after the BM is attached and enabled).

Figure 30:
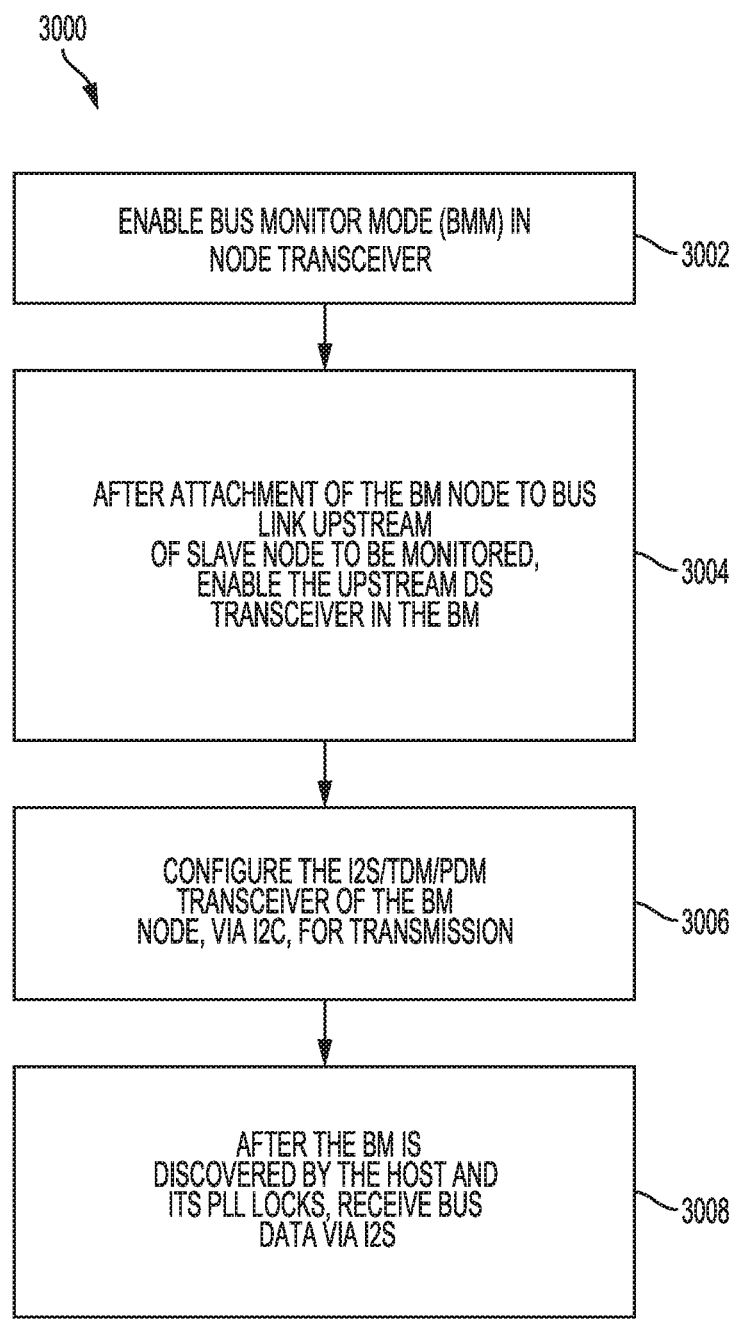
FIG. 30 is a flow diagram of a method for commencing operation of a bus monitor, in accordance with various embodiments.

FIG. 30 is a flow diagram of a method 3000 for commencing operation of a BM, in accordance with various embodiments. The method 3000 may be performed by the processing device 2908 in the bus monitor device 2902 and may be described as performed with reference to the BM 2906.

At 3002, the processing device 2908 may enable BMM in the BM 2906. Prior to enabling BMM, the BM 2906 may default to a standard configuration for the node transceiver 120. Enabling BMM at 3002 may include setting the BMMEN bit discussed above.

At 3004, the processing device 2908 may, after attachment of the BM to the link of the bus 106 upstream of a slave node 104 to be monitored (e.g., the slave node 1 of FIG. 29), enable the upstream transceiver 122 in the BM 2906. Enabling the upstream transceiver 122 at 3004 may include setting the BMMRXEN bit discussed above.

At 3006, the processing device 2908 may configure the I2S/TDM/PDM transceiver 127 of the BM 2906, using commands sent via the I2C transceiver 129, for transmission.

At 3008, after the BM 2906 is discovered by the host 110, and the PLL 128 of the BM 2906 locks, the processing device 2908 may receive data from the bus 106 via the I2S/TDM/PDM transceiver 127 of the BM 2906. As noted above, the BM 2906 may snoop bus synchronization control frame 180 control writes to configure its bus characteristics (e.g., the values of DNSLOTS and UPSLOTS) to match those of the slave node 104 that is being monitored (e.g., the slave node 1 of FIG. 29).

In some embodiments, the payload transmitted downstream on the bus 106 can only be sniffed if the host 110 enables this functionality with a control instruction relayed through the master node 102 to a slave node 104 that is to act as a BM. In some such embodiments, if the BM is not configured accordingly through the master node 102, then the BM can only output ("sniff") synchronization control and response frame data, but not the payload in the data slots. This may provide some level of content protection, since the data is scrambled and a BM can only access the payload data when the host 110 allows it.

Slave-to-Slave Communication

Generally, slave nodes 104 may output, on the DTXn pins, downstream data that originates from the master node 102. The transceiver may also selectively output upstream or downstream data that originates from other slave nodes 104 without the need for data slots first to route through the master node 102. Analogously, slave nodes 104 may generally receive, on the DRx pins, input data destined for the master node 102. The transceiver may also provide upstream or downstream data directly to other slave nodes 104, without the need for data slots first to route through the master node 102.

In embodiments that utilize this synchronous communication between multiple slave nodes 104, slave nodes 104 may selectively receive bus upstream data slots onto the DTXn pins. The system may skip DRXn data channels based on a programmable OFFSET before the upstream slots are generated by the slave node 104.

FIGS. 31-65 illustrate various examples of slave-to-slave communication systems and techniques. Any of the embodiments illustrated in or discussed below with reference to these figures may be combined with any of the other embodiments disclosed herein. The use or illustration of particular numbers of elements in these figures (e.g., 10 upstream data slots illustrated in FIG. 31) are simply examples, and the systems and techniques may be applied to or may incorporate any desired and appropriate number of any elements. Additionally, particular names for registers, variables, data slots, etc. may be used herein for clarity of illustration, but any data structures used as described herein may have any suitable names or other identifiers.

In some embodiments, registers or other data structures may be used to store data representative of what upstream data slots may be used by a slave node 104. For example, UPMASK0, UPMASK1, UPMASK2, and UPMASK3 registers may provide 1 bit for each possible upstream data slot. When any of these bits are set, the corresponding upstream data slot may be received by the slave node 104 (e.g., by the downstream transceiver 124) and placed in the TX frame buffer after any received downstream data slots. The UPSLOTS register may define the number of upstream data slots, starting immediately after the SRF, which are passed upstream through the slave node 104 (e.g., by the upstream transceiver 122).

In embodiments in which slave-to-slave communication does not occur, a slave node 104 may receive the UPSLOTS upstream data slots with the downstream transceiver 124 and transmit (UPSLOTS+LUPSLOTS) upstream data slots with the upstream transceiver 122. In embodiments in which slave-to-slave communication does occur, the use of the UPMASK0 to UPMASK3 registers may change the calculation used for the number of received upstream data slots. In particular, a slave node 104 may receive MAX (UPSLOTS, upmaskrx) upstream data slots with the downstream transceiver 124 and transmit (UPSLOTS+LUPSLOTS) upstream data slots with the upstream transceiver 122, where upmaskrx may be calculated in accordance with:

if (RXUPSLOT31==1) upmaskrx=32;
else if (RXUPSLOT30==1) upmaskrx=31;
else if (RXUPSLOT29==1) upmaskrx=30;
...
else if (RXUPSLOT02==1) upmaskrx=3;
else if (RXUPSLOT01==1) upmaskrx=2;
else if (RXUPSLOT00==1) upmaskrx=1;
else upmaskrx=0.

Because it is possible for a slave node 104 to receive upstream data slots which are not passed on, the slave node 104 may be transmitting local upstream data slots on the upstream transceiver 122 while still receiving upstream data slots on the downstream transceiver 124.

A slave node 104 which is generating upstream data slots typically starts with the first entry in the RX frame buffer. In some embodiments, when used, an UPOFFSET register may define an offset to be applied in the RX frame buffer before data is taken and transmitted upstream.

Figure 31:
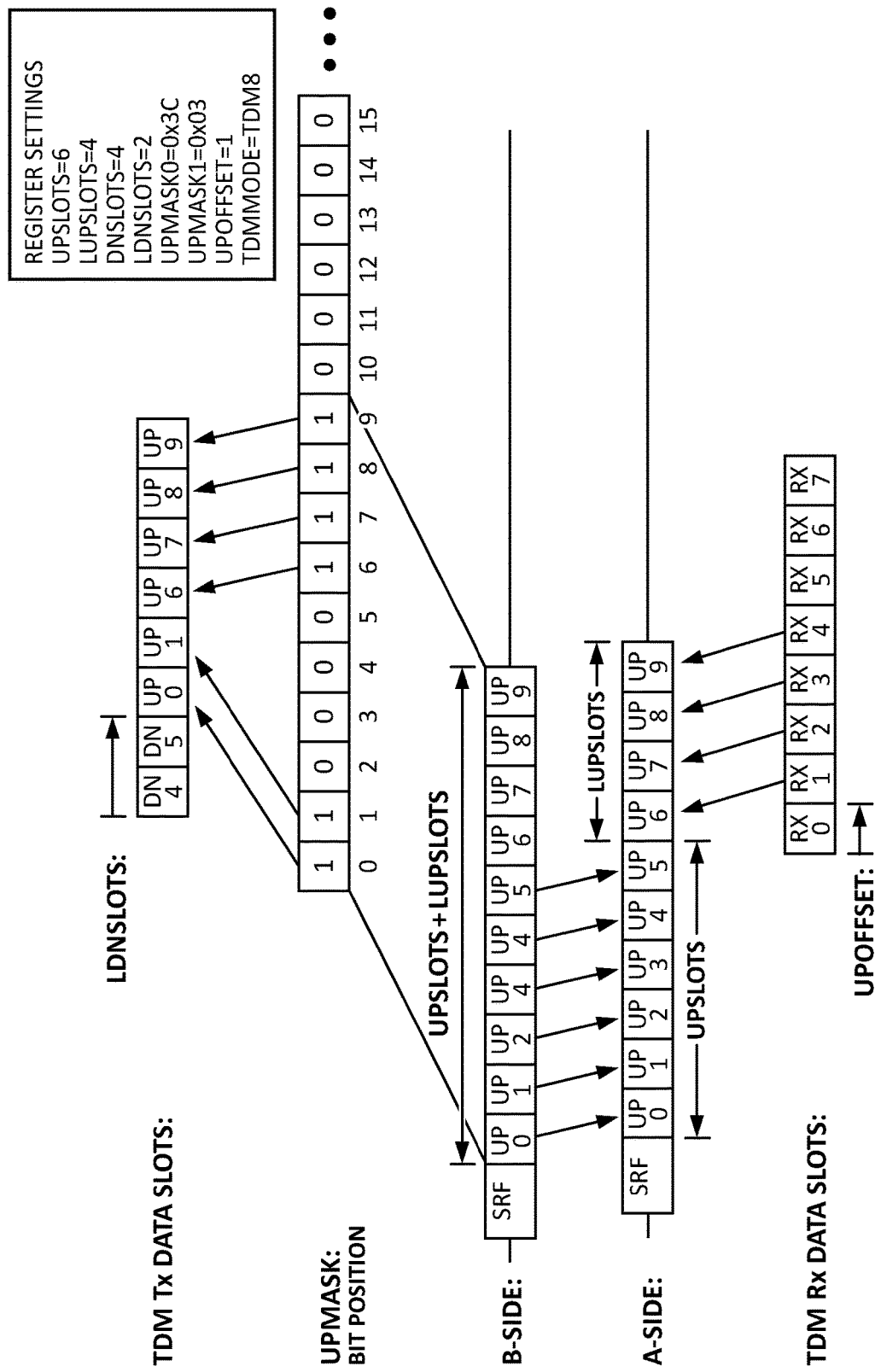
FIG. 31 provides an example of how upstream data slots may be used for slave-to-slave communication, in accordance with various embodiments.

FIG. 31 provides an example of how upstream data slots may be used in a slave node 104 after programming the UPMASK0, . . . , UPMASK3, and UPOFFSET registers for slave-to-slave communication, in accordance with various embodiments. The A-side transceiver may be the upstream transceiver 122, and the B-side transceiver may be the downstream transceiver 124. In the example of FIG. 31, the slave node 104 may receive 10 upstream data slots because RXUPSLOT09 is set and the value of UPSLOTS is 6.

Figure 32:
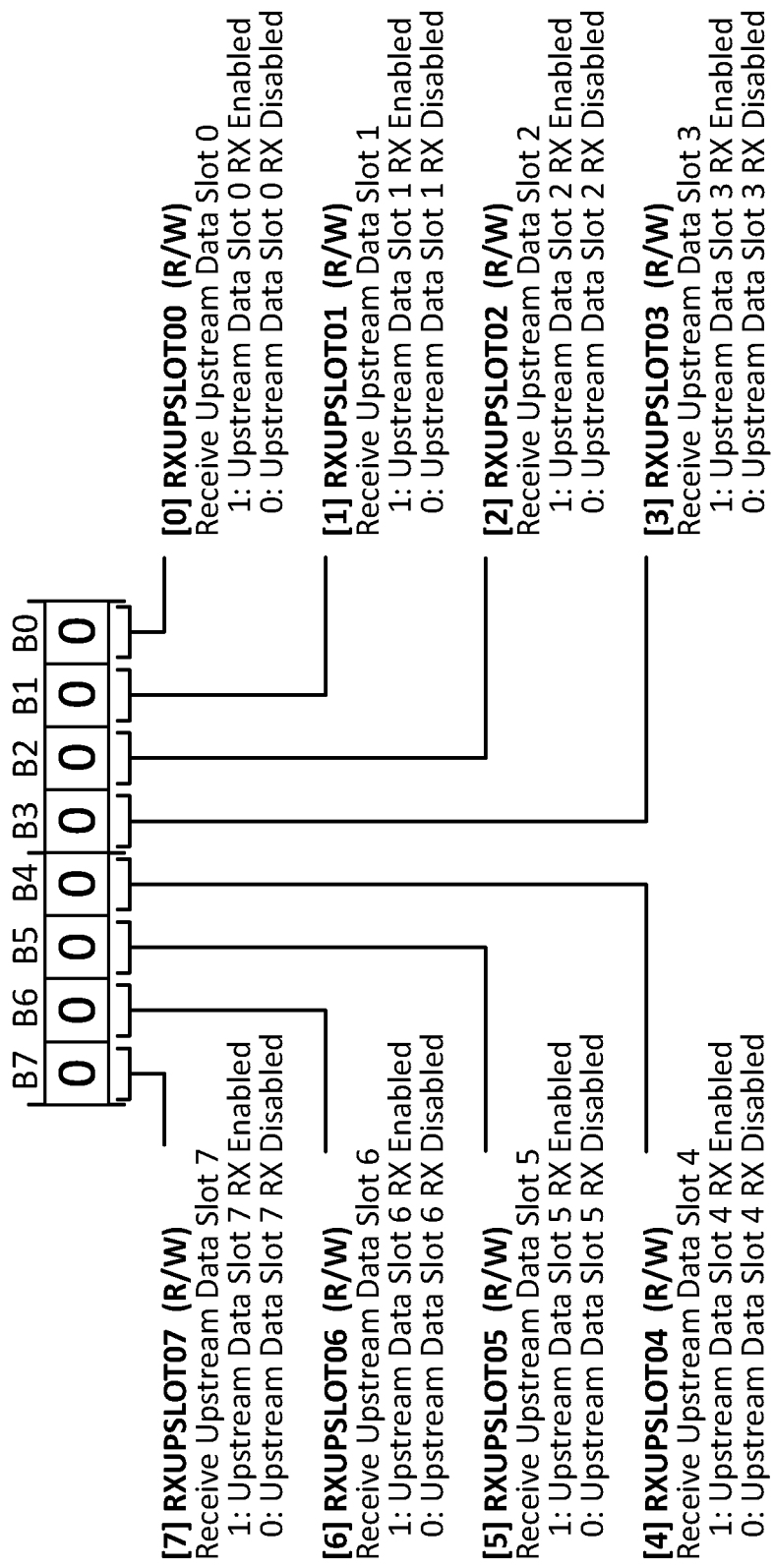
FIGS. 32-35 illustrate UPMASKn registers that may be used to support slave-to-slave communication, in accordance with various embodiments.

FIG. 32 illustrates an UPMASK0 register, which defines bits 7 to 0 of a 32-bit UPMASK field. As discussed above, in a slave node 104, the UPMASK field may define the upstream data slots that are received from the bus 106 by the slave node 104 (the "local" slave node) by the downstream transceiver 124. These data slots may be transmitted via I2S/TDM, and may follow any downstream slots which are received by the slave node 104 (defined in LDNSLOTS). In some embodiments, changes to this register only take effect after setting a CONTROL.NEWSTRCT bit of the master node 102. Table 1 provides bit descriptions for an example UPMASK0 register.

TABLE 1

| Bits | Bit Name | Settings | Description | Reset | Access |
|---|---|---|---|---|---|
| 7 | RXUPSLOT07 | | Receive Upstream Data Slot 7. This bit defines whether or not upstream data slot 7 is received by the local slave node. | 0x0 | R/W |
| | | 1 | Upstream Data Slot 7 RX Enabled | | |
| | | 0 | Upstream Data Slot 7 RX Disabled | | |
| 6 | RXUPSLOT06 | | Receive Upstream Data Slot 6. This bit defines whether or not upstream data slot 6 is received by the local slave node. | 0x0 | R/W |
| | | 1 | Upstream Data Slot 6 RX Enabled | | |
| | | 0 | Upstream Data Slot 6 RX Disabled | | |
| 5 | RXUPSLOT05 | | Receive Upstream Data Slot 5. This bit defines whether or not upstream data slot 5 is received by the local slave node. | 0x0 | R/W |
| | | 1 | Upstream Data Slot 5 RX Enabled | | |
| | | 0 | Upstream Data Slot 5 RX Disabled | | |
| 4 | RXUPSLOT04 | | Receive Upstream Data Slot 4. This bit defines whether or not upstream data slot 4 is received by the local slave node. | 0x0 | R/W |
| | | 1 | Upstream Data Slot 4 RX Enabled | | |
| | | 0 | Upstream Data Slot 4 RX Disabled | | |
| 3 | RXUPSLOT03 | | Receive Upstream Data Slot 3. This bit defines whether or not upstream data slot 3 is received by the local slave node. | 0x0 | R/W |
| | | 1 | Upstream Data Slot 3 RX Enabled | | |
| | | 0 | Upstream Data Slot 3 RX Disabled | | |
| 2 | RXUPSLOT02 | | Receive Upstream Data Slot 2. This bit defines whether or not upstream data slot 2 is received by the local slave node. | 0x0 | R/W |
| | | 1 | Upstream Data Slot 2 RX Enabled | | |
| | | 0 | Upstream Data Slot 2 RX Disabled | | |

TABLE 1-continued

| Bits | Bit Name | Settings | Description | Reset | Access |
|---|---|---|---|---|---|
| 1 | RXUPSLOT01 | | Receive Upstream Data Slot 1. This bit defines whether or not upstream data slot 1 is received by the local slave node. | 0x0 | R/W |
| | | 1 | Upstream Data Slot 1 RX Enabled | | |
| | | 0 | Upstream Data Slot 1 RX Disabled | | |
| 0 | RXUPSLOT00 | | Receive Upstream Data Slot 0. This bit defines whether or not upstream data slot 0 is received by the local slave node. | 0x0 | R/W |
| | | 1 | Upstream Data Slot 0 RX Enabled | | |
| | | 0 | Upstream Data Slot 0 RX Disabled | | |

Figure 33:
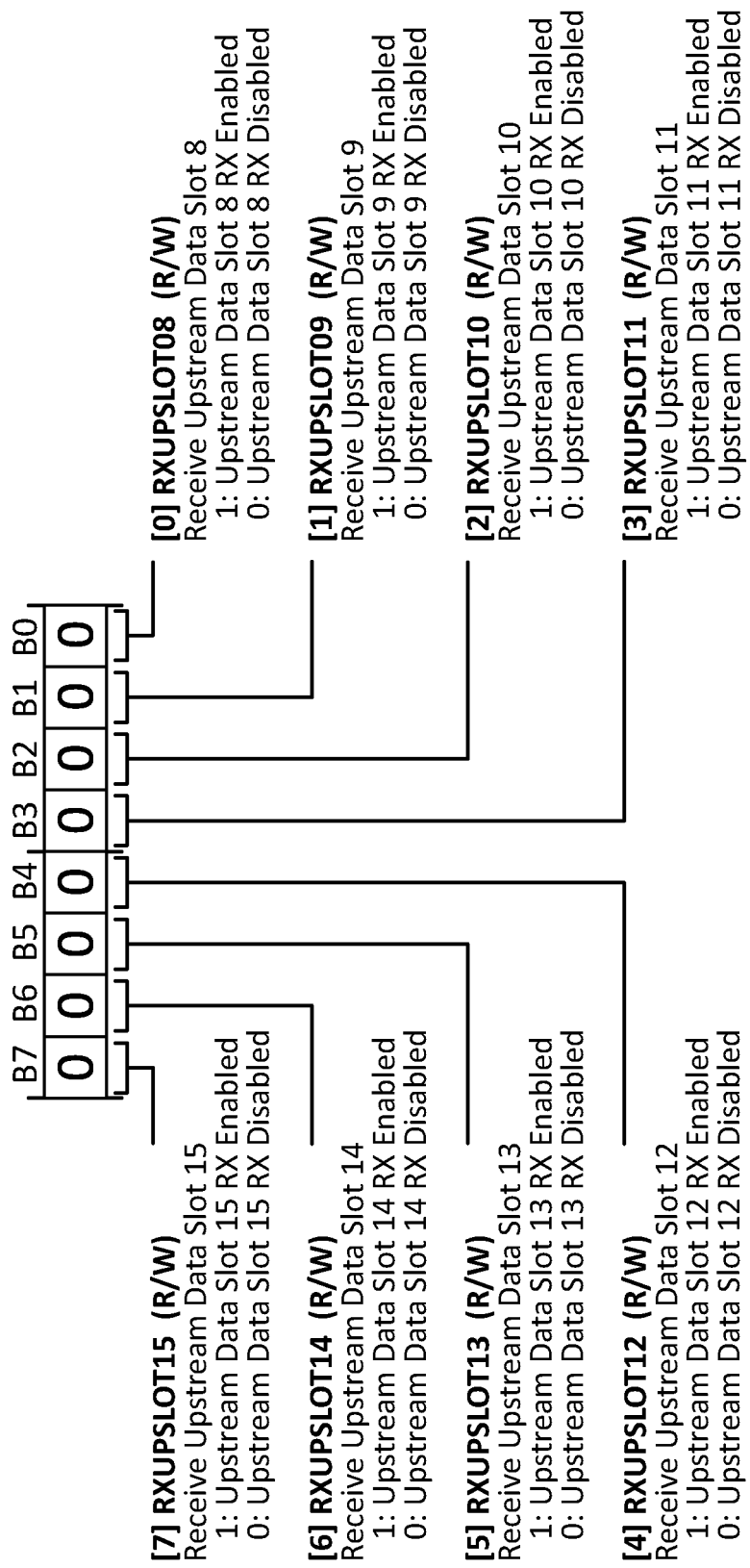

FIG. 33 illustrates an UPMASK1 register, which defines bits 15 to 8 of the 32-bit UPMASK field. As discussed above, in a slave node 104, the UPMASK field may define the upstream data slots that are received from the bus 106 by the slave node 104 with the downstream transceiver 124. These data slots may be transmitted via I2S/TDM, and may follow any downstream slots which are received by the upstream transceiver 122 of the slave node 104 (defined in LDNSLOTS). In some embodiments, changes to this register only take effect after setting the CONTROL.NEWSTRCT bit of the master node 102. Table 2 provides bit descriptions for an example UPMASK1 register.

Figure 34:
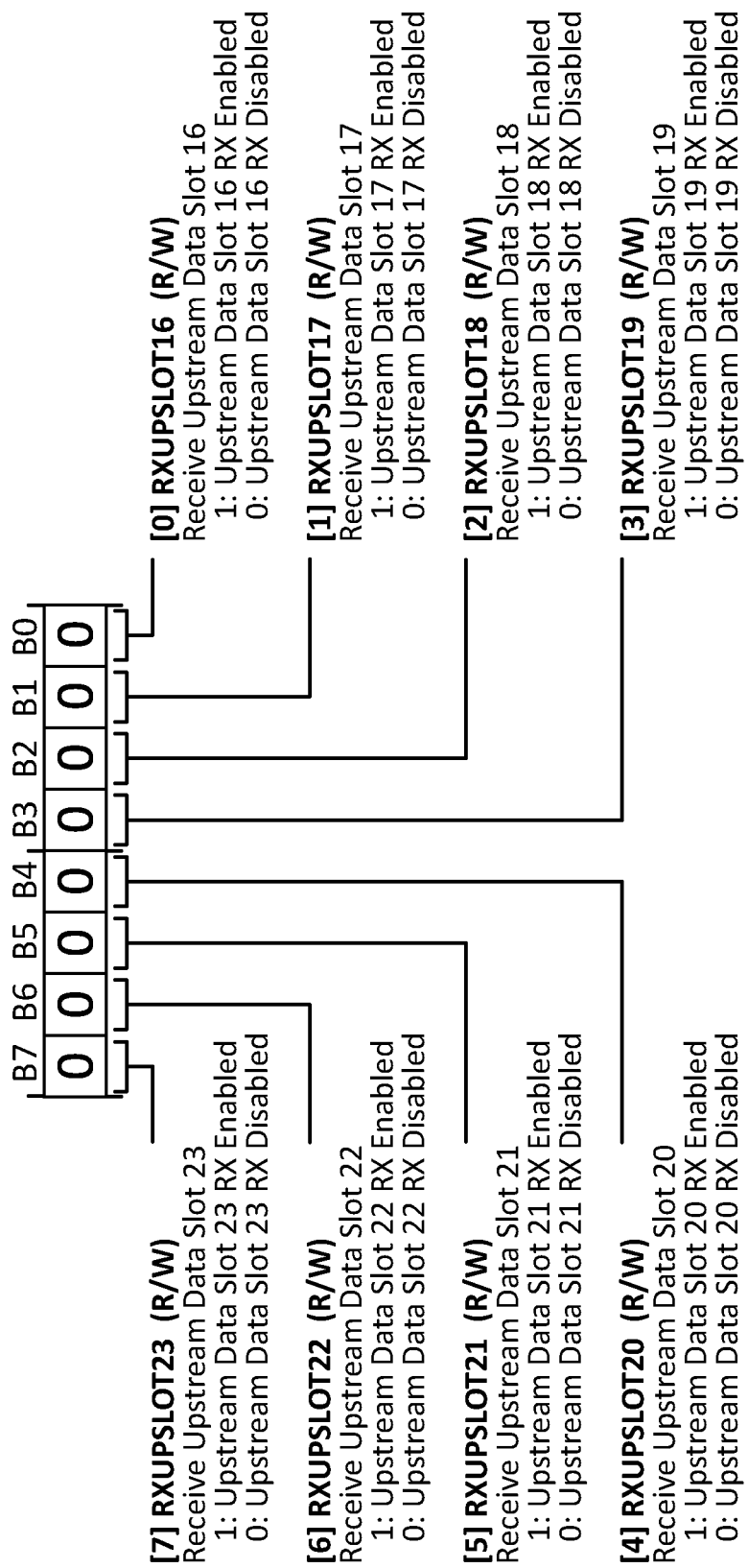

FIG. 34 illustrates an UPMASK2 register, which defines bits 23 to 16 of the 32-bit UPMASK field. As discussed above, in a slave node 104, the UPMASK field may define the upstream data slots that are received from the bus 106 by the local node with the downstream transceiver 124. These data slots may be transmitted via I2S/TDM, and may follow any downstream slots which are received by the slave node 104 (defined in LDNSLOTS). In some embodiments, changes to this register only take effect after setting the CONTROL.NEWSTRCT bit of the master node 102. Table 3 provides bit descriptions for an example UPMASK2 register.

TABLE 2

| Bits | Bit Name | Settings | Description | Reset | Access |
|---|---|---|---|---|---|
| 7 | RXUPSLOT15 | | Receive Upstream Data Slot 15. This bit defines whether or not upstream data slot 15 is received by the local slave node. | 0x0 | R/W |
| | | 1 | Upstream Data Slot 15 RX Enabled | | |
| | | 0 | Upstream Data Slot 15 RX Disabled | | |
| 6 | RXUPSLOT14 | | Receive Upstream Data Slot 14. This bit defines whether or not upstream data slot 14 is received by the local slave node. | 0x0 | R/W |
| | | 1 | Upstream Data Slot 14 RX Enabled | | |
| | | 0 | Upstream Data Slot 14 RX Disabled | | |
| 5 | RXUPSLOT13 | | Receive Upstream Data Slot 13. This bit defines whether or not upstream data slot 13 is received by the local slave node. | 0x0 | R/W |
| | | 1 | Upstream Data Slot 13 RX Enabled | | |
| | | 0 | Upstream Data Slot 13 RX Disabled | | |
| 4 | RXUPSLOT12 | | Receive Upstream Data Slot 12. This bit defines whether or not upstream data slot 12 is received by the local slave node. | 0x0 | R/W |
| | | 1 | Upstream Data Slot 12 RX Enabled | | |
| | | 0 | Upstream Data Slot 12 RX Disabled | | |
| 3 | RXUPSLOT11 | | Receive Upstream Data Slot 11. This bit defines whether or not upstream data slot 11 is received by the local slave node. | 0x0 | R/W |
| | | 1 | Upstream Data Slot 11 RX Enabled | | |
| | | 0 | Upstream Data Slot 11 RX Disabled | | |
| 2 | RXUPSLOT10 | | Receive Upstream Data Slot 10. This bit defines whether or not upstream data slot 10 is received by the local slave node. | 0x0 | R/W |
| | | 1 | Upstream Data Slot 10 RX Enabled | | |
| | | 0 | Upstream Data Slot 10 RX Disabled | | |
| 1 | RXUPSLOT09 | | Receive Upstream Data Slot 9. This bit defines whether or not upstream data slot 9 is received by the local slave node. | 0x0 | R/W |
| | | 1 | Upstream Data Slot 9 RX Enabled | | |
| | | 0 | Upstream Data Slot 9 RX Disabled | | |
| 0 | RXUPSLOT08 | | Receive Upstream Data Slot 8. This bit defines whether or not upstream data slot 8 is received by the local slave node. | 0x0 | R/W |
| | | 1 | Upstream Data Slot 8 RX Enabled | | |
| | | 0 | Upstream Data Slot 8 RX Disabled | | |

TABLE 3

| Bits | Bit Name | Settings | Description | Reset | Access |
|---|---|---|---|---|---|
| 7 | RXUPSLOT23 |   | Receive Upstream Data Slot 23. This bit defines whether or not upstream data slot 23 is received by the local slave node. | 0x0 | R/W |
|   |   | 1 | Upstream Data Slot 23 RX Enabled |   |   |
|   |   | 0 | Upstream Data Slot 23 RX Disabled |   |   |
| 6 | RXUPSLOT22 |   | Receive Upstream Data Slot 22. This bit defines whether or not upstream data slot 22 is received by the local slave node. | 0x0 | R/W |
|   |   | 1 | Upstream Data Slot 22 RX Enabled |   |   |
|   |   | 0 | Upstream Data Slot 22 RX Disabled |   |   |
| 5 | RXUPSLOT21 |   | Receive Upstream Data Slot 21. This bit defines whether or not upstream data slot 21 is received by the local slave node. | 0x0 | R/W |
|   |   | 1 | Upstream Data Slot 21 RX Enabled |   |   |
|   |   | 0 | Upstream Data Slot 21 RX Disabled |   |   |
| 4 | RXUPSLOT20 |   | Receive Upstream Data Slot 20. This bit defines whether or not upstream data slot 20 is received by the local slave node. | 0x0 | R/W |
|   |   | 1 | Upstream Data Slot 20 RX Enabled |   |   |
|   |   | 0 | Upstream Data Slot 20 RX Disabled |   |   |
| 3 | RXUPSLOT19 |   | Receive Upstream Data Slot 19. This bit defines whether or not upstream data slot 19 is received by the local slave node. | 0x0 | R/W |
|   |   | 1 | Upstream Data Slot 19 RX Enabled |   |   |
|   |   | 0 | Upstream Data Slot 19 RX Disabled |   |   |
| 2 | RXUPSLOT18 |   | Receive Upstream Data Slot 18. This bit defines whether or not upstream data slot 18 is received by the local slave node. | 0x0 | R/W |
|   |   | 1 | Upstream Data Slot 18 RX Enabled |   |   |
|   |   | 0 | Upstream Data Slot 18 RX Disabled |   |   |
| 1 | RXUPSLOT17 |   | Receive Upstream Data Slot 17. This bit defines whether or not upstream data slot 17 is received by the local slave node. | 0x0 | R/W |
|   |   | 1 | Upstream Data Slot 17 RX Enabled |   |   |
|   |   | 0 | Upstream Data Slot 17 RX Disabled |   |   |
| 0 | RXUPSLOT16 |   | Receive Upstream Data Slot 16. This bit defines whether or not upstream data slot 16 is received by the local slave node. | 0x0 | R/W |
|   |   | 1 | Upstream Data Slot 16 RX Enabled |   |   |
|   |   | 0 | Upstream Data Slot 16 RX Disabled |   |   |

Figure 35:
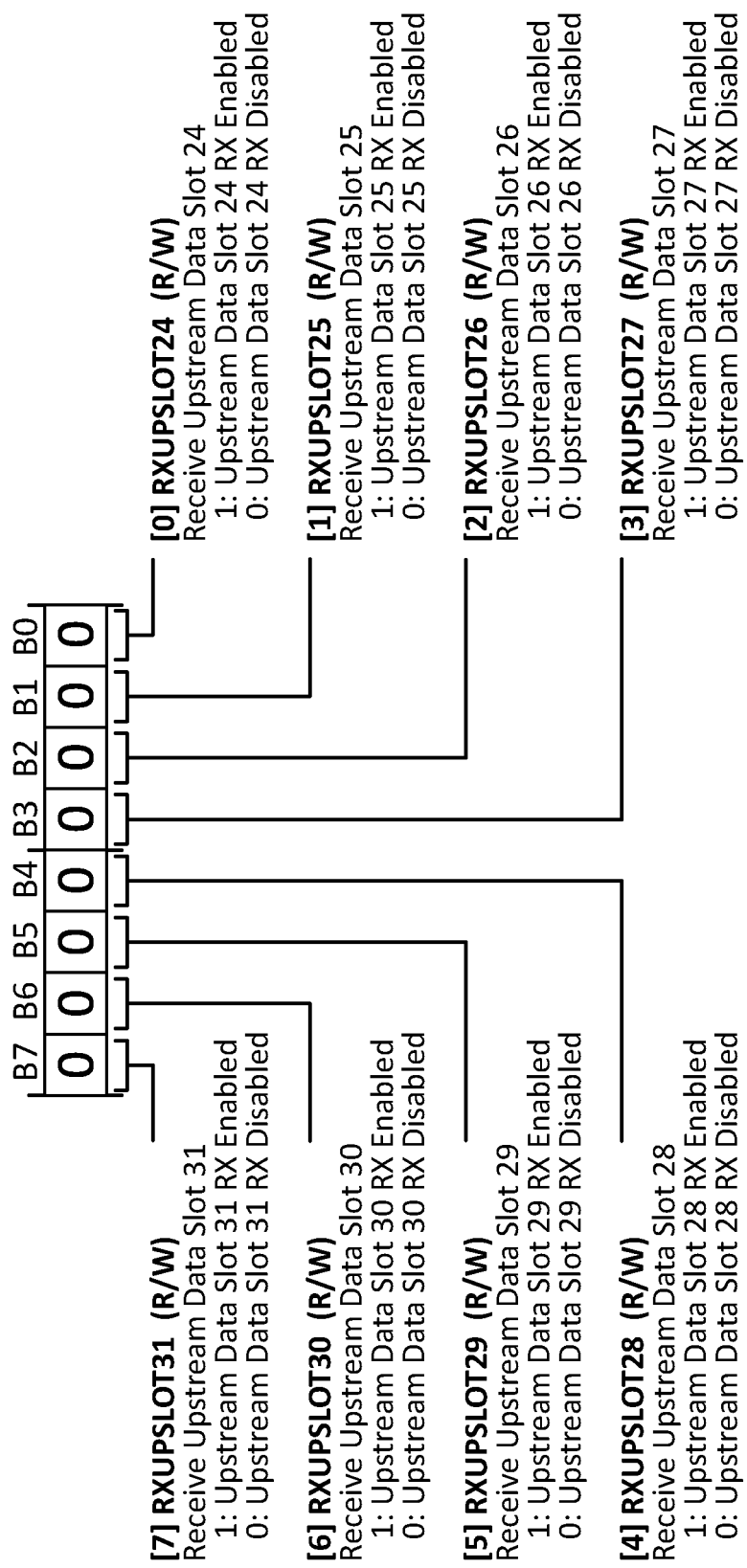

FIG. 35 illustrates an UPMASK3 register, which defines bits 31 to 24 of the 32-bit UPMASK field. As discussed above, in a slave node 104, the UPMASK field may define the upstream data slots that are received from the bus 106 by the local node. These data slots may be transmitted via I2S/TDM, and may follow any downstream slots which are received by the slave node 104 (defined in LDNSLOTS). In some embodiments, changes to this register only take effect after setting the CONTROL.NEWSTRCT bit of the master node 102. Table 4 provides bit descriptions for an example UPMASK3 register.

TABLE 4

| Bits | Bit Name | Settings | Description | Reset | Access |
|---|---|---|---|---|---|
| 7 | RXUPSLOT31 |   | Receive Upstream Data Slot 31. This bit defines whether or not upstream data slot 31 is received by the local slave node. | 0x0 | R/W |
|   |   | 1 | Upstream Data Slot 31 RX Enabled |   |   |
|   |   | 0 | Upstream Data Slot 31 RX Disabled |   |   |
| 6 | RXUPSLOT30 |   | Receive Upstream Data Slot 30. This bit defines whether or not upstream data slot 30 is received by the local slave node. | 0x0 | R/W |
|   |   | 1 | Upstream Data Slot 30 RX Enabled |   |   |
|   |   | 0 | Upstream Data Slot 30 RX Disabled |   |   |
| 5 | RXUPSLOT29 |   | Receive Upstream Data Slot 29. This bit defines whether or not upstream data slot 29 is received by the local slave node. | 0x0 | R/W |
|   |   | 1 | Upstream Data Slot 29 RX Enabled |   |   |
|   |   | 0 | Upstream Data Slot 29 RX Disabled |   |   |
| 4 | RXUPSLOT28 |   | Receive Upstream Data Slot 28. This bit defines whether or not upstream data slot 28 is received by the local slave node. | 0x0 | R/W |
|   |   | 1 | Upstream Data Slot 28 RX Enabled |   |   |
|   |   | 0 | Upstream Data Slot 28 RX Disabled |   |   |

TABLE 4-continued

| Bits | Bit Name | Settings | Description | Reset | Access |
|---|---|---|---|---|---|
| 3 | RXUPSLOT27 | | Receive Upstream Data Slot 27. This bit defines whether or not upstream data slot 27 is received by the local slave node. | 0x0 | R/W |
| | | 1 | Upstream Data Slot 27 RX Enabled | | |
| | | 0 | Upstream Data Slot 27 RX Disabled | | |
| 2 | RXUPSLOT26 | | Receive Upstream Data Slot 26. This bit defines whether or not upstream data slot 26 is received by the local slave node. | 0x0 | R/W |
| | | 1 | Upstream Data Slot 26 RX Enabled | | |
| | | 0 | Upstream Data Slot 26 RX Disabled | | |
| 1 | RXUPSLOT25 | | Receive Upstream Data Slot 25. This bit defines whether or not upstream data slot 25 is received by the local slave node. | 0x0 | R/W |
| | | 1 | Upstream Data Slot 25 RX Enabled | | |
| | | 0 | Upstream Data Slot 25 RX Disabled | | |
| 0 | RXUPSLOT24 | | Receive Upstream Data Slot 24. This bit defines whether or not upstream data slot 24 is received by the local slave node. | 0x0 | R/W |
| | | 1 | Upstream Data Slot 24 RX Enabled | | |
| | | 0 | Upstream Data Slot 24 RX Disabled | | |

Figure 36:
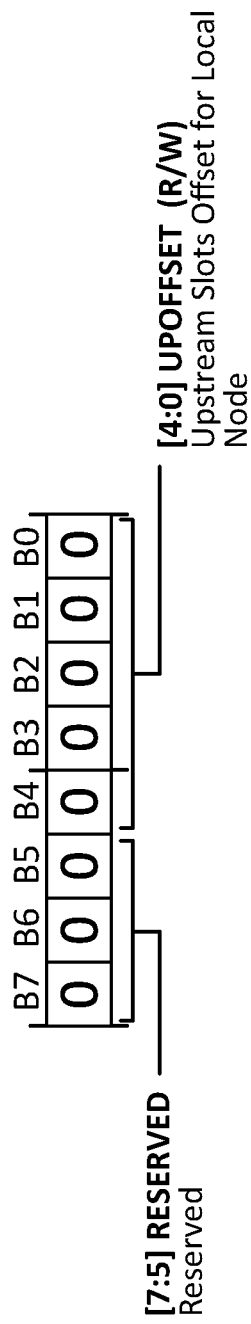
FIG. 36 illustrates a local upstream slots offset register that may be used to support slave-to-slave communication, in accordance with various embodiments.

FIG. 36 illustrates an example local upstream slots offset register (UPOFFSET). In a slave node 104, the UPOFFSET register may define a number of data slots received via I2S/TDM/PDM which are skipped before data slots are transmitted upstream by the upstream transceiver 122 on the bus 106. Table 5 provides bit descriptions for an example UPOFFSET register.

TABLE 5

| Bits | Bit Name | Settings | Description | Reset | Access |
|---|---|---|---|---|---|
| [7:5] | RESERVED | | Reserved. | 0x00 | R/W |
| [4:0] | UPOFFSET | | Upstream Slots Offset for Local Node. This bit field defines the number of data slots received via I2S/TDM/PDM which are skipped before data slots are transmitted upstream on the bus. | 0x00 | R/W |

Analogous operations may occur for downstream communication. In particular, slave nodes 104 may selectively receive bus downstream slots onto the DTXn pins. The slave nodes 104 may generate downstream slots on the bus 106 from a DRXn pin with a programmable OFFSET. As a result, this mode of operation may allow slave nodes 104 to both receive and transmit downstream data.

In some embodiments, registers or other data structures may be used to store data representative of what upstream data slots may be used by a slave node 104. For example, DNMASK0, DNMASK1, DNMASK2, and DNMASK3 registers may provide 1 bit for each possible downstream data slot. When the LDNSLOTS.DNMASKEN bit is set, these bits select which downstream slots are consumed by the local node and place them in the TX frame buffer. If the LDNSLOTS.DNMASKEN bit is not set, the LDNSLOTS register may define the number of downstream slots consumed by the local node. The DNSLOTS register may define the number of downstream data slots, starting immediately after the SCF, that are passed downstream through the slave node 104 (e.g., by the downstream transceiver 124). A variable dnmaskrx may be defined in accordance with:
if (RXDNSLOT31==1) dnmaskrx=32;
else if (RXDNSLOT30==1) dnmaskrx=31;
else if (RXDNSLOT29==1) dnmaskrx=30;
. . .
else if (RXDNSLOT02==1) dnmaskrx=3;
else if (RXDNSLOT01==1) dnmaskrx=2;
else if (RXDNSLOT00==1) dnmaskrx=1;
else dnmaskrx=0.

If dnmaskrx==0, a slave node 104 may receive (BCDNSLOTS+DNSLOTS+LDNSLOTS) downstream data slots and transmit (BCDNSLOTS+DNSLOTS) downstream data slots. If dnmaskrx!=0, a slave node 104 may receive MAX(DNSLOTS, dnmaskrx) downstream data slots and transmit (DNSLOTS+LDNSLOTS) downstream data slots. Because it is possible for a slave node 104 to transmit downstream data slots, the slave node 104 may be transmitting local downstream data slots on the downstream transceiver 124 while still receiving upstream data slots on the upstream transceiver 122. Note that setting the LDNSLOTS.DNMASKEN bit in a slave node 104 may change the meaning of the LDNSLOTS register and cause the BCDNSLOTS register to be ignored.

In some embodiments, a DNOFFSET register may define an offset to be applied in the RX frame buffer before data is taken and transmitted downstream with the downstream transceiver 124. The value of the DNOFFSET register may only be used when the slave node 104 is configured to transmit downstream data (e.g., when the DNMASK0, . . . , DNMASK3 registers are not all zero and LDNSLOTS is not zero). In a slave node 104, the meaning of the LDNSLOTS register may change depending on the LDNSLOTS.DNMASKEN bit. If the LDNSLOTS.DNMASKEN bit=0, the LDNSLOTS register may define the number of data slots that are captured by the slave node 104 during the downstream portion of the superframe. These data slots may be consumed by the slave node 104 and not passed on downstream to the next slave node 104. If the LDNSLOTS.DNMASKEN bit=1, the LDNSLOTS register may define the number of data slots which are added by the slave node 104 during the downstream portion of the superframe. These data slots may be added after the DNSLOTS data slots are passed downstream through the local node.

Figure 37:
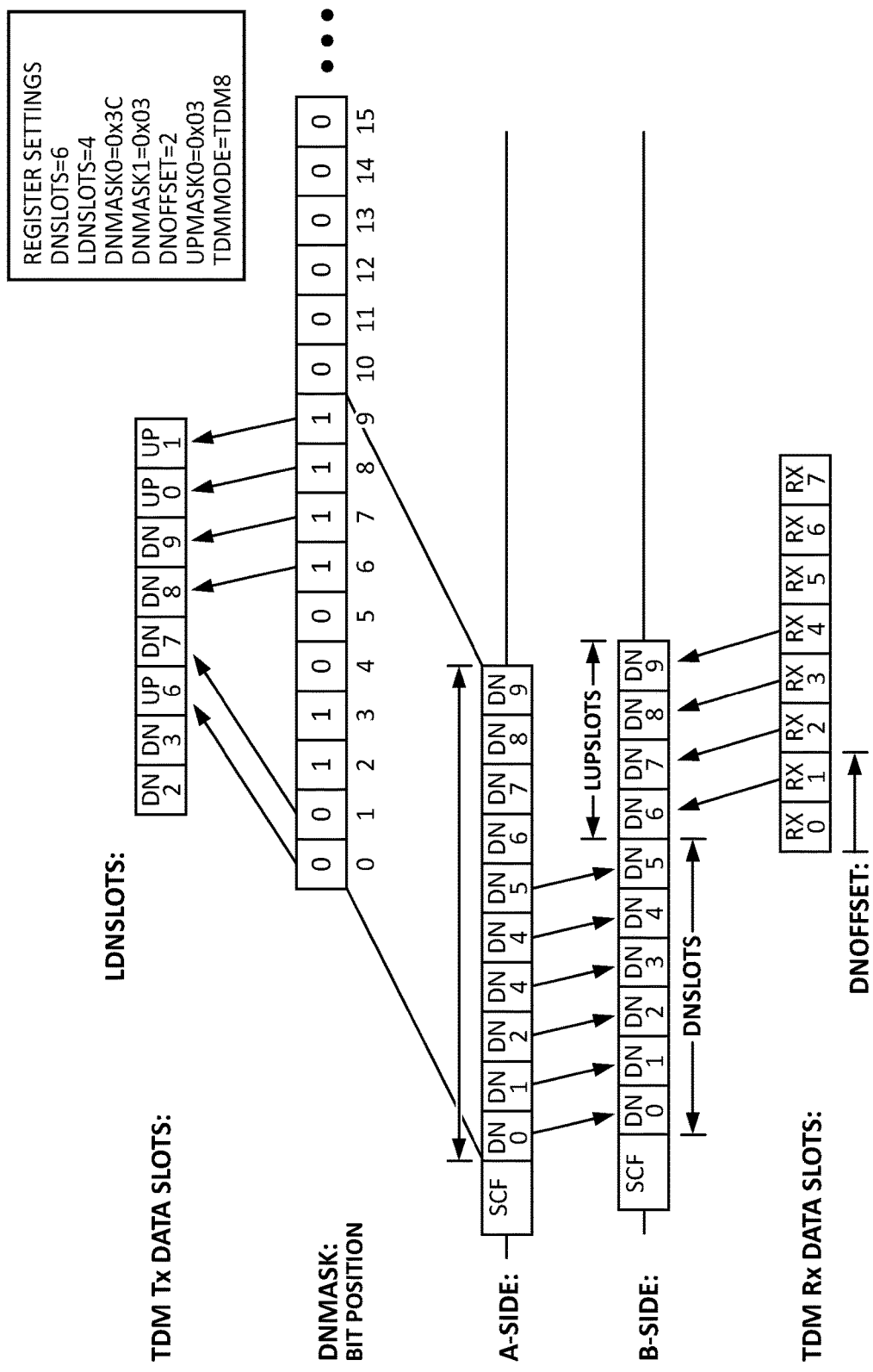
FIG. 37 provides an example of how downstream data slots may be used for slave-to-slave communication, in accordance with various embodiments.

FIG. 37 provides an example of how downstream data slots may be used in a slave node 104 after programming the DNMASK0, . . . , DNMASK3 and DNOFFSET registers for slave-to-slave communication, in accordance with various embodiments. The A-side transceiver may be the upstream transceiver 122, and the B-side transceiver may be the downstream transceiver 124. In the example of FIG. 37, the slave node 104 may provide 10 downstream data slots because RXDNSLOT09 is set and the value of DNSLOTS is 6.

Figure 38:
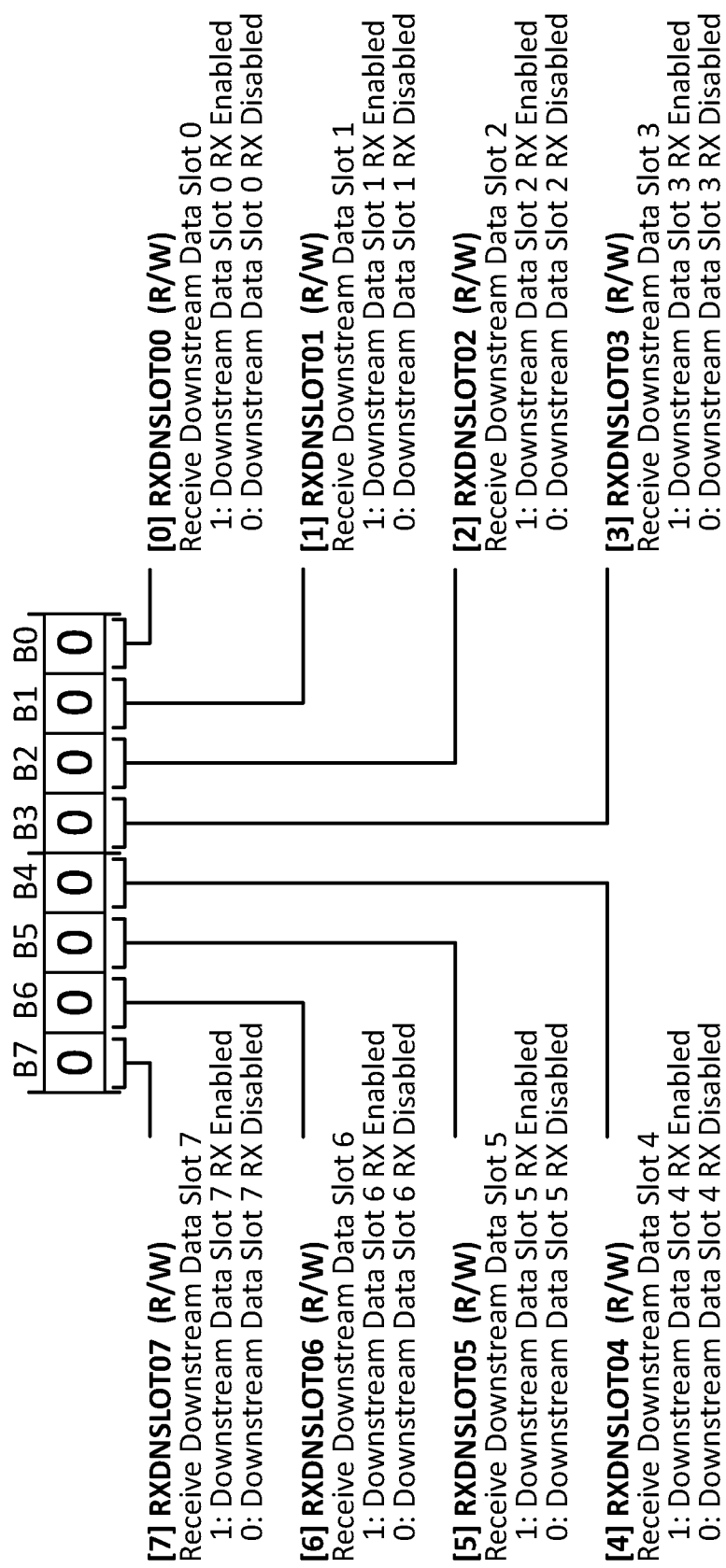
FIGS. 38-41 illustrate DNMASKn registers that may be used to support slave-to-slave communication, in accordance with various embodiments.

FIG. 38 illustrates an example of a DNMASK0 register, which defines bits 7 to 0 of a 32-bit DNMASK field. As discussed above, in a slave node 104, if any bits in DNMASKEN is set, the DNMASK field may define the downstream data slots which are received from the bus 106 by the local node. These data slots may be transmitted via I2S/TDM. If DNMASKEN is not set, the LDNSLOTS register may define the number of downstream data slots taken by the local slave node 104. In some embodiments, changes to this register only take effect after setting the CONTROL.NEWSTRCT bit of the master node 102. Table 6 provides bit descriptions for an example DNMASK0 register.

TABLE 6

| Bits | Bit Name | Settings | Description | Reset | Access |
|---|---|---|---|---|---|
| 7 | RXDNSLOT07 |  | Receive Downstream Data Slot 7. This bit defines whether or not downstream data slot 7 is received by the local slave node. | 0x0 | R/W |
|  |  | 1 | Downstream Data Slot 7 RX Enabled |  |  |
|  |  | 0 | Downstream Data Slot 7 RX Disabled |  |  |
| 6 | RXDNSLOT06 |  | Receive Downstream Data Slot 6. This bit defines whether or not downstream data slot 6 is received by the local slave node. | 0x0 | R/W |
|  |  | 1 | Downstream Data Slot 6 RX Enabled |  |  |
|  |  | 0 | Downstream Data Slot 6 RX Disabled |  |  |
| 5 | RXDNSLOT05 |  | Receive Downstream Data Slot 5. This bit defines whether or not downstream data slot 5 is received by the local slave node. | 0x0 | R/W |
|  |  | 1 | Downstream Data Slot 5 RX Enabled |  |  |
|  |  | 0 | Downstream Data Slot 5 RX Disabled |  |  |
| 4 | RXDNSLOT04 |  | Receive Downstream Data Slot 4. This bit defines whether or not downstream data slot 4 is received by the local slave node. | 0x0 | R/W |
|  |  | 1 | Downstream Data Slot 4 RX Enabled |  |  |
|  |  | 0 | Downstream Data Slot 4 RX Disabled |  |  |
| 3 | RXDNSLOT03 |  | Receive Downstream Data Slot 3. This bit defines whether or not downstream data slot 3 is received by the local slave node. | 0x0 | R/W |
|  |  | 1 | Downstream Data Slot 3 RX Enabled |  |  |
|  |  | 0 | Downstream Data Slot 3 RX Disabled |  |  |
| 2 | RXDNSLOT02 |  | Receive Downstream Data Slot 2. This bit defines whether or not downstream data slot 2 is received by the local slave node. | 0x0 | R/W |
|  |  | 1 | Downstream Data Slot 2 RX Enabled |  |  |
|  |  | 0 | Downstream Data Slot 2 RX Disabled |  |  |
| 1 | RXDNSLOT01 |  | Receive Downstream Data Slot 1. This bit defines whether or not downstream data slot 1 is received by the local slave node. | 0x0 | R/W |
|  |  | 1 | Downstream Data Slot 1 RX Enabled |  |  |
|  |  | 0 | Downstream Data Slot 1 RX Disabled |  |  |
| 0 | RXDNSLOT00 |  | Receive Downstream Data Slot 0. This bit defines whether or not downstream data slot 0 is received by the local slave node. | 0x0 | R/W |
|  |  | 1 | Downstream Data Slot 0 RX Enabled |  |  |
|  |  | 0 | Downstream Data Slot 0 RX Disabled |  |  |

Figure 39:
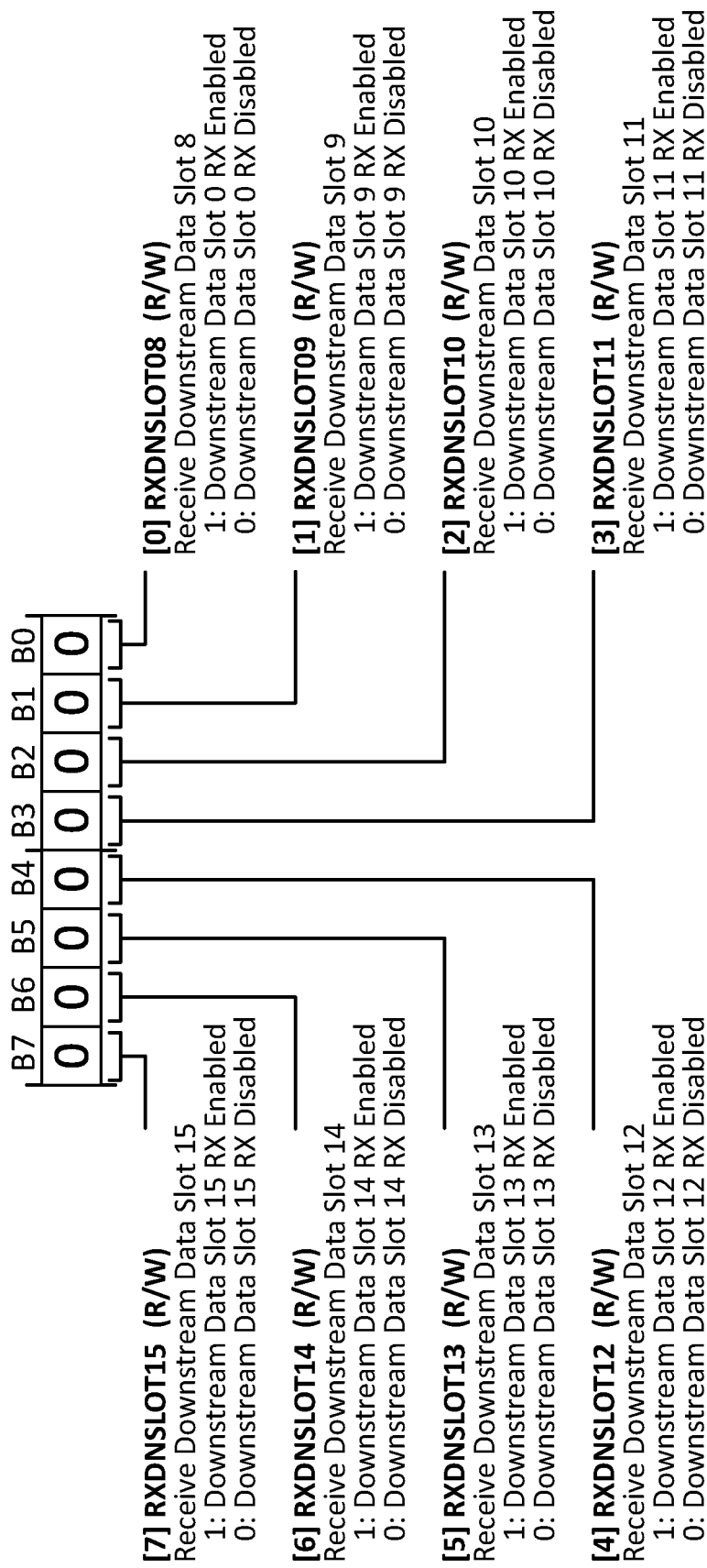

FIG. 39 illustrates an example DNMASK1 register, which defines bits 15 to 8 of the 32-bit DNMASK field. As discussed above, in a slave node 104, if any bits in DNMASKEN is set, the DNMASK field may define the downstream data slots which are received from the bus 106 by the upstream transceiver 122 of the local slave node 104. These data slots may be transmitted via I2S/TDM. If DNMASKEN is not set, the LDNSLOTS register may define the number of downstream data slots taken by the local node. In some embodiments, changes to this register only take effect after setting the CONTROL.NEWSTRCT bit of the master node 102. Table 7 provides bit descriptions for an example DNMASK1 register.

TABLE 7

| Bits | Bit Name | Settings | Description | Reset | Access |
|---|---|---|---|---|---|
| 7 | RXDNSLOT15 |  | Receive Downstream Data Slot 15. This bit defines whether or not downstream data slot 15 is received by the local slave node. | 0x0 | R/W |
|  |  | 1 | Downstream Data Slot 15 RX Enabled |  |  |
|  |  | 0 | Downstream Data Slot 15 RX Disabled |  |  |

TABLE 7-continued

| Bits | Bit Name | Settings | Description | Reset | Access |
|---|---|---|---|---|---|
| 6 | RXDNSLOT14 | | Receive Downstream Data Slot 14. This bit defines whether or not downstream data slot 14 is received by the local slave node. | 0x0 | R/W |
| | | 1 | Downstream Data Slot 14 RX Enabled | | |
| | | 0 | Downstream Data Slot 14 RX Disabled | | |
| 5 | RXDNSLOT13 | | Receive Downstream Data Slot 13. This bit defines whether or not downstream data slot 13 is received by the local slave node. | 0x0 | R/W |
| | | 1 | Downstream Data Slot 13 RX Enabled | | |
| | | 0 | Downstream Data Slot 13 RX Disabled | | |
| 4 | RXDNSLOT12 | | Receive Downstream Data Slot 12. This bit defines whether or not downstream data slot 12 is received by the local slave node. | 0x0 | R/W |
| | | 1 | Downstream Data Slot 12 RX Enabled | | |
| | | 0 | Downstream Data Slot 12 RX Disabled | | |
| 3 | RXDNSLOT11 | | Receive Downstream Data Slot 11. This bit defines whether or not downstream data slot 11 is received by the local slave node. | 0x0 | R/W |
| | | 1 | Downstream Data Slot 11 RX Enabled | | |
| | | 0 | Downstream Data Slot 11 RX Disabled | | |
| 2 | RXDNSLOT10 | | Receive Downstream Data Slot 10. This bit defines whether or not downstream data slot 10 is received by the local slave node. | 0x0 | R/W |
| | | 1 | Downstream Data Slot 10 RX Enabled | | |
| | | 0 | Downstream Data Slot 10 RX Disabled | | |
| 1 | RXDNSLOT09 | | Receive Downstream Data Slot 9. This bit defines whether or not downstream data slot 9 is received by the local slave node. | 0x0 | R/W |
| | | 1 | Downstream Data Slot 9 RX Enabled | | |
| | | 0 | Downstream Data Slot 9 RX Disabled | | |
| 0 | RXDNSLOT08 | | Receive Downstream Data Slot 8. This bit defines whether or not downstream data slot 8 is received by the local slave node. | 0x0 | R/W |
| | | 1 | Downstream Data Slot 8 RX Enabled | | |
| | | 0 | Downstream Data Slot 8 RX Disabled | | |

Figure 40:
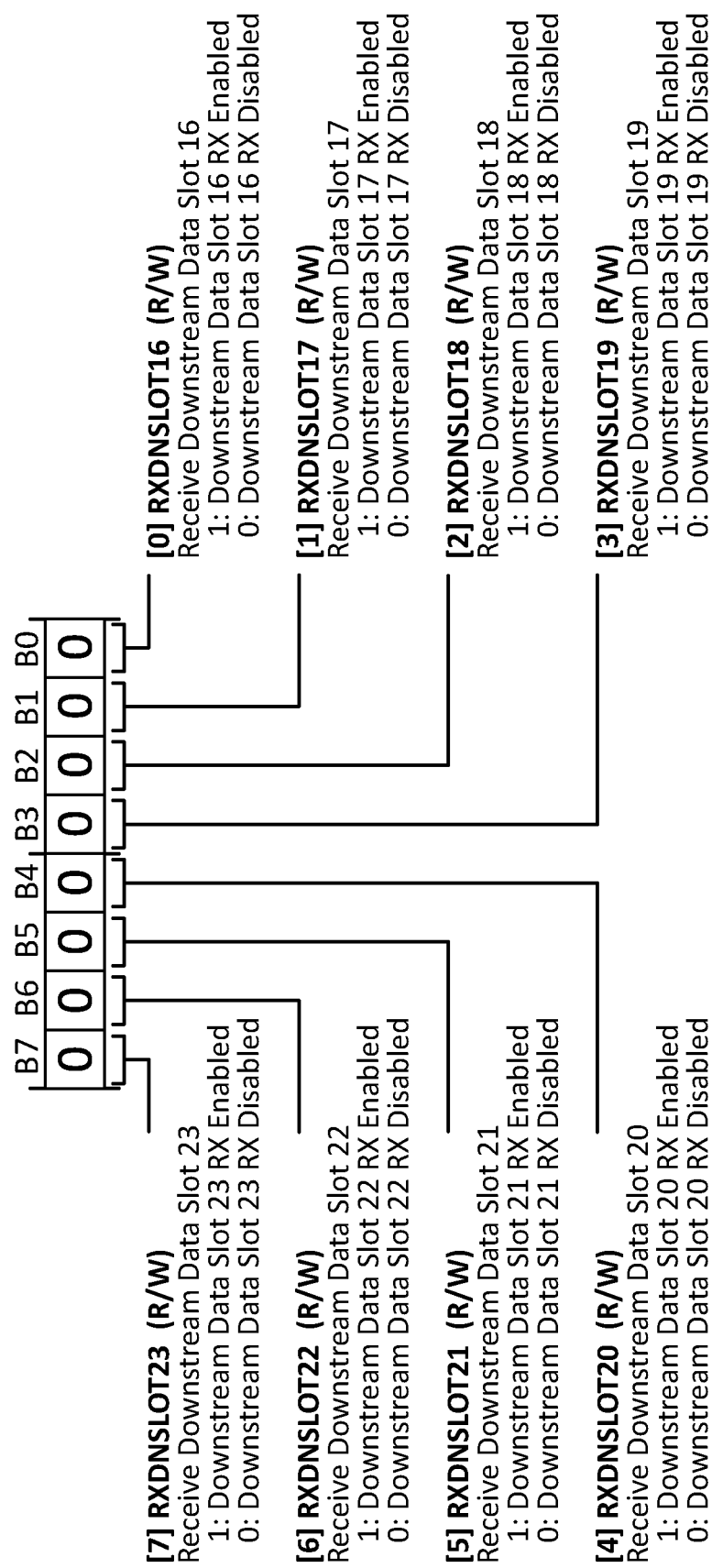

FIG. 40 illustrates an example DNMASK2 register, which defines bits 23 to 16 of the 32-bit DNMASK field. As discussed above, in a slave node 104, if any bits in DNMASKEN is set, the DNMASK field may define the downstream data slots which are received from the bus 106 by the upstream transceiver 122 of the local slave node 104. These data slots may be transmitted via I2S/TDM. If DNMASKEN is not set, the LDNSLOTS register may define the number of downstream data slots taken by the local node. In some embodiments, changes to this register only take effect after setting the CONTROL.NEWSTRCT bit of the master node 102. Table 8 provides bit descriptions for an example DNMASK2 register.

TABLE 8

| Bits | Bit Name | Settings | Description | Reset | Access |
|---|---|---|---|---|---|
| 7 | RXDNSLOT23 | | Receive Downstream Data Slot 23. This bit defines whether or not downstream data slot 23 is received by the local slave node. | 0x0 | R/W |
| | | 1 | Downstream Data Slot 23 RX Enabled | | |
| | | 0 | Downstream Data Slot 23 RX Disabled | | |
| 6 | RXDNSLOT22 | | Receive Downstream Data Slot 22. This bit defines whether or not downstream data slot 22 is received by the local . slave node | 0x0 | R/W |
| | | 1 | Downstream Data Slot 22 RX Enabled | | |
| | | 0 | Downstream Data Slot 22 RX Disabled | | |
| 5 | RXDNSLOT21 | | Receive Downstream Data Slot 21. This bit defines whether or not downstream data slot 21 is received by the local slave node. | 0x0 | R/W |
| | | 1 | Downstream Data Slot 21 RX Enabled | | |
| | | 0 | Downstream Data Slot 21 RX Disabled | | |
| 4 | RXDNSLOT20 | | Receive Downstream Data Slot 20. This bit defines whether or not downstream data slot 20 is received by the local slave node. | 0x0 | R/W |
| | | 1 | Downstream Data Slot 20 RX Enabled | | |
| | | 0 | Downstream Data Slot 20 RX Disabled | | |

TABLE 8-continued

| Bits | Bit Name | Settings | Description | Reset | Access |
|---|---|---|---|---|---|
| 3 | RXDNSLOT19 | | Receive Downstream Data Slot 19. This bit defines whether or not downstream data slot 19 is received by the local slave node. | 0x0 | R/W |
| | | 1 | Downstream Data Slot 19 RX Enabled | | |
| | | 0 | Downstream Data Slot 19 RX Disabled | | |
| 2 | RXDNSLOT18 | | Receive Downstream Data Slot 18. This bit defines whether or not downstream data slot 18 is received by the local slave node. | 0x0 | R/W |
| | | 1 | Downstream Data Slot 18 RX Enabled | | |
| | | 0 | Downstream Data Slot 18 RX Disabled | | |
| 1 | RXDNSLOT17 | | Receive Downstream Data Slot 17. This bit defines whether or not downstream data slot 17 is received by the local slave node. | 0x0 | R/W |
| | | 1 | Downstream Data Slot 17 RX Enabled | | |
| | | 0 | Downstream Data Slot 17 RX Disabled | | |
| 0 | RXDNSLOT16 | | Receive Downstream Data Slot 16. This bit defines whether or not downstream data slot 16 is received by the local slave node. | 0x0 | R/W |
| | | 1 | Downstream Data Slot 16 RX Enabled | | |
| | | 0 | Downstream Data Slot 16 RX Disabled | | |

Figure 41:
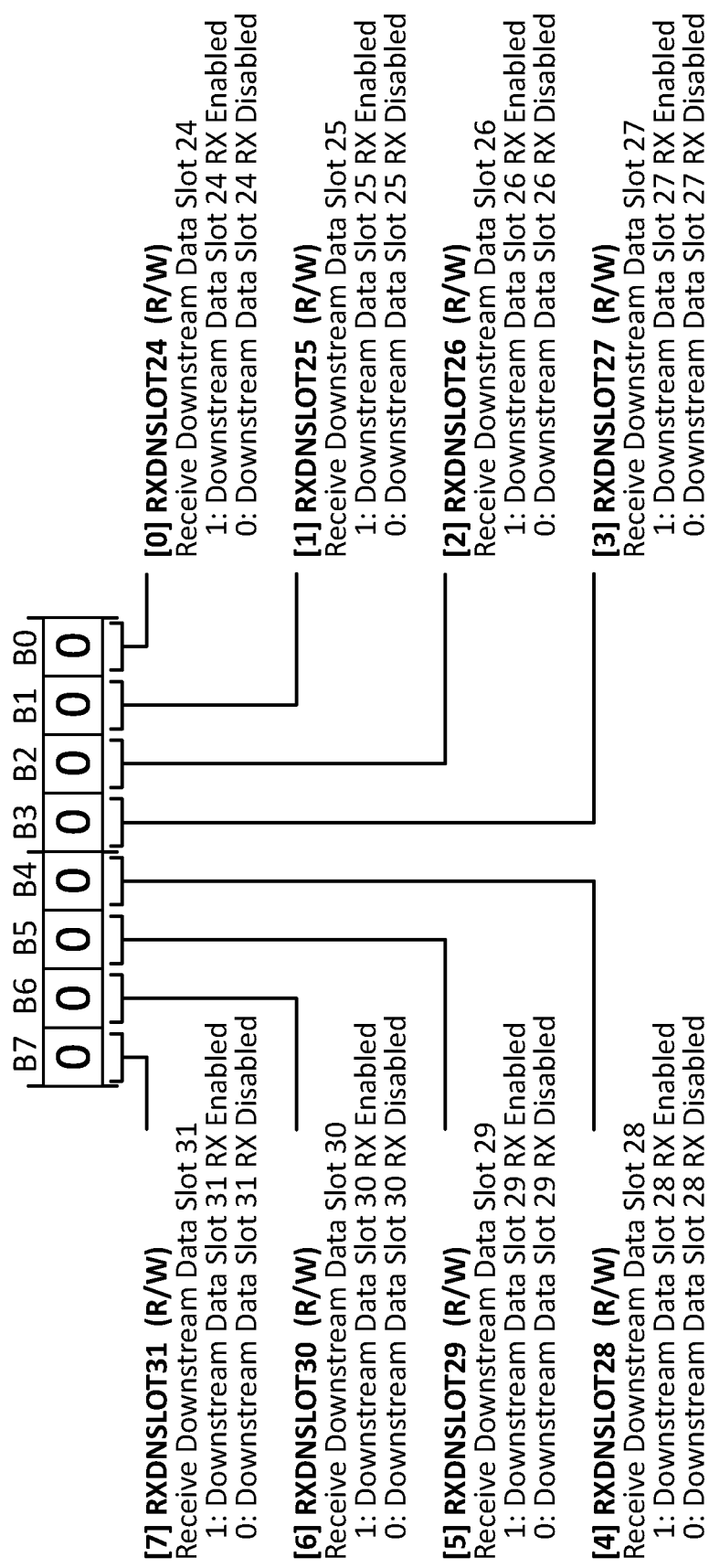

FIG. 41 illustrates an example DNMASK3 register, which defines bits 31 to 24 of the 32-bit DNMASK field. As discussed above, in a slave node 104, if any bits in DNMASKEN is set, the DNMASK field may define the downstream data slots which are received from the bus 106 by the upstream transceiver 122 of the local slave node 104. These data slots may be transmitted via I2S/TDM. If DNMASKEN is not set, the LDNSLOTS register may define the number of downstream data slots taken by the local node. In some embodiments, changes to this register only take effect after setting the CONTROL.NEWSTRCT bit of the master node 102. Table 9 provides bit descriptions for an example DNMASK3 register.

TABLE 9

| Bits | Bit Name | Settings | Description | Reset | Access |
|---|---|---|---|---|---|
| 7 | RXDNSLOT31 | | Receive Downstream Data Slot 31. This bit defines whether or not downstream data slot 31 is received by the local slave node. | 0x0 | R/W |
| | | 1 | Downstream Data Slot 31 RX Enabled | | |
| | | 0 | Downstream Data Slot 31 RX Disabled | | |
| 6 | RXDNSLOT30 | | Receive Downstream Data Slot 30. This bit defines whether or not downstream data slot 30 is received by the local slave node. | 0x0 | R/W |
| | | 1 | Downstream Data Slot 30 RX Enabled | | |
| | | 0 | Downstream Data Slot 30 RX Disabled | | |
| 5 | RXDNSLOT29 | | Receive Downstream Data Slot 29. This bit defines whether or not downstream data slot 29 is received by the local slave node. | 0x0 | R/W |
| | | 1 | Downstream Data Slot 29 RX Enabled | | |
| | | 0 | Downstream Data Slot 29 RX Disabled | | |
| 4 | RXDNSLOT28 | | Receive Downstream Data Slot 28. This bit defines whether or not downstream data slot 28 is received by the local slave node. | 0x0 | R/W |
| | | 1 | Downstream Data Slot 28 RX Enabled | | |
| | | 0 | Downstream Data Slot 28 RX Disabled | | |
| 3 | RXDNSLOT27 | | Receive Downstream Data Slot 27. This bit defines whether or not downstream data slot 27 is received by the local slave node. | 0x0 | R/W |
| | | 1 | Downstream Data Slot 27 RX Enabled | | |
| | | 0 | Downstream Data Slot 27 RX Disabled | | |
| 2 | RXDNSLOT26 | | Receive Downstream Data Slot 26. This bit defines whether or not downstream data slot 26 is received by the local slave node. | 0x0 | R/W |
| | | 1 | Downstream Data Slot 26 RX Enabled | | |
| | | 0 | Downstream Data Slot 26 RX Disabled | | |
| 1 | RXDNSLOT25 | | Receive Downstream Data Slot 25. This bit defines whether or not downstream data slot 25 is received by the local slave node. | 0x0 | R/W |
| | | 1 | Downstream Data Slot 25 RX Enabled | | |
| | | 0 | Downstream Data Slot 25 RX Disabled | | |

TABLE 9-continued

| Bits | Bit Name | Settings | Description | Reset | Access |
|---|---|---|---|---|---|
| 0 | RXDNSLOT24 | | Receive Downstream Data Slot 24. This bit defines whether or not downstream data slot 24 is received by the local slave node. | 0x0 | R/W |
| | | 1 | Downstream Data Slot 24 RX Enabled | | |
| | | 0 | Downstream Data Slot 24 RX Disabled | | |

Figure 42:
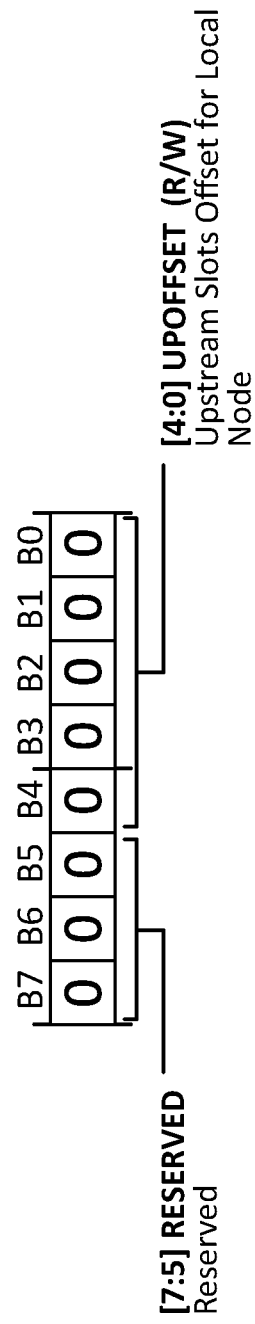
FIG. 42 illustrates a local downstream slots offset register that may be used to support slave-to-slave communication, in accordance with various embodiments.

FIG. 42 illustrates an example of a local downstream slots offset register (DNOFFSET). In a slave node 104, the DNOFFSET register may define a number of data slots received via I2S/TDM/PDM which are skipped before data slots are transmitted downstream on the bus 106 by the slave node 104. The value in the DNOFFSET register may only be used if any of the bits in the DNMASKEN is set. Table 10 provides bit descriptions for an example UPOFFSET register.

TABLE 10

| Bits | Bit Name | Settings | Description | Reset | Access |
|---|---|---|---|---|---|
| [7:5] | RESERVED | | Reserved. | 0x00 | R/W |
| [4:0] | DNOFFSET | | Downstream Slots Offset for Local Node. This bit field defines number of data slots received via I2S/TDM/PDM which are skipped before data slots are transmitted upstream on the bus. | 0x00 | R/W |

Figure 43:
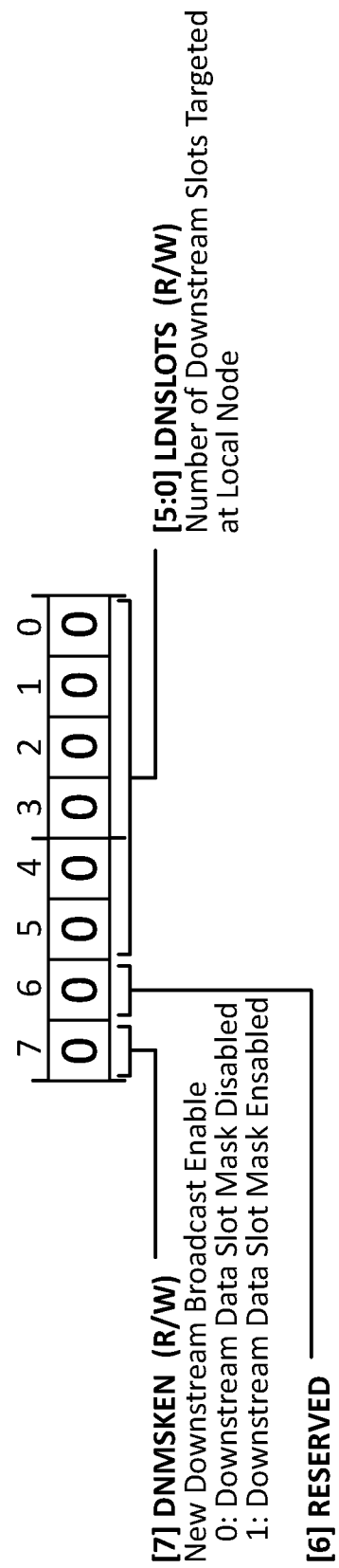
FIG. 43 illustrates a local downstream slots register, and its bit descriptions, that may be used to support slave-to-slave communication, in accordance with various embodiments.

FIG. 43 illustrates an example of a local downstream slots register (LDNSLOTS). In a slave node 104, the meaning of the LDNSLOTS register may change depending on whether or not DNMASKEN is set. If DNMASKEN is 0, the LDNSLOTS register may define the number of data slots which are captured by the local slave node 104 during the downstream portion of the superframe. These data slots are consumed by the local slave node 104 and not passed on downstream to the next slave node 104. If DNMASKEN is 1, the LDNSLOTS register may define the number of data slots which are added by the local slave node 104 during the downstream portion of the superframe. These data slots are added after DNSLOTS data slots are passed downstream through the local slave node 104. In some embodiments, changes to this register only take effect after setting the CONTROL.NEWSTRCT bit of the master node 102. The LDNSLOTS register may only be relevant in slave nodes 104. Table 11 provides bit descriptions for an example LDNSLOTS register.

TABLE 11

| Bits | Bit Name | Description | Default |
|---|---|---|---|
| 7 | DNMASKEN | New Downstream Broadcast Enable<br>1'b0—Downstream Data Slot Mask Disabled<br>1'b1—Downstream Data Slot Mask Enabled | 'h0 |
| 6 | | Reserved | 0 |
| 5:0 | LDNSLOTS | Number of Downstream Slots Targeted at Local Node The LDNSLOTS field defines the number of data slots which are captured by the local node during the downstream portion of the superframe. These bits should be programmed with a value between 0 and 32. | 'h0 |

Figure 44:
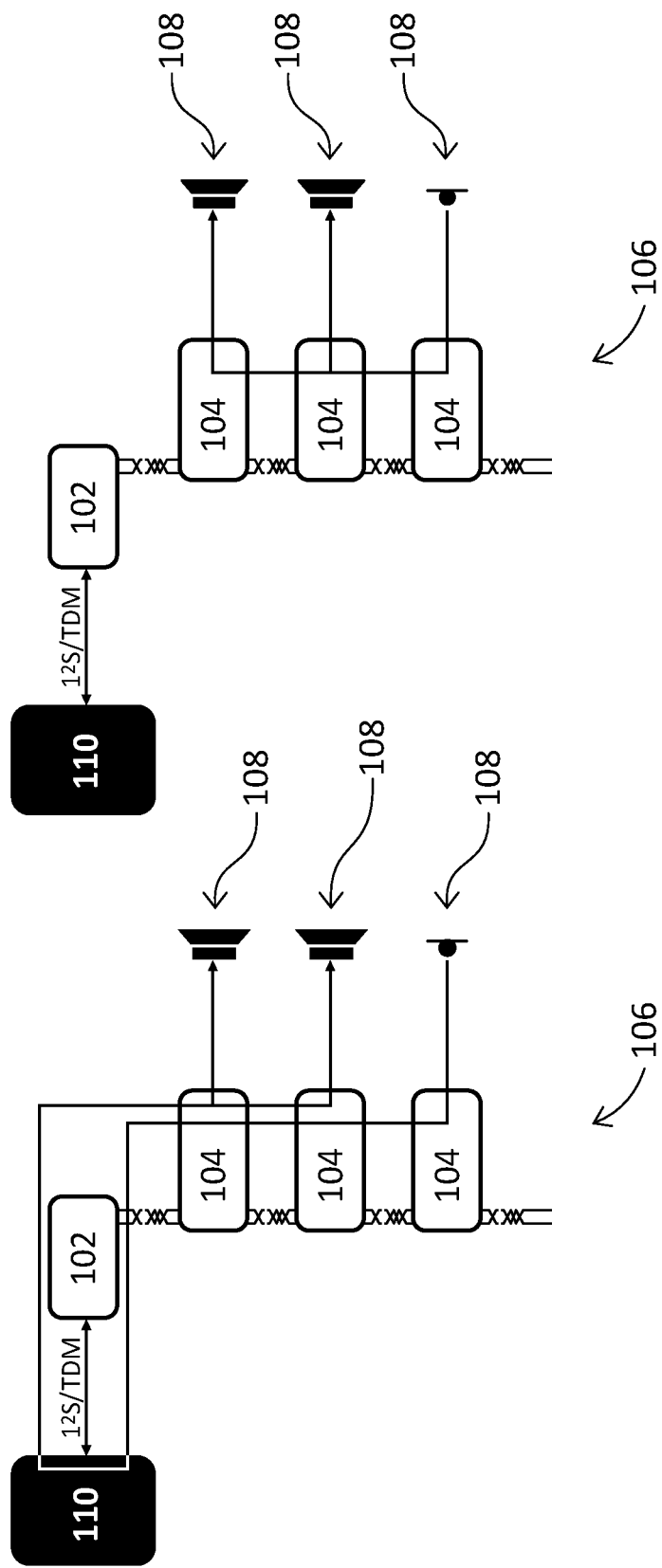
FIGS. 44 and 45 illustrate non-slave-to-slave arrangements (left) and slave-to-slave arrangements for different communication scenarios, in accordance with various embodiments.
Figure 45:
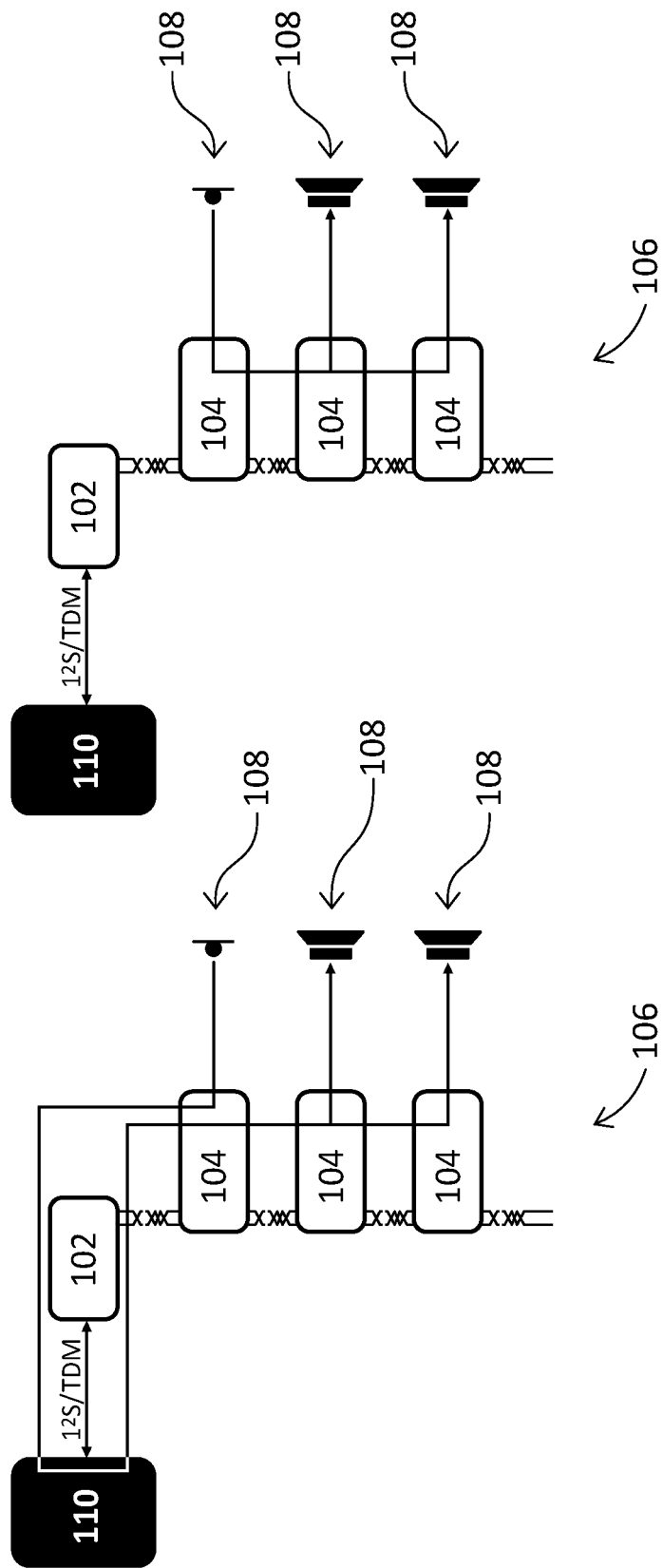

FIGS. 44 and 45 illustrate various example scenarios utilizing any of the slave-to-slave communications techniques disclosed herein. FIG. 44 illustrates a first arrangement (left) in which upstream communications from a microphone at a third slave node 104 on the bus 106 must go through the master node 102 and host 110 before being routed downstream to speakers coupled to first and second slave nodes 104, and a second slave-to-slave arrangement (right) in which upstream communications from the microphone can be routed upstream directly to the speakers without having to go through the master node 102 and host 110 (e.g., a DSP). The arrangements of FIG. 44 may allow slave nodes 104 closer to the master node 102 to directly consume data from slave nodes 104 further away from the master node 102 without routing data through the master node 102 or the host 110. This may reduce the time delay of communications and save bus bandwidth.

FIG. 45 illustrates a first arrangement (left) in which downstream communications from a microphone at a first slave node 104 on the bus 106 must be first routed upstream through the master node 102 and host 110 before being routed downstream to speakers coupled to second and third slave nodes 104, and a second slave-to-slave arrangement (right) in which communications from the microphone can be routed downstream directly to the speakers without having to go through the master node 102 and host 110 (e.g., a DSP). The arrangements of FIG. 45 may allow slave nodes 104 closer to the master node 102 to provide data to slave nodes 104 further away from the master node 102 without routing data through the master node 102 or the host 110. This may reduce the time delay of communications and save bus bandwidth.

FIGS. 46-55 illustrate an example of slave-to-slave communications on a multi-node, daisy-chained bus, in accordance with various ones of the embodiments discussed above. In particular, each of FIGS. 46-55 illustrate how data may move along a bus 106 in a particular example system 100 in accordance with various embodiments disclosed herein, and also illustrate the structure of superframes passed between adjacent nodes on the bus 106. As discussed above, the length of a superframe may depend on the sampling rate; for example, in some embodiments, a superframe may have a length of 20.83 microseconds when the sampling rate is 48 kilohertz.

Figure 46:
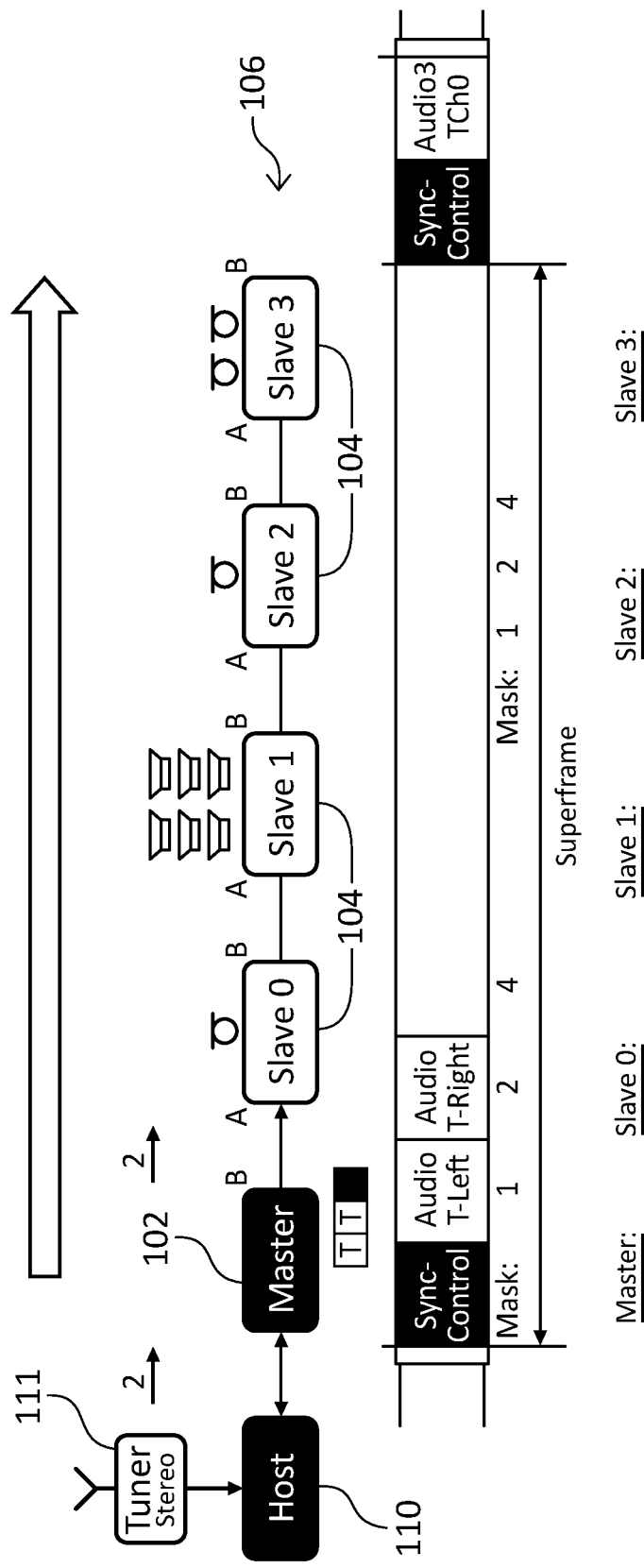
FIGS. 46-55 illustrate an example of slave-to-slave communications on a multi-node, daisy-chained bus, in accordance with various embodiments.

FIG. 46 illustrates an example system 100 including a host 110 coupled to a stereo tuner 111. The host 110 is coupled to a master node 102, and the master node 102 is coupled to a daisy chain of four slave nodes 104 (identified as Slave 0, Slave 1, Slave 2, and Slave 3). Each of the slave nodes 104 in the system 100 of FIG. 46 is coupled to one or more associated peripheral devices 108. In particular, as illustrated in FIG. 46, Slave 0 is coupled to a microphone, Slave 1 is coupled to six speakers, Slave 2 is coupled to a microphone, and Slave 3 is coupled to three microphones. Slave 1 may include, for example, an amplifier that drives its associated speakers. As noted above, the particular number and type of slave nodes 104, and the particular number and type of peripheral devices 108, illustrated in FIG. 46 (and FIGS. 47-55) are simply illustrative, and any suitable number and type may be used in accordance with the techniques disclosed herein.

FIG. 46 also illustrates a scenario in which the master node 102 receives data from the tuner 111 (e.g., left and right audio data), and the master node 102 prepares to transmit a superframe downstream to Slave 0. As shown in FIG. 46, the superframe transmitted downstream from the master node 102 to Slave 0 starts with an SCF and is followed by a downstream data slot for each of the left and right audio data from the tuner 111. The value of DNSLOTS is equal to 2 for the master node 102 in this scenario.

Figure 47:
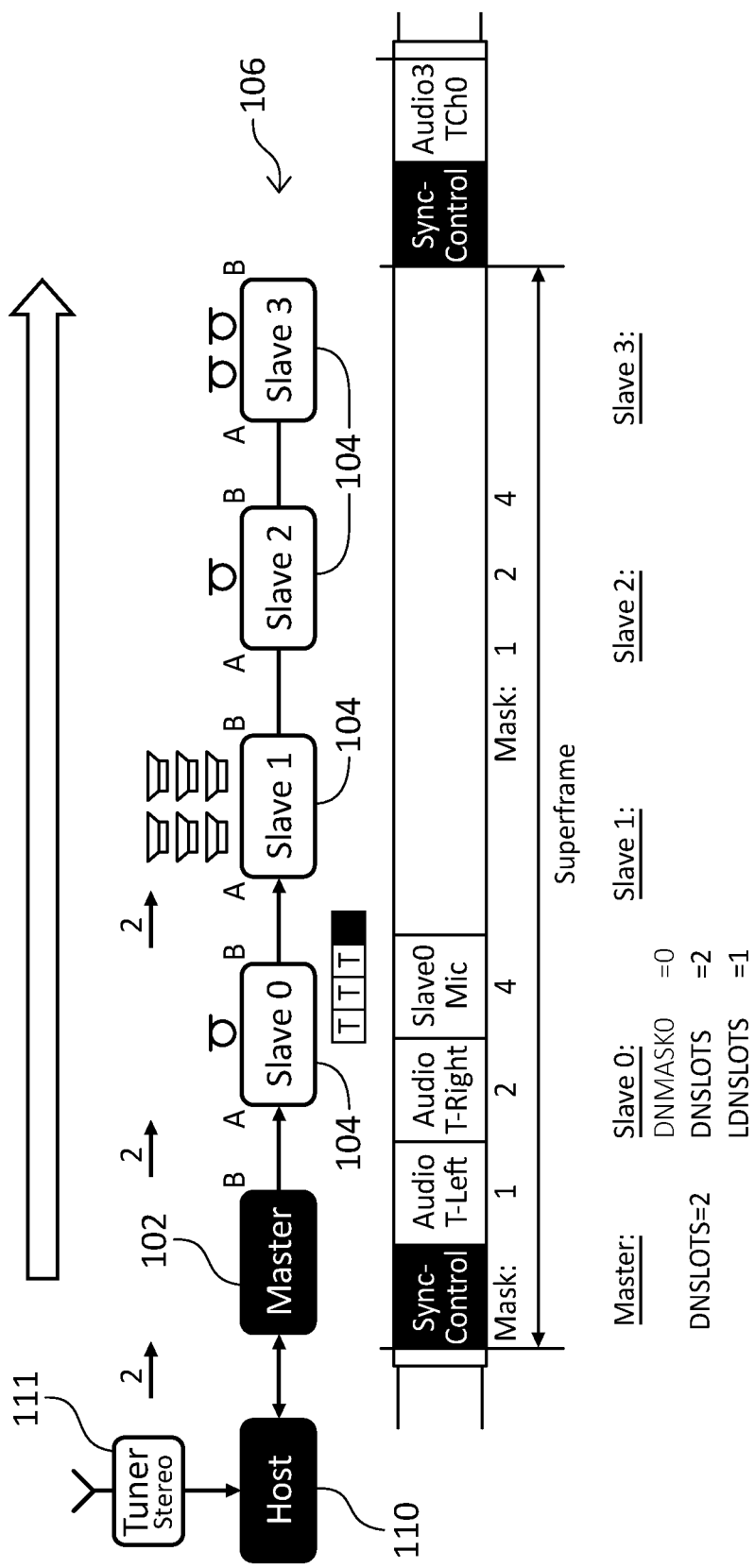

FIG. 47 illustrates a scenario in which Slave 0 has received a superframe from the master node 102, as illustrated in FIG. 46, and prepares to transmit a superframe downstream to Slave 1. As shown in FIG. 47, the superframe transmitted downstream from Slave 0 to Slave 1 starts with an SCF and is followed by a downstream data slot for each of the left and right audio data from the tuner 111 (received from the master node 102) and a downstream data slot for microphone data generated by the microphone associated with Slave 0. The value of DNSLOTS is equal to 2 for Slave 0 (indicating that two downstream slots will be occupied by data received from an upstream node), and the value of LDNSLOTS is equal to 1 for Slave 0 (indicating that Slave 0 will add a single downstream slot of data). The value of DNMASK0 is equal to 0 for Slave 0 in this scenario (indicating that Slave 0 will not consume any of the data transmitted from the master node 102).

Figure 48:
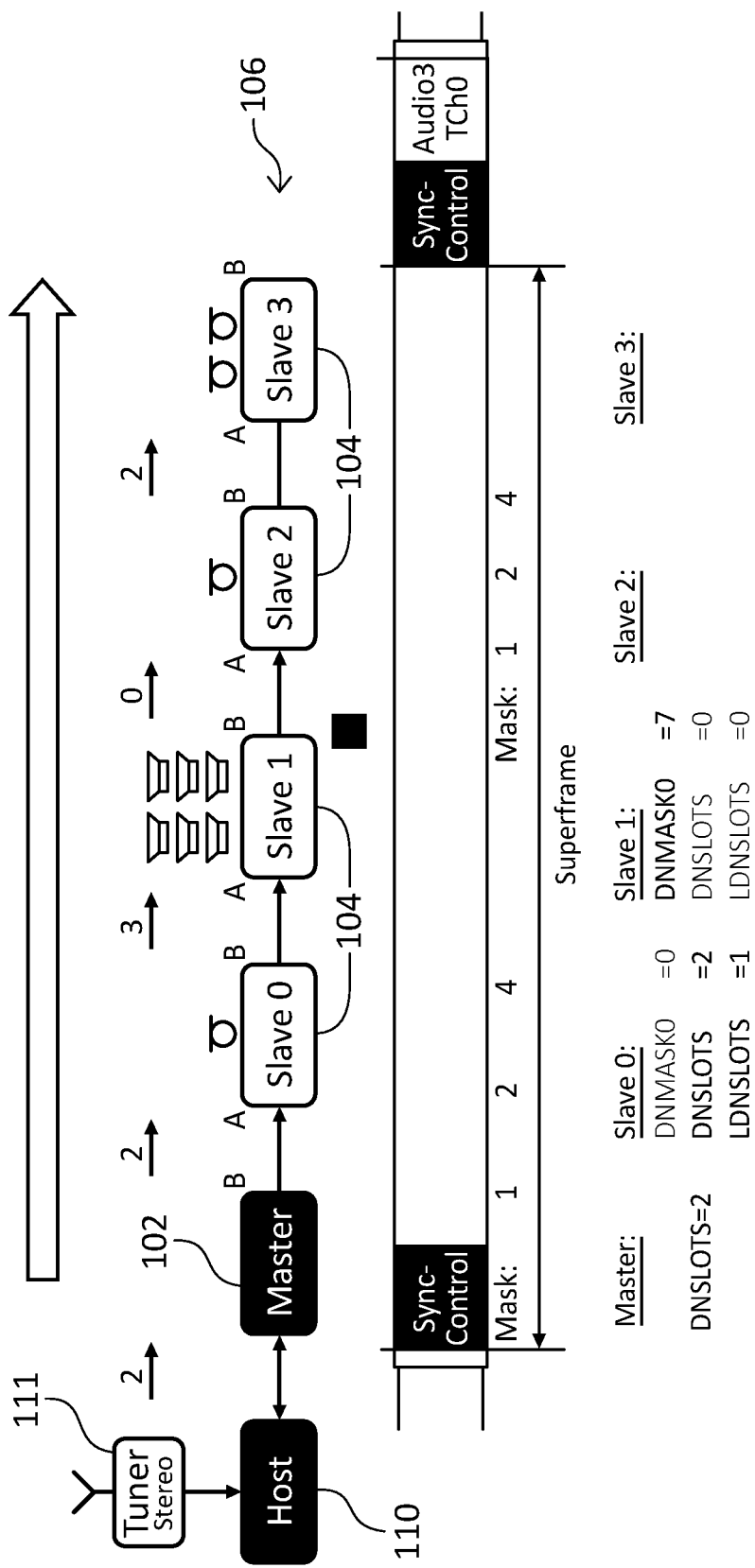

FIG. 48 illustrates a scenario in which Slave 1 has received a superframe from Slave 0, as illustrated in FIG. 47, and prepares to transmit a superframe downstream to Slave 2. As shown in FIG. 48, Slave 1 will "consume" all of the data from Slave 0 (i.e., the left and right audio data from the tuner 111, and the data from the microphone associated with Slave 0), and will not return any data or add any other data to the superframe that will be transmitted from Slave 1 to Slave 2. In some embodiments, Slave 1 will use all of the data consumed from Slave 0 by outputting this data to the speakers associated with Slave 1. Thus, the superframe transmitted downstream from Slave 1 to Slave 2 starts with an SCF and is not followed by any additional data. The value of DNSLOTS is equal to 0 for Slave 1 (indicating that no downstream data slots will be occupied by data received from an upstream node), and the value of LDNSLOTS is equal to 0 for Slave 1 (indicating that Slave 1 will add no downstream data slots). The value of DNMASK0 is equal to 7 for Slave 1 in this scenario (indicating that Slave 1 consumes the data received from Slave 0 in the downstream slots associated with mask values 1, 2, and 4).

Figure 49:
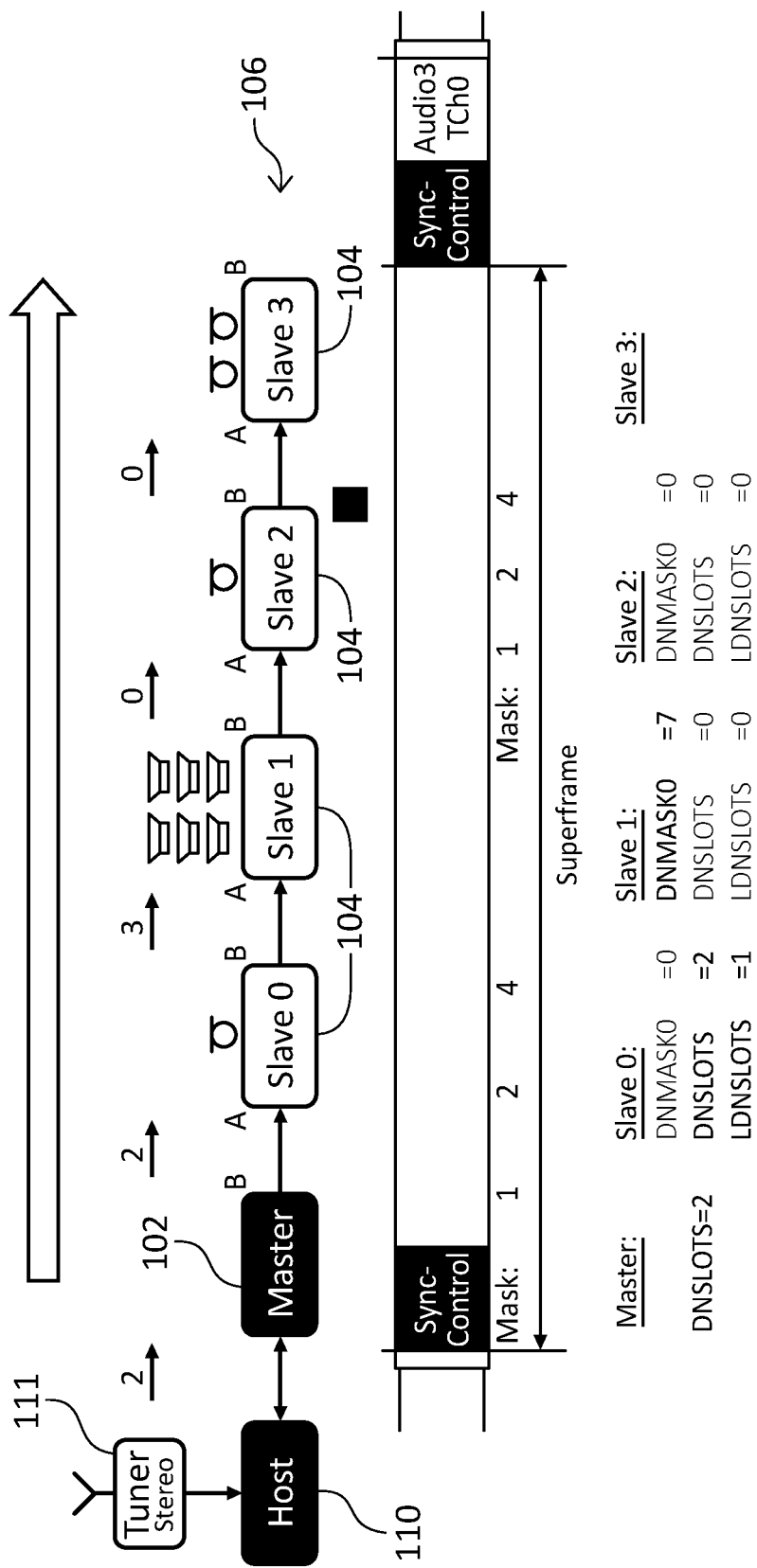

FIG. 49 illustrates a scenario in which Slave 2 has received a superframe from Slave 1, as illustrated in FIG. 48 (i.e., just the SCF), and prepares to transmit a superframe downstream to Slave 3. As shown in FIG. 49, Slave 2 will not add any other data to the superframe that will be transmitted from Slave 2 to Slave 3. Thus, the superframe transmitted downstream from Slave 2 to Slave 3 starts with an SCF and is not followed by any additional data. The value of DNSLOTS is equal to 0 for Slave 2 (indicating that no downstream data slots will be occupied by data received from an upstream node), and the value of LDNSLOTS is equal to 0 for Slave 2 (indicating that Slave 2 will add no downstream data slots). The value of DNMASK0 is equal to 0 for Slave 2 in this scenario (indicating that Slave 2 consumes no data received from Slave 1).

Figure 50:
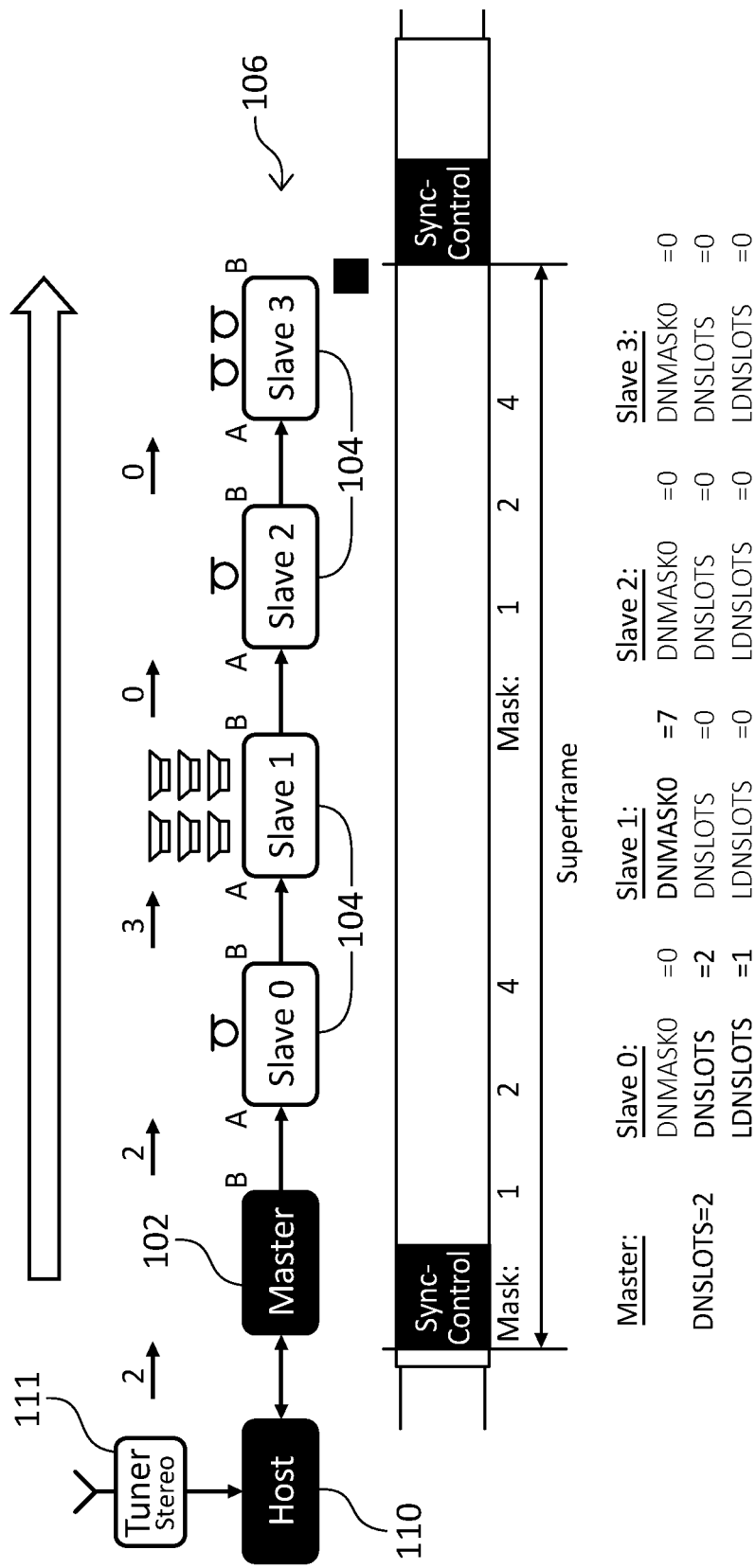

FIG. 50 illustrates a scenario in which Slave 3 has received a superframe from Slave 2, as illustrated in FIG. 49 (i.e., just the SCF). Since Slave 3 is the last slave node 104 along the bus 106, it need not perform any downstream transmissions. The value of DNSLOTS is equal to 0 for Slave 3 (indicating that no downstream data slots will be occupied by data received from an upstream node), and the value of LDNSLOTS is equal to 0 for Slave 3 (indicating that Slave 3 will add no downstream data slots). The value of DNMASK0 is equal to 0 for Slave 3 in this scenario (indicating that Slave 3 consumes no data received from Slave 2).

Figure 51:
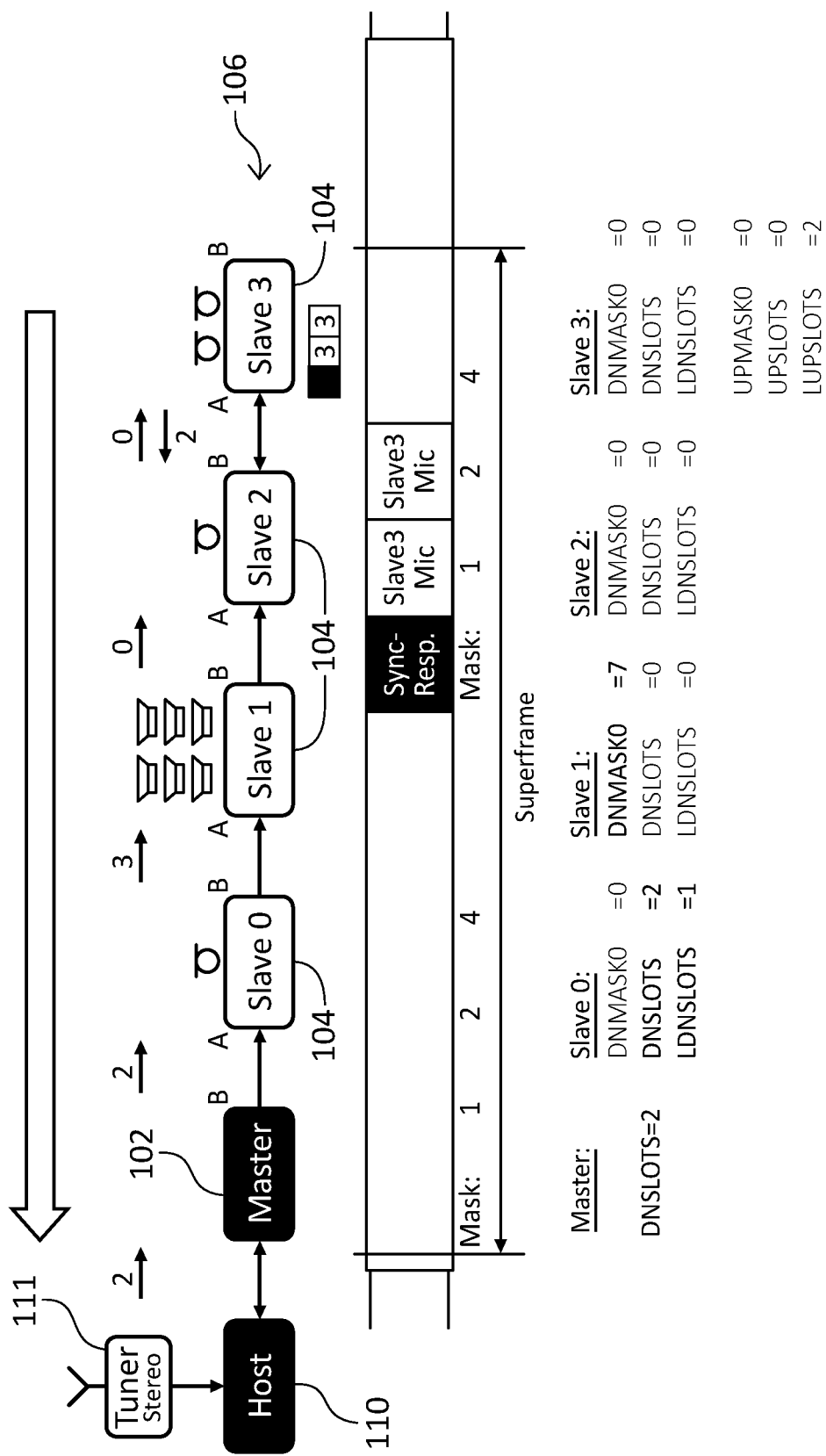

FIG. 51 illustrates a scenario in which Slave 3, subsequent to the receipt of a superframe from Slave 2 as discussed above with reference to FIG. 50, prepares to transmit a superframe back upstream to Slave 2. As shown in FIG. 51, the superframe transmitted upstream by Slave 3 to Slave 2 starts with an SRF and is followed by an upstream data slot for each of the 2 microphones associated with Slave 3. The value of UPSLOTS is equal to 0 for Slave 3 (indicating that no upstream slots will be occupied by data received from a downstream node), and the value of LUPSLOTS is equal to 2 for Slave 3 (indicating that Slave 3 will add two upstream slots of data). The value of UPMASK0 is equal to 0 for Slave 3 in this scenario (indicating that Slave 3 will not consume any data transmitted from any downstream slave nodes 104).

Figure 52:
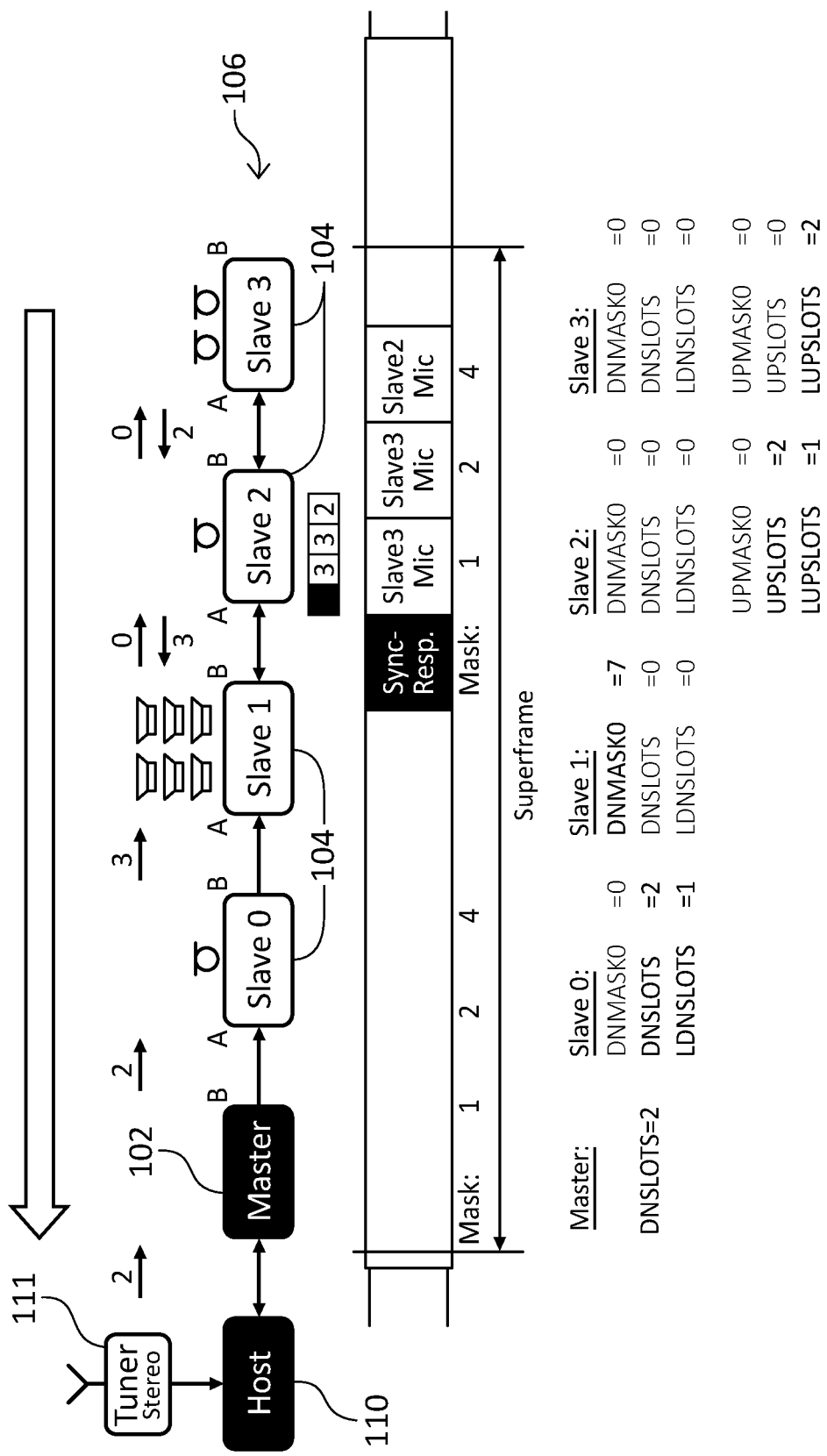

FIG. 52 illustrates a scenario in which Slave 2 has received a superframe from Slave 3, as illustrated in FIG. 51, and prepares to transmit a superframe upstream to Slave 1. As shown in FIG. 52, the superframe transmitted upstream by Slave 2 to Slave 1 starts with an SRF and is followed by the 2 upstream data slots from Slave 3 and an additional upstream data slot occupied by data generated by the microphone associated with Slave 2. The value of UPSLOTS is equal to 2 for Slave 2 (indicating that two upstream slots will be occupied by data received from a downstream node), and the value of LUPSLOTS is equal to 1 for Slave 2 (indicating that Slave 2 will add one upstream slot of data). The value of UPMASK0 is equal to 0 for Slave 2 in this scenario (indicating that Slave 2 will not consume any data transmitted from any downstream slave nodes 104).

Figure 53:
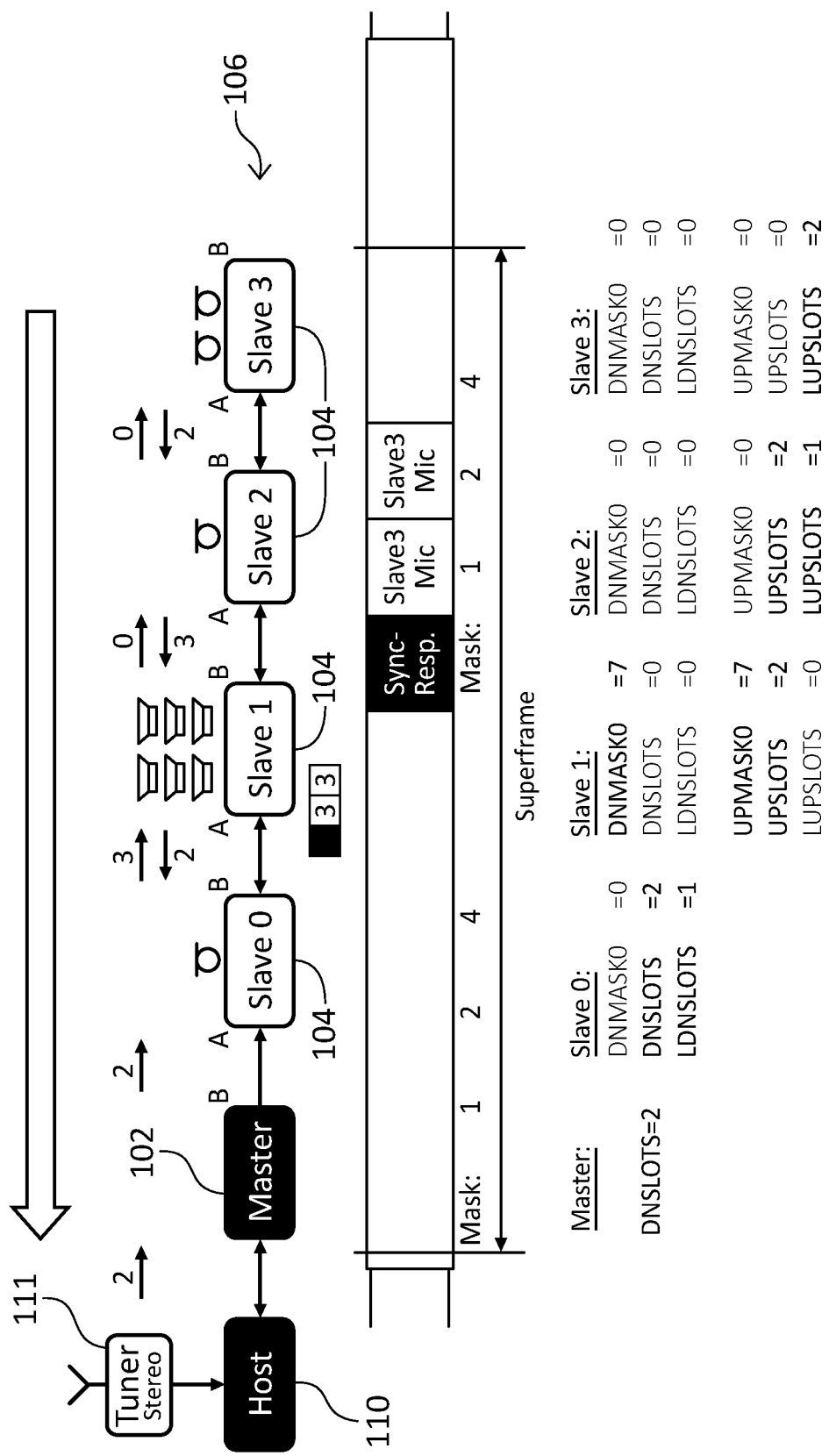

FIG. 53 illustrates a scenario in which Slave 1 has received a superframe from Slave 2, as illustrated in FIG. 52, and prepares a transmit a superframe upstream to Slave 0. As shown in FIG. 53, Slave 1 will consume the data from the microphones associated with Slave 2 and Slave 3, and will put the data from the microphones associated with Slave 3 back on the bus 106 to be transmitted upstream to Slave 0. In some embodiments, Slave 1 will use all of the data consumed from Slave 2 by outputting this data to the speakers associated with Slave 1. As shown in FIG. 53, the superframe transmitted upstream by Slave 1 to Slave 0 starts with an SRF and is followed by an upstream data slot for the data generated by each of the 2 microphones associated with Slave 3. Slave 1 will not put any additional data upstream on the bus 106. The value of UPSLOTS is equal to 2 for Slave 1 (indicating that two upstream slots will be occupied by data received from a downstream node), and the value of LUPSLOTS is equal to 0 for Slave 1 (indicating that Slave 1 will not add any upstream slots of data). The value of UPMASK0 is equal to 7 for Slave 1 in this scenario (indicating that Slave 1 consumes the data received from Slave 2 in the upstream slots associated with mask values 1, 2, and 4).

Figure 54:
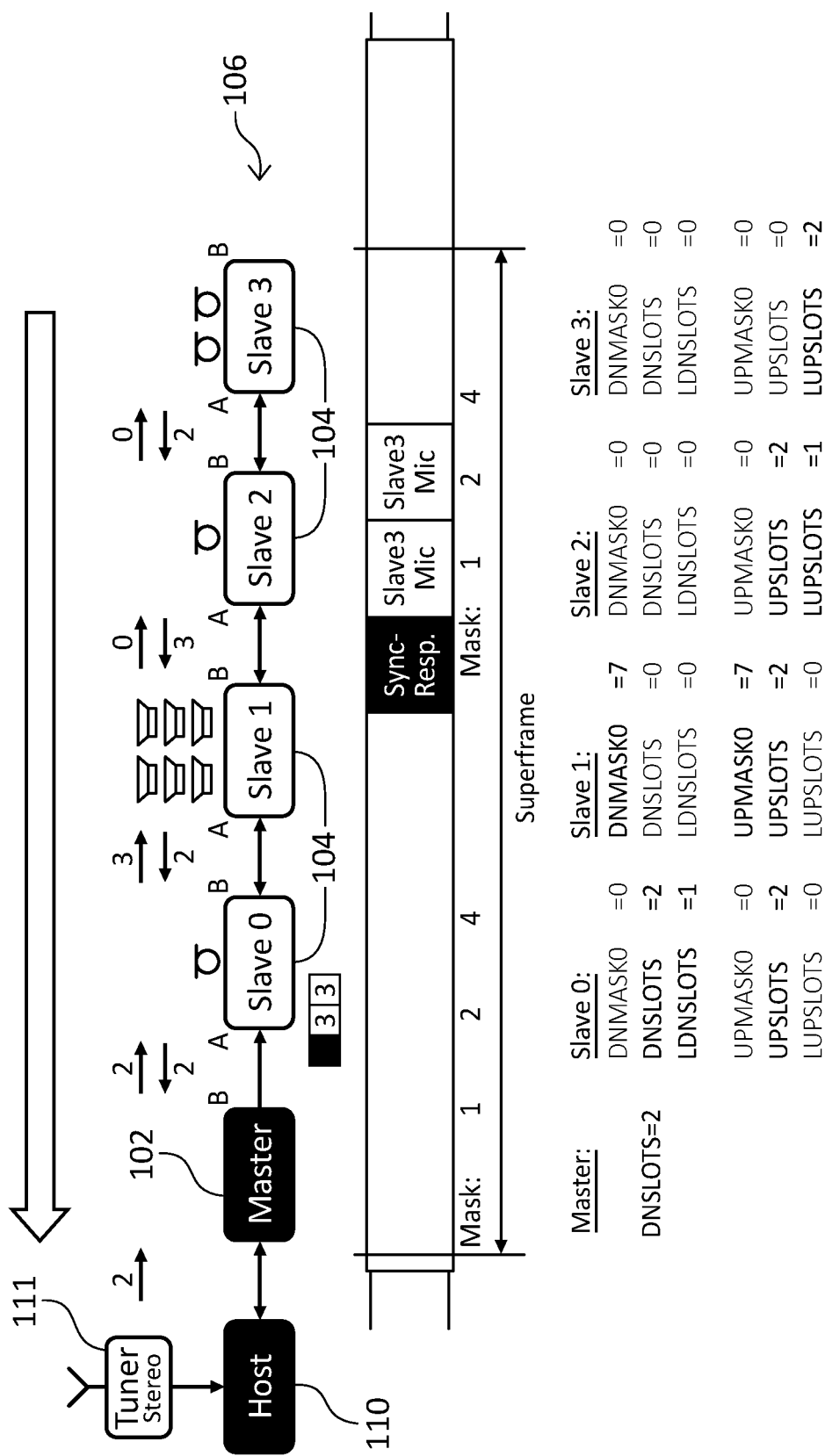
Figure 55:
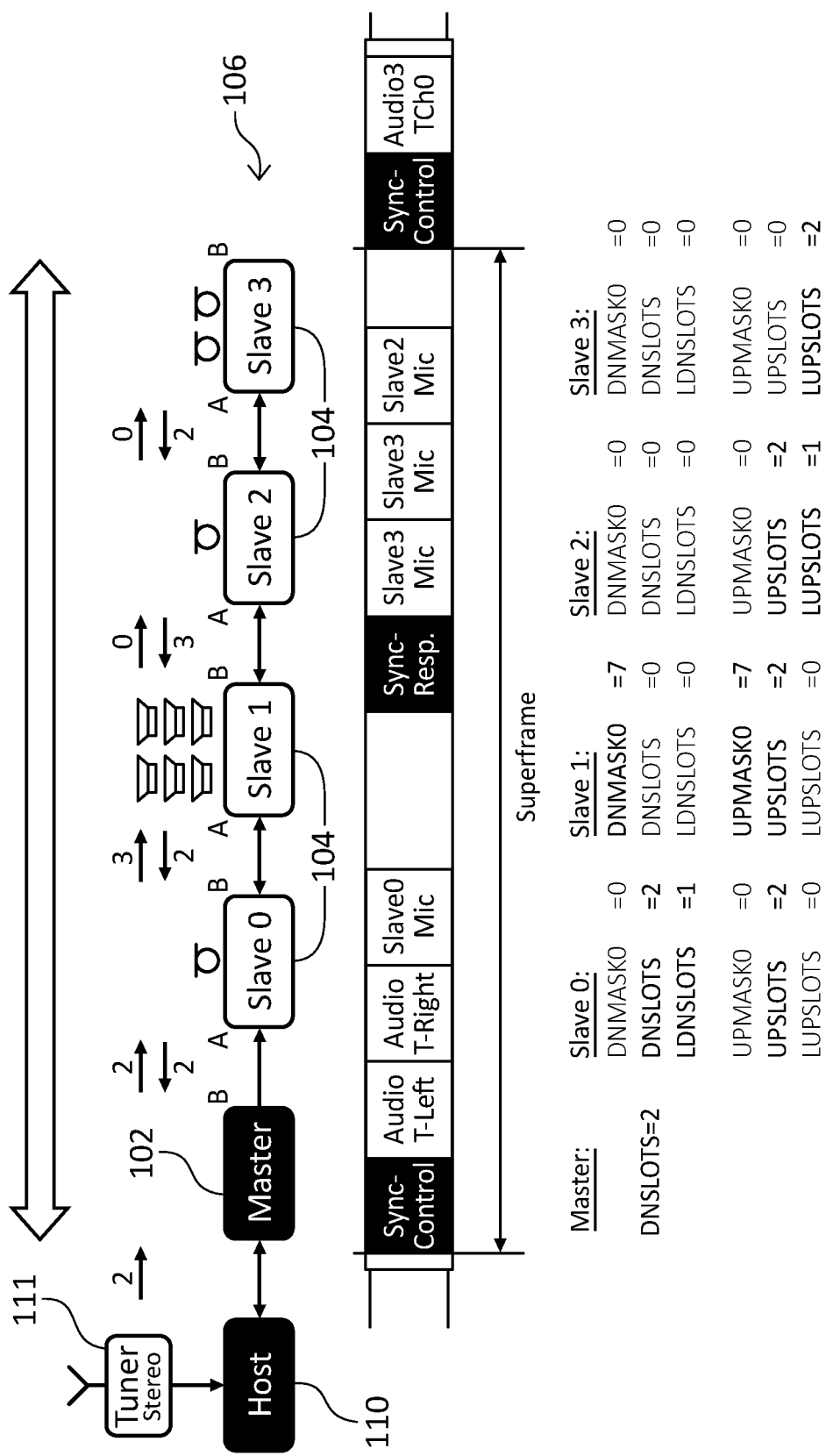

FIG. 54 illustrates a scenario in which Slave 0 has received a superframe from Slave 1, as illustrated in FIG. 53, and prepares to transmit a superframe upstream to the master node 102. Slave 0 may not consume any of the data from Slave 1, but may just pass this data upstream. As shown in FIG. 54, the superframe transmitted upstream by Slave 0 to the master node 102 starts with an SRF and is followed by an upstream data slot for the data generated by each of the 2 microphones associated with Slave 3. Slave 0 will not put any additional data upstream on the bus 106. The value of UPSLOTS is equal to 2 for Slave 0 (indicating that two upstream slots will be occupied by data received from a downstream node), and the value of LUPSLOTS is equal to 0 for Slave 0 (indicating that Slave 0 will not add any upstream slots of data). The value of UPMASK0 is equal to 0 for Slave 0 in this scenario (indicating that Slave 0 does not consume any data received from Slave 1). FIG. 55 is a summary of the downstream and upstream communications illustrated in FIGS. 46-54.

FIGS. 56-65 illustrate another example of slave-to-slave communications on a multi-node, daisy-chained bus, in accordance with various ones of the embodiments discussed above. In particular, each of FIGS. 56-65 illustrate how data may move along a bus 106 in a particular example system 100 in accordance with various embodiments disclosed herein, and also illustrate the structure of superframes passed between adjacent nodes on the bus 106.

Figure 56:
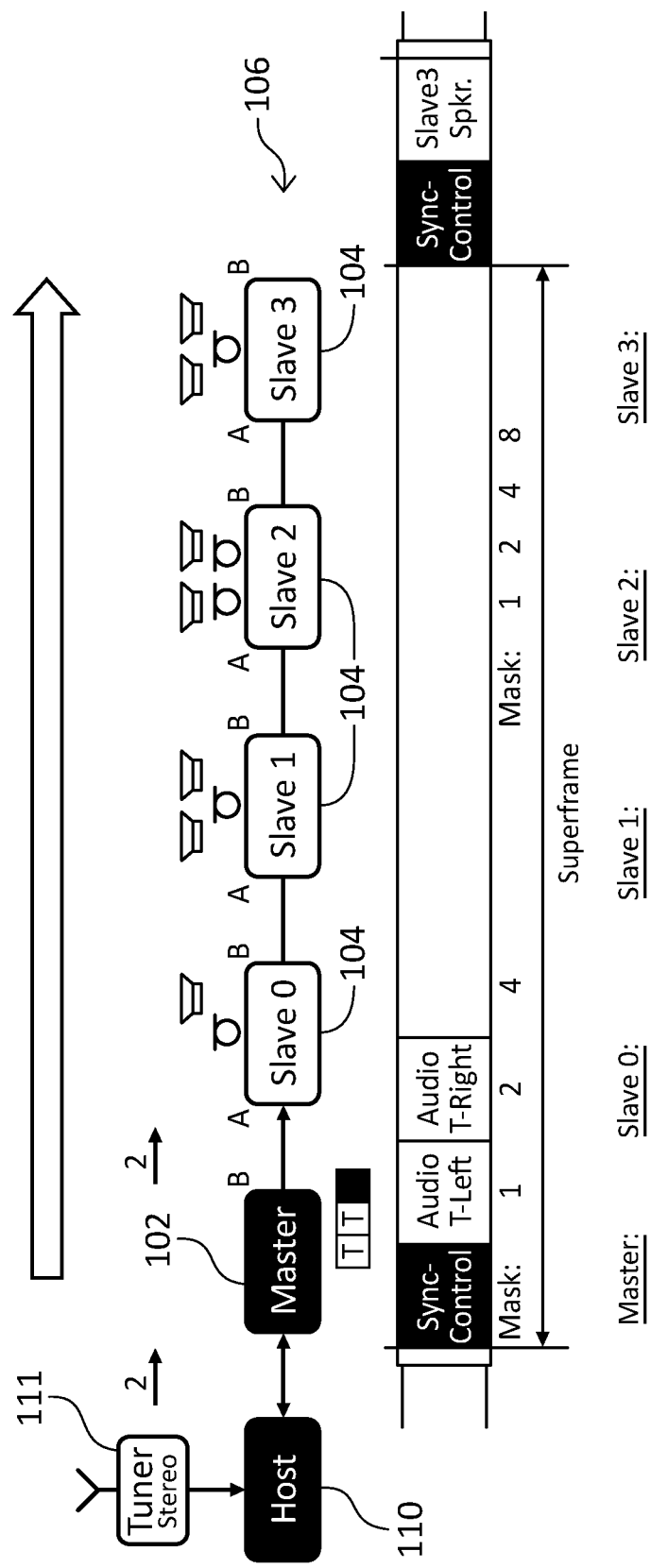
FIGS. 56-65 illustrate another example of slave-to-slave communications on a multi-node, daisy-chained bus, in accordance with various embodiments.

FIG. 56 illustrates an example system 100 including a host 110 coupled to a stereo tuner 111. The host 110 is coupled to a master node 102, and the master node 102 is coupled to a daisy chain of four slave nodes 104 (identified as Slave 0, Slave 1, Slave 2, and Slave 3). Each of the slave nodes 104 in the system 100 of FIG. 56 is coupled to one or more associated peripheral devices 108. In particular, as illustrated in FIG. 56, Slave 0 is coupled to a microphone and a speaker, Slave 1 is coupled to a microphone and two speakers (labeled 1 and 2), Slave 2 is coupled to two microphones (labeled 1 and 2) and two speakers (labeled 1 and 2), and Slave 3 is coupled to a microphone and two speakers (labeled 1 and 2). Slaves 1, 2, and 3 may include, for example, amplifiers that drives their associated speakers. As noted above, the particular number and type of slave nodes 104, and the particular number and type of peripheral devices 108, illustrated in FIG. 56 (and FIGS. 57-65) are simply illustrative, and any suitable number and type may be used in accordance with the techniques disclosed herein.

FIG. 56 also illustrates a scenario in which the master node 102 receives data from the tuner 111 (e.g., left and right audio data), and the master node 102 prepares to transmit a superframe downstream to Slave 0. As shown in FIG. 56, the superframe transmitted downstream from the master node 102 to Slave 0 starts with an SCF and is followed by a downstream data slot for each of the left and right audio data from the tuner 111. The value of DNSLOTS is equal to 2 for the master node 102 in this scenario.

Figure 57:
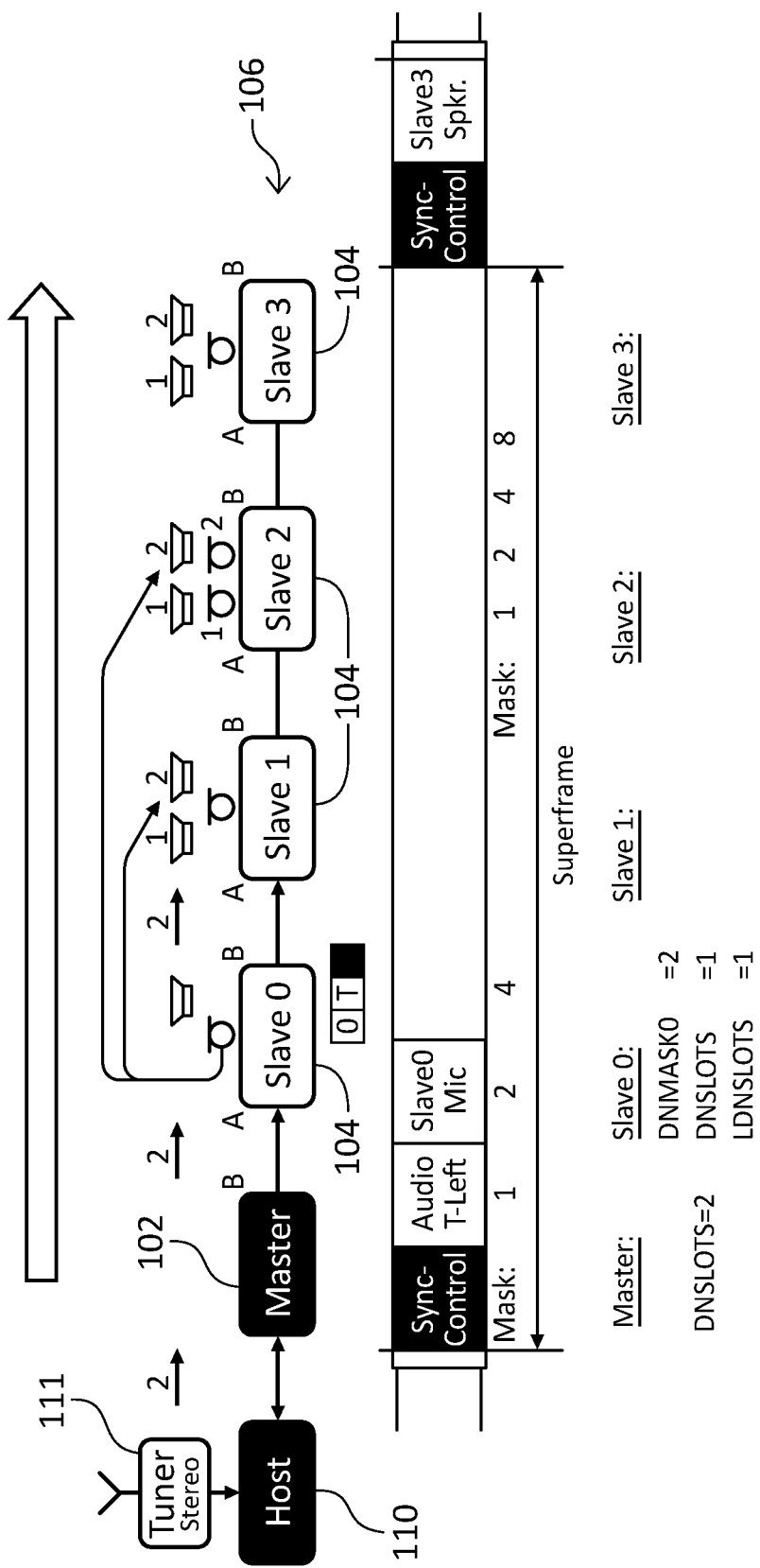

FIG. 57 illustrates a scenario in which Slave 0 has received a superframe from the master node 102, as illustrated in FIG. 56, and prepares to transmit a superframe downstream to Slave 1. As shown in FIG. 57, Slave 0 consumes the right audio data from the tuner 111. In some embodiments, Slave 0 will use all of the data consumed from the master node 102 by outputting this data to the speaker associated with Slave 0. Additionally, Slave 0 puts data from its microphone onto the bus 106. In particular, as illustrated in FIG. 57, the superframe transmitted downstream from Slave 0 to Slave 1 starts with an SCF and is followed by a downstream data slot for the left audio data from the tuner 111 (received from the master node 102) and a downstream data slot for microphone data generated by the microphone associated with Slave 0. The value of DNSLOTS is equal to 1 for Slave 0 (indicating that one downstream slot will be occupied by data received from an upstream node), and the value of LDNSLOTS is equal to 1 for Slave 0 (indicating that Slave 0 will add a single downstream slot of data). The value of DNMASK0 is equal to 2 for Slave 0 in this scenario (indicating that Slave 0 consumes the data received from the master node 102 in the downstream slot associated with the mask value 2). As indicated by the curved arrows in FIG. 57, and as discussed below, the data generated by Slave 0's microphone may be output at speaker 2 of Slave 1, and speaker 2 of Slave 2.

Figure 58:
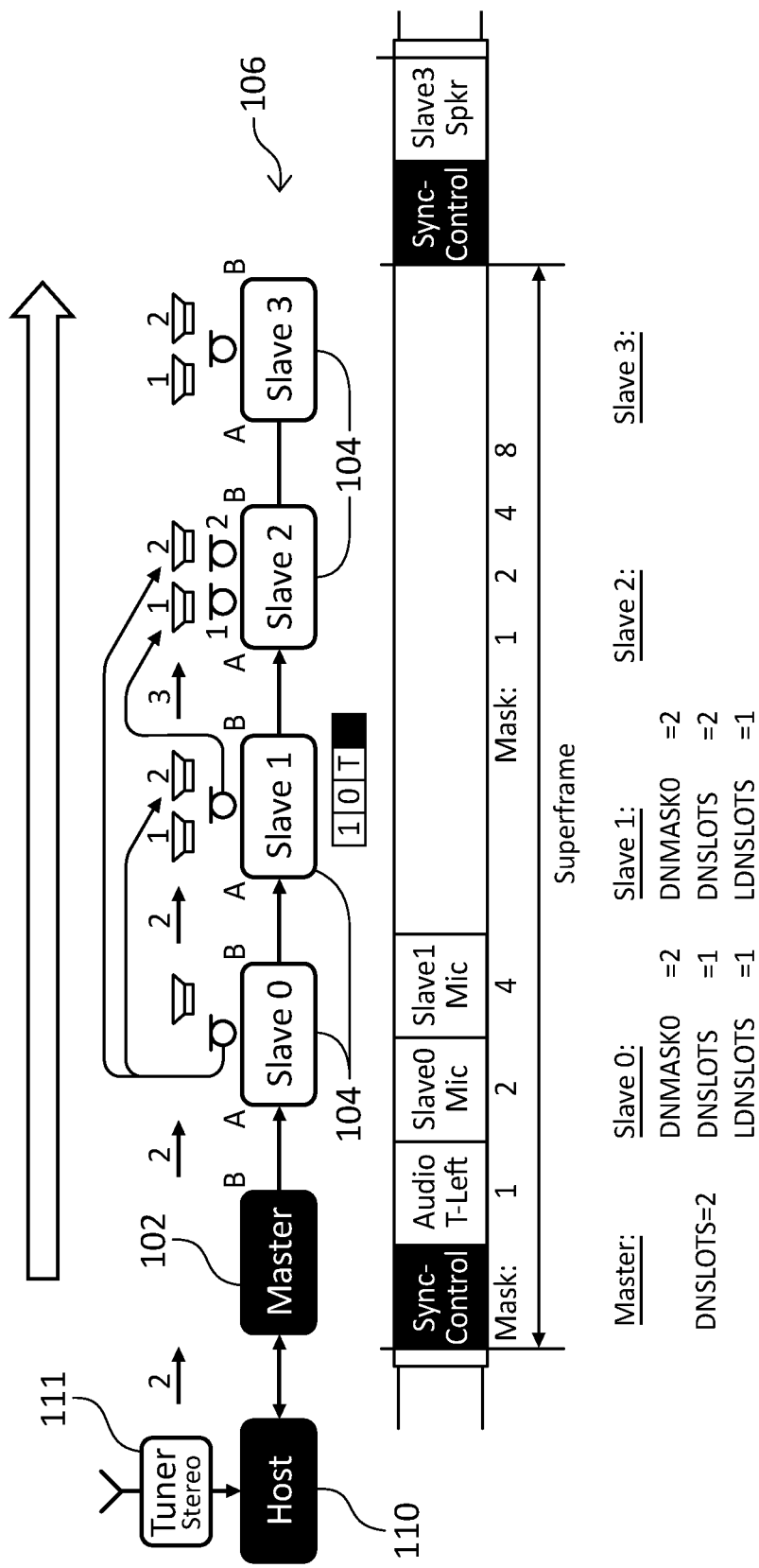

FIG. 58 illustrates a scenario in which Slave 1 has received a superframe from Slave 0, as illustrated in FIG. 57, and prepares to transmit a superframe downstream to Slave 2. As shown in FIG. 58, Slave 1 will consume some of the data from Slave 0 (i.e., the data from the microphone associated with Slave 0), and will put the data from the Slave 0 microphone, and data from the Slave 1 microphone, onto the bus 106. In some embodiments, Slave 1 will use the data consumed from Slave 0 by outputting this data to the speaker 2 associated with Slave 1. The superframe transmitted downstream from Slave 1 to Slave 2 starts with an SCF and is followed by a downstream data slot for the left audio data from the tuner 111, a downstream data slot for the Slave 0 microphone data, and a downstream data slot for data generated by the microphone associated with Slave 1. The value of DNSLOTS is equal to 2 for Slave 1 (indicating that two downstream data slots will be occupied by data received from an upstream node), and the value of LDNSLOTS is equal to 1 for Slave 1 (indicating that Slave 1 will add one downstream data slots). The value of DNMASK0 is equal to 2 for Slave 1 in this scenario (indicating that Slave 1 consumes the data received from Slave 0 in the downstream slot associated with the mask value 2). As indicated by the curved arrows in FIG. 58, and as discussed below, the data generated by Slave 1's microphone may be output at speaker 1 of Slave 2.

Figure 59:
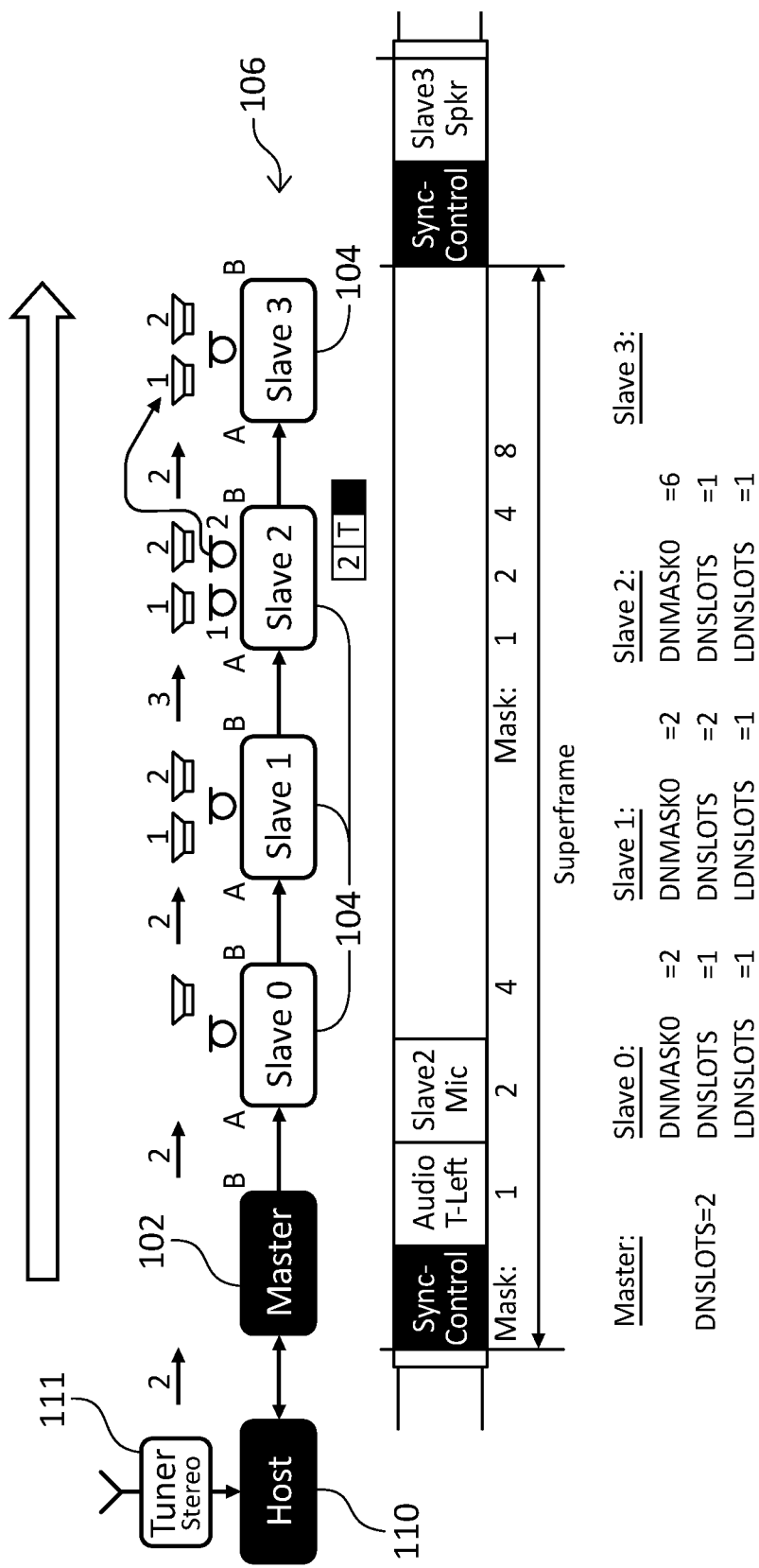

FIG. 59 illustrates a scenario in which Slave 2 has received a superframe from Slave 1, as illustrated in FIG. 58, and prepares to transmit a superframe downstream to Slave 3. As shown in FIG. 59, Slave 2 will consume some of the data from Slave 1 (i.e., the data from the microphones associated with Slaves 0 and 1), and will put data from microphone 2 of Slave 2 onto the bus 106. In some embodiments, Slave 2 will use the Slave 0 microphone data consumed from Slave 1 by outputting this data to the speaker 2 associated with Slave 2, and Slave 2 will use the Slave 1 microphone data consumed from Slave 1 by outputting this data to the speaker 1 associated with Slave 2. The superframe transmitted downstream from Slave 2 to Slave 3 starts with an SCF and is followed by a downstream data slot for the left audio data from the tuner 111 and a downstream data slot for data generated by the microphone 2 associated with Slave 2. The value of DNSLOTS is equal to 1 for Slave 2 (indicating that one downstream data slot will be occupied by data received from an upstream node), and the value of LDNSLOTS is equal to 1 for Slave 2 (indicating that Slave 2 will add one downstream data slots). The value of DNMASK0 is equal to 6 for Slave 2 in this scenario (indicating that Slave 2 consumes the data received from Slave 1 in the downstream slots associated with the mask values 2 and 4). As indicated by the curved arrow in FIG. 59, and as discussed below, the data generated by Slave 2's microphone 2 may be output at speaker 1 of Slave 3.

Figure 60:
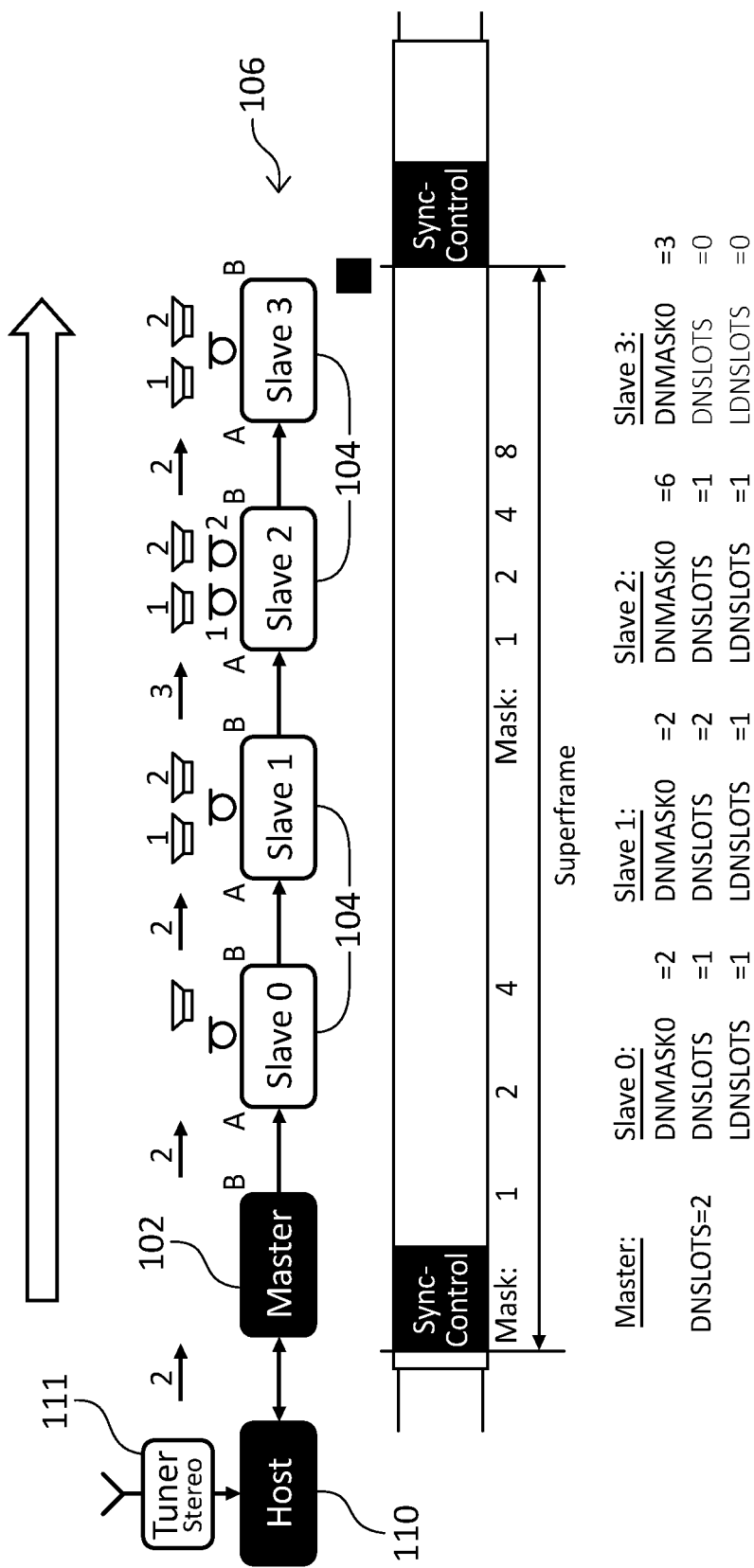

FIG. 60 illustrates a scenario in which Slave 3 has received a superframe from Slave 2, as illustrated in FIG. 59. Since Slave 3 is the last slave node 104 along the bus 106, it need not perform any downstream transmissions. Slave 3 may consume the data from microphone 2 of slave 2 (e.g., and may output it to speaker 1 of Slave 3) and may consume the left audio data from the tuner 111 (e.g., and may output it to speaker 2 of Slave 3). The value of DNSLOTS is equal to 0 for Slave 3 (indicating that no downstream data slots will be occupied by data received from an upstream node), and the value of LDNSLOTS is equal to 0 for Slave 3 (indicating that Slave 3 will add no downstream data slots). The value of DNMASK0 is equal to 3 for Slave 3 in this scenario (indicating that Slave 3 consumes the data received from Slave 2 in the downstream slots associated with the mask values 1 and 2).

Figure 61:
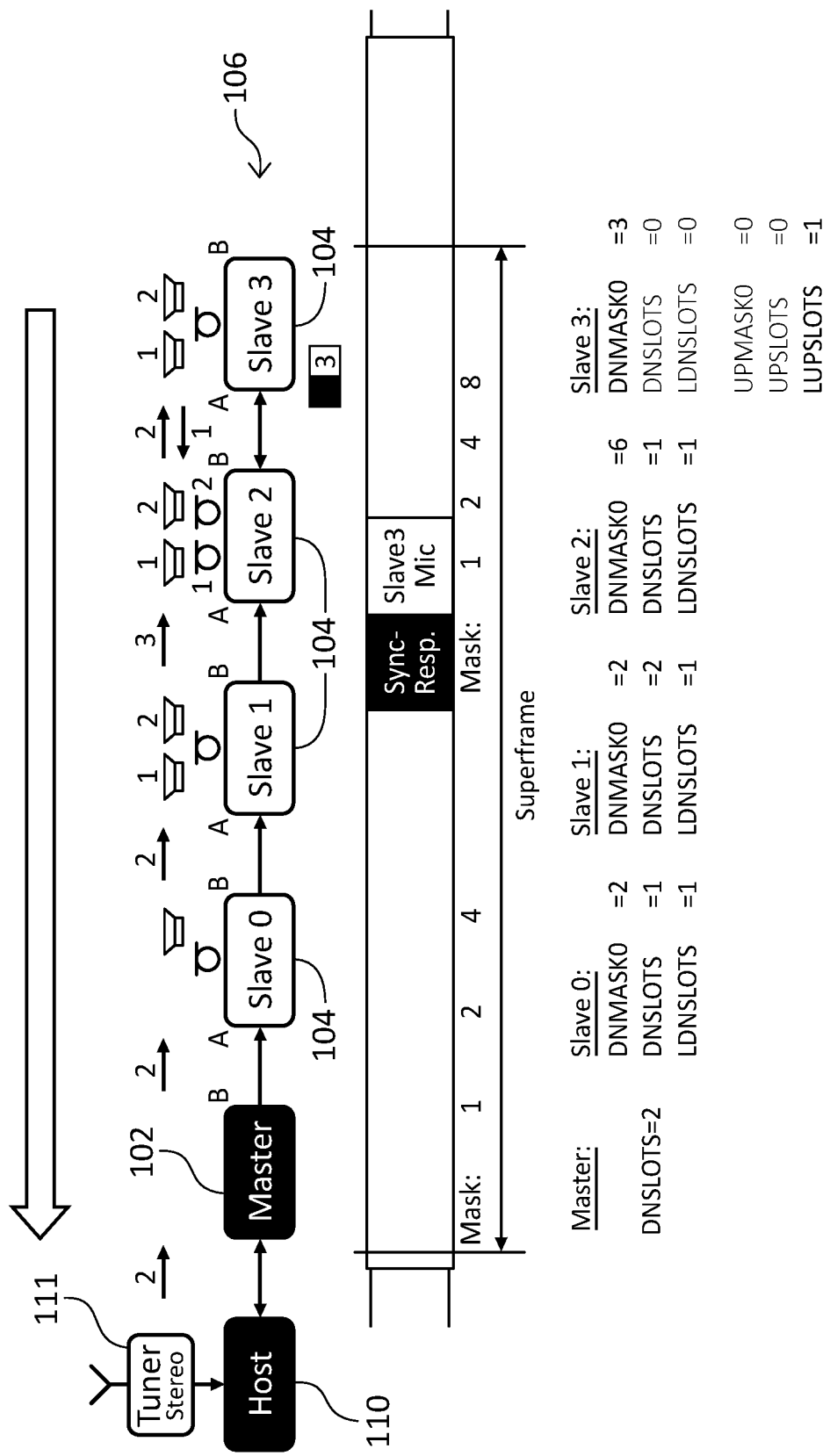

FIG. 61 illustrates a scenario in which Slave 3, subsequent to the receipt of a superframe from Slave 2 as discussed above with reference to FIG. 60, prepares to transmit a superframe back upstream to Slave 2. As shown in FIG. 61, the superframe transmitted upstream by Slave 3 to Slave 2 starts with an SRF and is followed by an upstream data slot for data generated by the microphone associated with Slave 3. The value of UPSLOTS is equal to 0 for Slave 3 (indicating that no upstream slots will be occupied by data received from a downstream node), and the value of LUPSLOTS is equal to 1 for Slave 3 (indicating that Slave 3 will add one upstream slot of data). The value of UPMASK0 is equal to 0 for Slave 3 in this scenario (indicating that Slave 3 will not consume any data transmitted from any downstream slave nodes 104).

Figure 62:
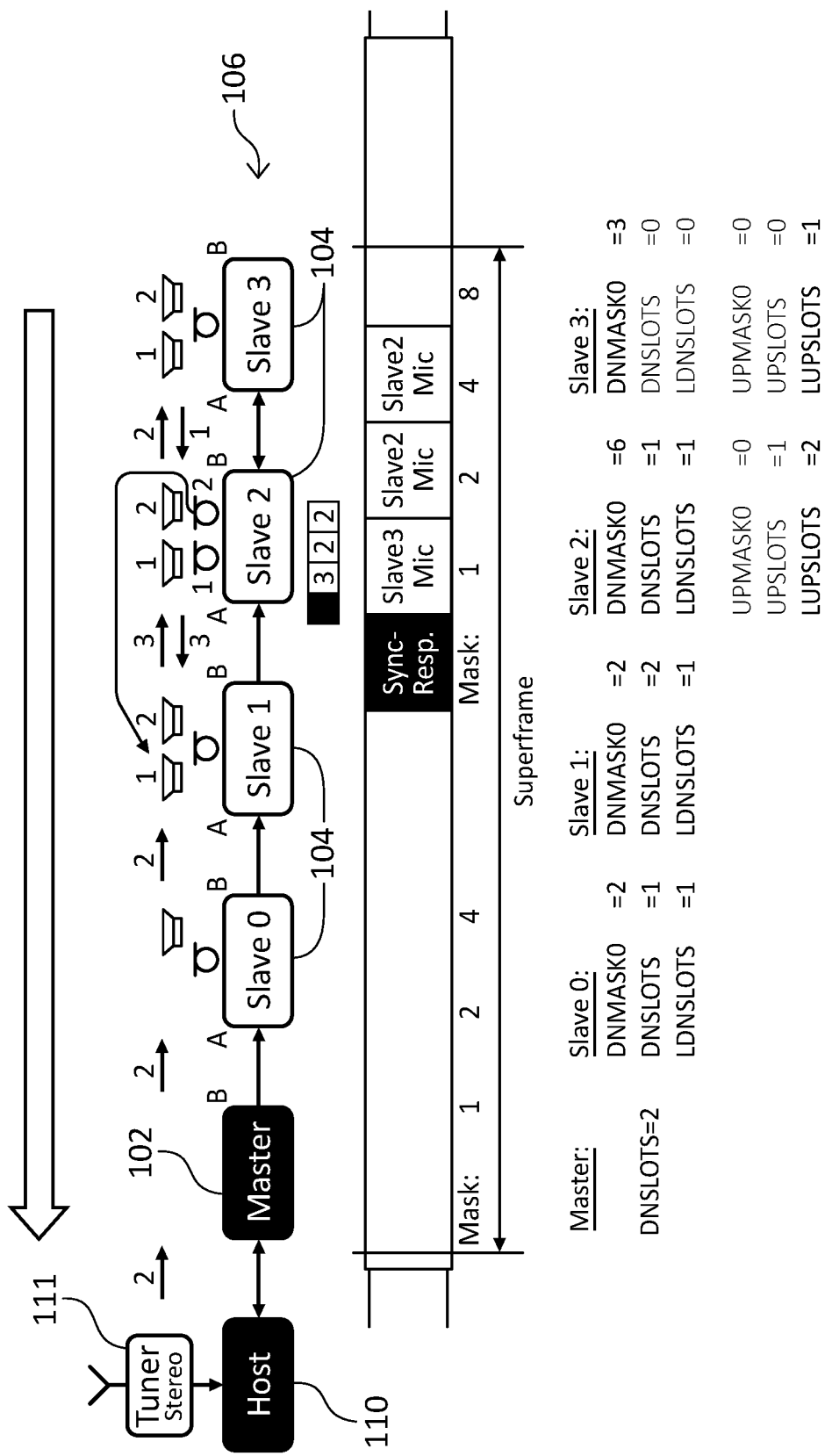

FIG. 62 illustrates a scenario in which Slave 2 has received a superframe from Slave 3, as illustrated in FIG. 61, and prepares to transmit a superframe upstream to Slave 1. As shown in FIG. 62, the superframe transmitted upstream by Slave 2 to Slave 1 starts with an SRF and is followed by the upstream data slot from Slave 3 and two additional upstream data slots occupied by data generated by the microphones associated with Slave 2. The value of UPSLOTS is equal to 1 for Slave 2 (indicating that one upstream slot will be occupied by data received from a downstream node), and the value of LUPSLOTS is equal to 2 for Slave 2 (indicating that Slave 2 will add two upstream slots of data). The value of UPMASK0 is equal to 0 for Slave 2 in this scenario (indicating that Slave 2 will not consume any data transmitted from any downstream slave nodes 104). As indicated by the curved arrow in FIG. 62, and as discussed below, the data generated by Slave 2's microphone 2 may be output at speaker 1 of Slave 1.

Figure 63:
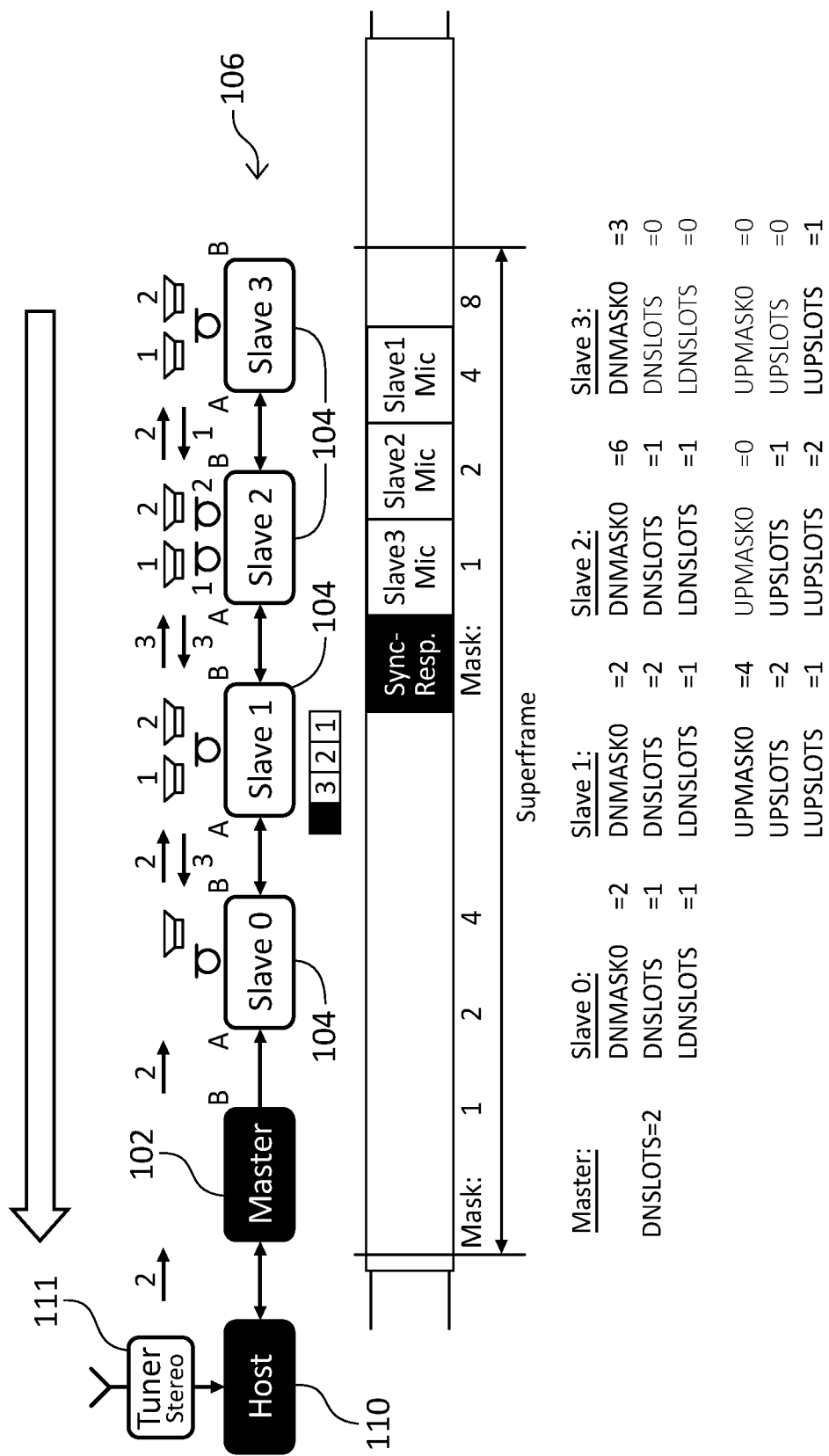

FIG. 63 illustrates a scenario in which Slave 1 has received a superframe from Slave 2, as illustrated in FIG. 62, and prepares a transmit a superframe upstream to Slave 0. As shown in FIG. 63, Slave 1 will consume the data from microphone 2 associated with Slave 2, and will not put that data back on the bus 106 to be transmitted upstream to Slave 0. In some embodiments, Slave 1 will use all of the data consumed from Slave 2 by outputting this data to the speakers associated with Slave 1 (e.g., speaker 1). Additionally, Slave 1 may put data generated by its own microphone on the bus 106. As shown in FIG. 63, the superframe transmitted upstream by Slave 1 to Slave 0 starts with an SRF and is followed by an upstream data slot for the data generated by the microphone associated with Slave 3, an upstream data slot for the data generated by microphone 1 of Slave 2, and an upstream data slot for data generated by the microphone of slave 1. The value of UPSLOTS is equal to 2 for Slave 1 (indicating that two upstream slots will be occupied by data received from a downstream node), and the value of LUPSLOTS is equal to 1 for Slave 1 (indicating that Slave 1 will add one upstream slot of data). The value of UPMASK0 is equal to 4 for Slave 1 in this scenario (indicating that Slave 1 consumes the data received from Slave 2 in the upstream slot associated with the mask value 4).

Figure 64:
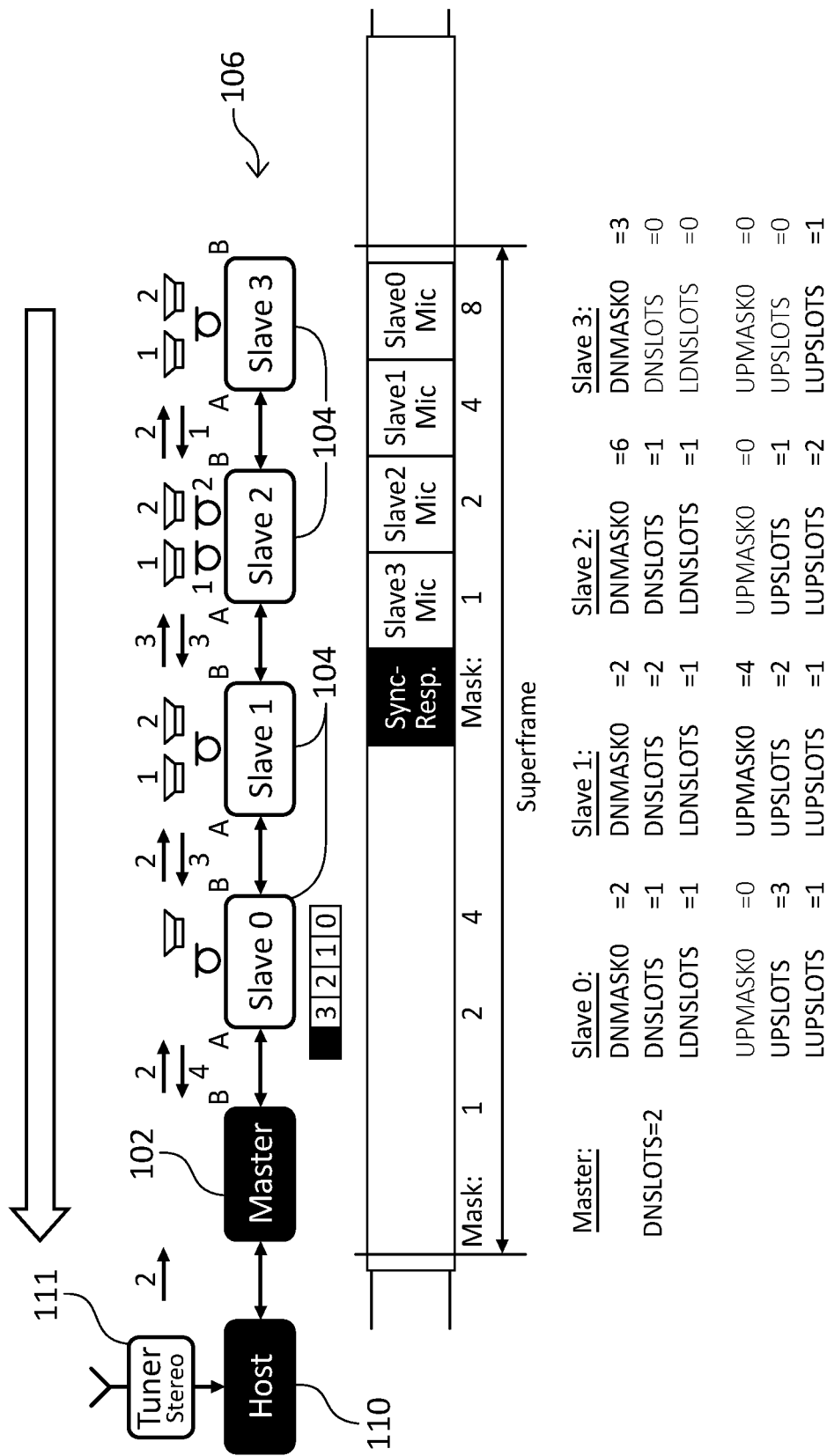
Figure 65:
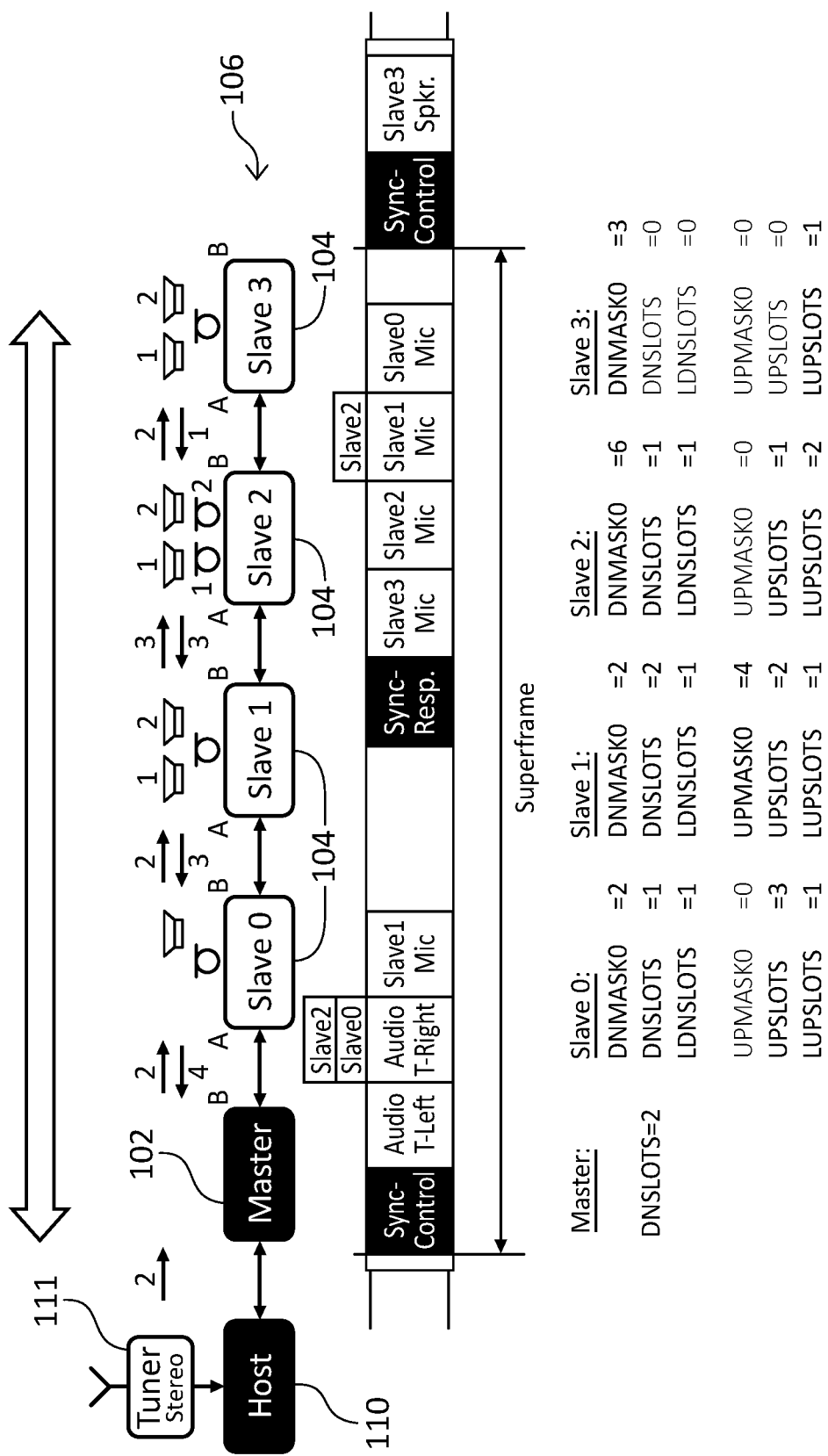

FIG. 64 illustrates a scenario in which Slave 0 has received a superframe from Slave 1, as illustrated in FIG. 63, and prepares to transmit a superframe upstream to the master node 102. Slave 0 may not consume any of the data from Slave 1, but may just pass this data upstream. Slave 0 may also put data generated by its own microphone on the bus 106. As shown in FIG. 64, the superframe transmitted upstream by Slave 0 to the master node 102 starts with an SRF and is followed by an upstream data slot for the data generated by the microphone associated with Slave 3, an upstream data slot for the data generated by microphone 1 of Slave 2, an upstream data slot for the data generated by the microphone of Slave 1, and an upstream data slot for the data generated by the microphone of Slave 0. The value of UPSLOTS is equal to 3 for Slave 0 (indicating that three upstream slots will be occupied by data received from a downstream node), and the value of LUPSLOTS is equal to 1 for Slave 0 (indicating that Slave 0 will add one upstream slot of data). The value of UPMASK0 is equal to 0 for Slave 0 in this scenario (indicating that Slave 0 does not consume any data received from Slave 1). FIG. 65 is a summary of the downstream and upstream communications illustrated in FIGS. 56-64.

Any of the embodiments described herein may be combined, in any desired combination, with slave-to-slave communication functionality, in accordance with any of the embodiments disclosed herein.

The following paragraphs provide examples of various ones of the embodiments disclosed herein.

Example A1 is a slave node transceiver for low latency communication, including: upstream transceiver circuitry to receive a first signal transmitted over a two-wire bus from an upstream device and to provide a second signal over the two-wire bus to the upstream device; downstream transceiver circuitry to provide a third signal downstream over the two-wire bus toward a downstream device and to receive a fourth signal over the two-wire bus from the downstream device; and clock circuitry to generate a clock signal at the slave node transceiver based on a preamble of a synchronization control frame in the first signal, wherein timing of the receipt and provision of signals over the two-wire bus by the slave node transceiver is based on the clock signal.

Example A2 may include the subject matter of Example A1, and may further specify that the synchronization control frame is associated with downstream data in a superframe of the first signal, the downstream data includes multiple data slots, and data for a single peripheral device in communication with the slave node transceiver occupies two or more of the multiple data slots.

Example A3 may include the subject matter of Example A2, and may further specify that the data for the single peripheral device is audio data.

Example A4 may include the subject matter of any of Examples A1-A3, and may further specify that: the first signal includes a first synchronization control frame and associated first downstream data and a second synchronization control frame and associated second downstream data; the first downstream data includes a data slot having a particular index and including data for a first peripheral device in communication with the slave node transceiver; and the second downstream data includes a data slot having the particular index and including data for a second peripheral device, different from the first peripheral device, in communication with the slave node transceiver.

Example A5 may include the subject matter of Example A4, and may further specify that the first and second peripheral devices are different microphones.

Example A6 may include the subject matter of any of Examples A1-A5, and may further specify that the second signal includes a synchronization response frame, the synchronization response frame is associated with upstream data in a superframe of the second signal, the upstream data includes multiple data slots, and data originating at a single peripheral device in communication with the slave node transceiver occupies two or more of the multiple data slots.

Example A7 may include the subject matter of Example A6, and may further specify that the data originating at the single peripheral device is audio data.

Example A8 may include the subject matter of any of Examples A1-A7, and may further specify that: the second signal includes a first synchronization response frame and associated first upstream data and a second synchronization response frame and associated second upstream data; the first upstream data includes a data slot having a particular index and including data originating at a first peripheral device in communication with the slave node transceiver; and the second upstream data includes a data slot having the particular index and including data originating at a second peripheral device, different from the first peripheral device, in communication with the slave node transceiver.

Example A9 may include the subject matter of Example A8, and may further specify that the first and second peripheral devices are different microphones.

Example A10 may include the subject matter of any of Examples A1-A9, and may further include power circuitry to receive a voltage bias over the two-wire bus from the upstream device and provide energy from the voltage bias to an energy storage device coupled to the slave node transceiver.

Example A11 may include the subject matter of any of Examples A1-A10, and may further include peripheral device communication circuitry to communicate with at least one speaker and at least one microphone.

Example A12 may include the subject matter of Example A11, and may further specify that the peripheral device communication circuitry comprises an Inter-Integrated Circuit Sound (I2S) transceiver, a Time Division Multiplex (TDM) transceiver, a Pulse Density Modulation (PDM) transceiver, an Inter-Integrated Circuit (I2C) transceiver, or a General Purpose Input/Output (GPIO) pin.

Example A13 may include the subject matter of any of Examples A1-A12, and may further include peripheral device communication circuitry to communicate with a microphone and a conferencing user interface element, wherein a user actuates the conferencing user interface element when the user wishes to provide audio from the microphone to another device coupled to the two-wire bus, and wherein the second signal includes data originating at the microphone when the conferencing user interface element is actuated.

Example A14 may include the subject matter of any of Examples A1-A13, and may further include peripheral device communication circuitry to communicate with a wireless transceiver, wherein the wireless transceiver is to receive voice calls, and wherein the upstream transceiver circuitry is to include data representative of the voice calls in the second signal.

Example A15 may include the subject matter of any of Examples A1-A14, and may further specify that the upstream device is coupled to a wireless transceiver, the wireless transceiver is to receive voice calls, and the upstream transceiver circuitry is to receive data representative of the voice calls in the first signal.

Example A16 may include the subject matter of any of Examples A1-A15, and may further specify that a host device is coupled to a master device of the two-wire bus, the host device is coupled to a wireless transceiver, the wireless transceiver is to receive voice calls, and the upstream transceiver circuitry is to receive data representative of the voice calls in the first signal.

Example A17 may include the subject matter of any of Examples A1-A16, and may further include peripheral device communication circuitry in communication with an antenna coupled to a roof or other part of a vehicle, wherein the peripheral device communication circuitry communicates with the antenna via a wired connection.

Example A18 may include the subject matter of Example A17, and may further specify that the upstream device is a master device located at the head unit of the vehicle.

Example A19 may include the subject matter of any of Examples A1-A18, and may further specify that the slave node transceiver is included in a speaker, mixing console, musical instrument, time coding equipment, amplifier, video display, or pyrotechnics console.

Example A20 may include the subject matter of any of Examples A1-A19, and may further include peripheral device communication circuitry in communication with a sensor or an actuator at a joint of a robotic limb.

Example A21 may include the subject matter of any of Examples A1-A20, and may further include a receive mailbox and a transmit mailbox, wherein the host device is to generate an interrupt for transmission to the downstream device when data is provided to the transmit mailbox, and the downstream device is to generate an interrupt for transmission to the host device when data is to be provided to the receive mailbox.

Example A22 may include the subject matter of any of Examples A1-A21, and may further include peripheral device communication circuitry in communication with a humidity or temperature sensor in a vehicle.

Example A23 may include the subject matter of any of Examples A1-A22, and may further include peripheral device communication circuitry in communication with a gas sensor in a vehicle.

Example A24 may include the subject matter of any of Examples A1-A23, and may further include peripheral device communication circuitry to provide the first signal or the second signal to a protocol analyzer, and wherein the downstream transceiver circuitry is disabled.

Example A25 may include the subject matter of any of Examples A1-A24, and may further specify that data is transmitted downstream in the synchronization control frame.

Example A26 may include the subject matter of any of Examples A1-A25, and may further specify that data is transmitted upstream in a synchronization response frame.

Example 131 is a master node transceiver for low latency communication, including: an Inter-Integrated Circuit Sound (I2S) receiver to receive an I2S signal from a host device, wherein the I2S signal provides clock information; clock circuitry to generate a clock signal based on the clock information; and downstream transceiver circuitry to provide a first signal downstream over a two-wire bus toward a downstream device and to receive a second signal over the two-wire bus from the downstream device, wherein a preamble of a synchronization control frame of the first signal is based on the clock signal, and the downstream device generates its own clock signal based on the preamble.

Example B2 may include the subject matter of Example B1, and may further specify that the synchronization control frame is associated with downstream data in a superframe of the first signal, the downstream data includes multiple data slots, and data for a single peripheral device coupled to the downstream device occupies two or more of the multiple data slots.

Example B3 may include the subject matter of Example B2, and may further specify that the data for the single peripheral device is audio data.

Example B4 may include the subject matter of any of Examples B1-B3, and may further specify that: the first signal includes a first synchronization control frame and associated first downstream data and a second synchronization control frame and associated second downstream data; the first downstream data includes a data slot having a particular index and including data for a first peripheral device coupled to the downstream device; and the second downstream data includes a data slot having the particular index and including data for a second peripheral device, different from the first peripheral device, coupled to the downstream device.

Example B5 may include the subject matter of Example B4, and may further specify that the first and second peripheral devices are different microphones.

Example B6 may include the subject matter of any of Examples B1-B5, and may further specify that the second signal includes a synchronization response frame, the synchronization response frame is associated with upstream data in a superframe of the second signal, the upstream data includes multiple data slots, and data originating at a single peripheral device coupled to the downstream device occupies two or more of the multiple data slots.

Example B7 may include the subject matter of Example B6, and may further specify that the data originating at the single peripheral device is audio data.

Example B8 may include the subject matter of any of Examples B1-B7, and may further specify that: the second signal includes a first synchronization response frame and associated first upstream data and a second synchronization response frame and associated second upstream data; the first upstream data includes a data slot having a particular index and including data originating at a first peripheral device coupled to the downstream device; and the second upstream data includes a data slot having the particular index and including data originating at a second peripheral device, different from the first peripheral device, coupled to the downstream device.

Example B9 may include the subject matter of Example B8, and may further specify that the first and second peripheral devices are different microphones.

Example B10 may include the subject matter of any of Examples B1-B9, and may further specify that the first signal includes data for at least one speaker coupled to the downstream device and the second signal comprises data originating at at least one microphone coupled to the downstream device.

Example B11 may include the subject matter of any of Examples B1-B10, and may further include peripheral device communication circuitry to communicate with a wireless transceiver, wherein the wireless transceiver is to receive voice calls, and wherein the downstream transceiver circuitry is to include data representative of the voice calls in the first signal.

Example B12 may include the subject matter of any of Examples B1-B11, and may further specify that the downstream device is coupled to a wireless transceiver, the wireless transceiver is to receive voice calls, and the downstream transceiver circuitry is to receive data representative of the voice calls in the second signal.

Example C1 is a host device, including: Inter-Integrated Circuit Sound (I2S) transceiver circuitry to provide an I2S signal to a master node transceiver, wherein the master node transceiver is a master of a two-wire bus, the I2S signal provides clock information, the master node transceiver is to generate a clock signal based on the clock information, the master node transceiver is to provide a first signal downstream over the two-wire bus toward a downstream device, a preamble of a synchronization control frame of the first signal is based on the clock signal, and the downstream device is to generate its own clock signal based on the preamble; Inter-Integrated Circuit (I2C) transceiver circuitry to receive a first I2C signal from the master node transceiver and to provide a second I2C signal to the master node transceiver; and processing circuitry to generate data for the downstream device based on the first I2C signal, wherein the data for the downstream device is to be included in the second I2C signal and is to be transmitted to the downstream device by the master node transceiver over the two-wire bus.

Example C2 may include the subject matter of Example C1, and may further specify that the first signal includes data for at least one speaker coupled to the downstream device.

Example C3 may include the subject matter of any of Examples C1-C2, and may further specify that: the I2S transceiver circuitry is to receive, via the two-wire bus and the master node transceiver, audio from a microphone coupled to the downstream device; the I2C transceiver circuitry is to receive, via the two-wire bus and the master node transceiver, an indication that a user has actuated a conferencing user interface element coupled to the downstream device; and the I2S transceiver circuitry is to provide, in response to the indication and via the two-wire bus and the master node transceiver, the audio to another downstream device on the two-wire bus.

Example C4 may include the subject matter of any of Examples C1-C3, and may further specify that the downstream device is coupled to a wireless transceiver, the wireless transceiver is to receive voice calls, and the I2C transceiver circuitry is to receive data representative of the voice calls via the master node transceiver and the two-wire bus.

Example C5 may include the subject matter of any of Examples C1-C4, and may further specify that the downstream device is wired to an antenna coupled to a roof or other part of a vehicle and the master node transceiver is located at a head unit of the vehicle.

Example C6 may include the subject matter of any of Examples C1-05, and may further specify that the host device includes a receive mailbox and a transmit mailbox, and wherein the host device is to generate an interrupt for transmission to the downstream device when data is provided to the transmit mailbox.

Example C7 may include the subject matter of any of Examples C1-C6, and may further specify that the downstream device is coupled to an environmental sensor in a vehicle, and the processing circuitry is to generate a control instruction for a climate control system in the vehicle based on data from the sensor transmitted to the host device via the master node transceiver and the two-wire bus.

Example D1 is a microphone cable, including: a first connector to couple to a microphone; a second connector to couple to an audio receiving device; a conductor to transmit data between the first connector and the second connector; and a slave node transceiver, including upstream transceiver circuitry to receive a first signal transmitted over a two-wire bus from an upstream device and to provide a second signal over the two-wire bus to the upstream device, clock circuitry to generate a clock signal at the slave node transceiver based on a preamble of a synchronization control frame in the first signal, wherein timing of the receipt and provision of signals over the two-wire bus by the node transceiver is based on the clock signal, and peripheral device communication circuitry coupled to the conductor to receive the data transmitted between the first connector and the second connector, wherein the data is included in the second signal.

Example D2 may include the subject matter of Example D1, and may further specify that the slave node transceiver is included in the first connector.

Example D3 may include the subject matter of any of Examples D1-D2, and may further specify that the slave node transceivers included in the second connector.

Example D4 may include the subject matter of any of Examples D1-D3, and may further specify that the slave node transceiver is disposed between the first connector and the second connector.

Example D5 may include the subject matter of any of Examples D1-D4, and may further include an analog to digital converter (ADC) to convert an analog microphone input received at the first connector to a digital signal, wherein the data transmitted between the first connector of the second connector includes the digital signal.

Example D6 may include the subject matter of Example D5, and may further specify that the second connector is to provide the second signal and the digital signal to the audio receiving device.

Example D7 may include the subject matter of any of Examples D5-D6, and may further specify that the second connector is to provide the second signal and the analog microphone input to the audio receiving device.

Example D8 may include the subject matter of Example D7, and may further specify that provide the second signal and the analog microphone input comprises provide the sum of the second signal and the analog microphone input.

Example D9 may include the subject matter of any of Examples D7-D8, and may further specify that the second connector is to further provide the digital signal to the audio receiving device.

Example D10 may include the subject matter of any of Examples D5-D9, and may further include a digital to analog converter to convert the digital signal to an analog signal.

Example D11 may include the subject matter of Example D10, and may further specify that the second connector is to provide the second signal and the analog signal to the audio receiving device.

Example E1 is a system including one or more of the slave node transceivers of any of Examples A coupled via two-wire bus links with a master node transceiver of any of Examples B.

Example E2 may include the subject matter of Example E1, and may further include a host device of any of Examples C, coupled to the master node transceiver.

Example E3 is a method in accordance with any of the techniques disclosed herein.

Example E4 is a device including means for performing any of the techniques disclosed herein.

Example E5 is one or more non-transitory computer readable media having instructions thereon that, in response to execution by one or more processing devices of a system, cause the system to perform any of the techniques disclosed herein.

Example F1 may include any embodiments of the slave-to-slave communication functionality disclosed herein.

Example F2 may include the subject matter of any of Examples A-E above, and may further include any embodiments of the slave-to-slave communication functionality disclosed herein.

Example G1 is a low latency communication system, including: a slave node transceiver, including upstream transceiver circuitry to receive a first signal transmitted over a two-wire bus from an upstream device and to provide a second signal over the two-wire bus to the upstream device, downstream transceiver circuitry to provide a third signal downstream over the two-wire bus toward a downstream device and to receive a fourth signal over the two-wire bus from the downstream device, and a peripheral device interface to receive data from a peripheral device communicatively coupled to the peripheral device interface, wherein the downstream transceiver circuitry is to include the data in the third signal.

Example G2 may include the subject matter of Example G1, and may further specify that the data is audio data.

Example G3 may include the subject matter of any of Examples G1-2, and may further specify that the first signal includes data generated by a peripheral device communicatively coupled to the upstream device, the third signal is provided downstream subsequent to receipt of the first signal, and the third signal includes less than all of the data generated by the peripheral device communicatively coupled to the upstream device.

Example G4 may include the subject matter of Example G3, and may further specify that the upstream device is a host device.

Example G5 may include the subject matter of any of Examples G3-4, and may further specify that the upstream device is a master node.

Example G6 may include the subject matter of any of Examples G3-5, and may further specify that the upstream device is a slave node.

Example G7 may include the subject matter of any of Examples G3-6, and may further specify that the peripheral device interface is to provide, to the peripheral device communicatively coupled to the peripheral device interface, at least some of the data generated by the peripheral device communicatively coupled to the upstream device.

Example G8 may include the subject matter of any of Examples G3-7, and may further specify that an intervening upstream device is disposed along the two-wire bus in a daisy chain between the slave node transceiver and the upstream device.

Example G9 may include the subject matter of any of Examples G1-8, and may further specify that the fourth signal includes data generated by a peripheral device communicatively coupled to the downstream device, the second signal is provided upstream subsequent to receipt of the fourth signal, and the second signal includes less than all of the data generated by the peripheral device communicatively coupled to the downstream device.

Example G10 may include the subject matter of Example G9, and may further specify that the peripheral device interface is to provide, to the peripheral device communicatively coupled to the peripheral device interface, at least some of the data generated by the peripheral device communicatively coupled to the downstream device.

Example G11 may include the subject matter of any of Examples G9-10, and may further specify that the peripheral device includes a speaker.

Example G12 may include the subject matter of any of Examples G9-11, and may further specify that an intervening downstream device is disposed along the two-wire bus in a daisy chain between the slave node transceiver and the downstream device.

Example G13 may include the subject matter of any of Examples G1-12, and may further include the upstream device and the downstream device.

Example G14 may include the subject matter of any of Examples G1-13, and may further specify that the slave node transceiver further includes clock circuitry to generate a clock signal at the slave node transceiver based on a preamble of a synchronization control frame in the first signal, wherein timing of the receipt and provision of signals over the two-wire bus by the slave node transceiver is based on the clock signal.

Example G15 may include the subject matter of Example G14, and may further specify that the second signal includes a synchronization response frame and the synchronization response frame is associated with upstream data in a superframe of the second signal.

Example G16 may include the subject matter of any of Examples G1-15, and may further include the peripheral device.

Example H1 is a low latency communication system, including: a master node transceiver; and a plurality of slave node transceivers communicatively coupled to each other and to the master note transceiver in a daisy chain two-wire bus, wherein at least one of the slave node transceivers includes upstream transceiver circuitry to receive a first signal transmitted over a two-wire bus from an upstream device along the bus and to provide a second signal over the two-wire bus to the upstream device, wherein the first signal includes data generated by a peripheral device communicatively coupled to the upstream device, and downstream transceiver circuitry to provide a third signal downstream over the two-wire bus toward a downstream device on the bus and to receive a fourth signal over the two-wire bus from the downstream device, wherein the third signal is provided downstream subsequent to receipt of the first signal, and the third signal includes less than all of the data generated by the peripheral device communicatively coupled to the upstream device.

Example H2 may include the subject matter of Example H1, and may further include a host device communicatively coupled to the master node transceiver.

Example I1 is a method of slave-to-slave communication in a two-wire daisy chain bus, including: receiving, at a first slave device, data from a second slave device downstream from the first slave device over the bus; and providing, by the first slave device to a third device upstream from the first slave device over the bus, less than all of the data from the second slave device.

Example I2 may include the subject matter of Example I1, and may further specify that the data from the second slave device is data generated by a peripheral device communicatively coupled to the second slave device via an Inter-Integrated Circuit Sound (I2S) transceiver, a Time Division Multiplex (TDM) transceiver, a Pulse Density Modulation (PDM) transceiver, an Inter-Integrated Circuit (I2C) transceiver, or a General Purpose Input/Output (GPIO) pin.

The invention claimed is:

1. A low latency communication system, comprising:
a slave node transceiver, including:
upstream transceiver circuitry to receive a first signal transmitted over a two-wire bus from an upstream device and to provide a second signal over the two-wire bus to the upstream device,
downstream transceiver circuitry to provide a third signal downstream over the two-wire bus toward a downstream device and to receive a fourth signal over the two-wire bus from the downstream device, and
a peripheral device interface to provide data to a peripheral device communicatively coupled to the peripheral device interface, wherein 1) the data is generated by a peripheral device communicatively coupled to the upstream device and the data is included in the first signal, or 2) the data is generated by a peripheral device communicatively coupled to the downstream device and the data is included in the fourth signal.

2. The low latency communication system of claim 1, wherein the data is audio data.

3. The low latency communication system of claim 1, wherein the data is generated by a peripheral device communicatively coupled to the upstream device and the data is included in the first signal.

4. The low latency communication system of claim 3, wherein the upstream device is a host device.

5. The low latency communication system of claim 3, wherein the upstream device is a master node.

6. The low latency communication system of claim 3, wherein the upstream device is a slave node.

7. The low latency communication system of claim 3, wherein the third signal is provided downstream subsequent to receipt of the first signal, and the third signal includes some but less than all of the data generated by the peripheral device communicatively coupled to the upstream device.

8. The low latency communication system of claim 3, wherein an intervening upstream device is disposed along the two-wire bus in a daisy chain between the slave node transceiver and the upstream device.

9. The low latency communication system of claim 1, the data is generated by a peripheral device communicatively coupled to the downstream device and the data is included in the fourth signal.

10. The low latency communication system of claim 9, wherein the second signal is provided upstream subsequent to receipt of the fourth signal, and the second signal includes some but less than all of the data generated by the peripheral device communicatively coupled to the downstream device.

11. The low latency communication system of claim 9, wherein the peripheral device communicatively coupled to the peripheral device interface includes a speaker.

12. The low latency communication system of claim 9, wherein an intervening downstream device is disposed along the two-wire bus in a daisy chain between the slave node transceiver and the downstream device.

13. The low latency communication system of claim 1, further comprising the upstream device and the downstream device.

14. The low latency communication system of claim 1, wherein the slave node transceiver further includes:

clock circuitry to generate a clock signal at the slave node transceiver based on a preamble of a synchronization control frame in the first signal, wherein timing of receipt and provision of signals over the two-wire bus by the slave node transceiver is based on the clock signal.

15. The low latency communication system of claim 14, wherein the second signal includes a synchronization response frame and the synchronization response frame is associated with upstream data in a superframe of the second signal.

16. The low latency communication system of claim 1, further comprising the peripheral device.

17. A low latency communication system, comprising:
a slave node transceiver, including:
  upstream transceiver circuitry to receive a first signal transmitted over a two-wire bus from an upstream device along the two-wire bus and to provide a second signal over the two-wire bus to the upstream device, and
  downstream transceiver circuitry to provide a third signal downstream over the two-wire bus toward a downstream device on the bus and to receive a fourth signal over the two-wire bus from the downstream device, and
a peripheral device interface to receive data from a peripheral device communicatively coupled to the peripheral device interface, wherein 1) the data is included in the second signal and is to be provided to a peripheral device communicatively coupled to the upstream device, or 2) the data is included in the third signal and is to be provided to a peripheral device communicatively coupled to the downstream device.

18. The low latency communication system of claim 17, further comprising:
  a master node transceiver communicatively coupled to the slave node transceiver by the two-wire bus; and
  a host device communicatively coupled to the master node transceiver.

19. A method of slave-to-slave communication in a two-wire daisy chain bus, comprising:
  receiving, at a first slave device over the bus, data from a peripheral device communicatively coupled to a second slave device; and
  providing, by the first slave device to a peripheral device coupled to the first slave device.

20. The method of claim 19, wherein the data is provided to the peripheral device coupled to the first slave device, by the first slave device, via an Inter-Integrated Circuit Sound (I2S) transceiver, a Time Division Multiplex (TDM) transceiver, a Pulse Density Modulation (PDM) transceiver, an Inter-Integrated Circuit (I2C) transceiver, or a General Purpose Input/Output (GPIO) pin.

* * * * *